US012128679B2

(12) United States Patent
Takanashi et al.

(10) Patent No.: US 12,128,679 B2
(45) **Date of Patent: *Oct. 29, 2024**

(54) CAPPING DEVICE AND LIQUID EJECTING APPARATUS

(71) Applicant: SEIKO EPSON CORPORATION, Tokyo (JP)

(72) Inventors: Hiromichi Takanashi, Shiojiri (JP); Akira Yamagishi, Shiojiri (JP); Akihiro Toya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,454

(22) Filed: Aug. 4, 2023

(65) Prior Publication Data

US 2023/0373216 A1 Nov. 23, 2023

Related U.S. Application Data

(62) Division of application No. 17/394,956, filed on Aug. 5, 2021, now Pat. No. 11,807,007.

(30) Foreign Application Priority Data

Aug. 7, 2020 (JP) ................................ 2020-134457
Aug. 7, 2020 (JP) ................................ 2020-134458
Nov. 13, 2020 (JP) ................................ 2020-189453

(51) Int. Cl.
*B41J 2/165* (2006.01)
*B41J 2/01* (2006.01)

(52) U.S. Cl.
CPC ............ *B41J 2/01* (2013.01); *B41J 2/16505* (2013.01); *B41J 2/16508* (2013.01);
(Continued)

(58) Field of Classification Search
CPC ...... B41J 2/01; B41J 2/16505; B41J 2/16508; B41J 2/16585; B41J 2/165
See application file for complete search history.

(56) References Cited

U.S. PATENT DOCUMENTS 5,793,389 A 8/1998 Mitchell
7,255,420 B2 8/2007 Usuda
(Continued)

FOREIGN PATENT DOCUMENTS

JP 2003127400 A 5/2003
JP 2005001326 A 1/2005
(Continued)

OTHER PUBLICATIONS

Office Action for JP Patent Application No. JP2020134457, issued on Mar. 5, 2024, 6 pages of Office Action.
(Continued)

*Primary Examiner* — Geoffrey S Mruk
(74) *Attorney, Agent, or Firm* — CHIP Law Group

(57) ABSTRACT

A capping device configured to form a space surrounding an opening of a nozzle by coming into contact with a liquid ejecting head having the nozzle for ejecting a liquid, includes a unit cap, which is an example of a cap, including a recess that forms the space, a humidifying chamber that has an inlet through which a humidifying fluid for humidifying the space flows in and an outlet through which the humidifying fluid flows out, and a first moisture permeable membrane, which is an example of a partition wall, having gas permeability, that partitions the recess and the humidifying chamber. The recess has a discharge hole, which is an example of a hole for discharging the liquid discharged from the liquid ejecting head, which is the example of the cap.

12 Claims, 30 Drawing Sheets

(52) U.S. Cl.
CPC ............ *B41J 2/16585* (2013.01); *B41J 2/165* (2013.01); *B41J 2/16523* (2013.01)

(56) References Cited

U.S. PATENT DOCUMENTS

| | | | | |
|---|---|---|---|---|
| 8,596,749 | B2 | 12/2013 | Tamaki et al. | |
| 10,532,575 | B2 | 1/2020 | Fukunaga et al. | |
| 11,807,007 | B2 * | 11/2023 | Takanashi | B41J 2/16585 |
| 2005/0001873 | A1 | 1/2005 | Sugimura et al. | |
| 2005/0168517 | A1 | 8/2005 | Usuda | |
| 2012/0194604 | A1 | 8/2012 | Tamaki et al. | |
| 2018/0272715 | A1 | 9/2018 | Fukunaga et al. | |
| 2019/0061353 | A1 | 2/2019 | Shimizu et al. | |
| 2019/0291439 | A1 | 9/2019 | Inoue | |

FOREIGN PATENT DOCUMENTS

| | | | |
|---|---|---|---|
| JP | 2005212378 | A | 8/2005 |
| JP | 2012158071 | A | 8/2012 |
| JP | 2018154078 | A | 10/2018 |
| JP | 2019038159 | A | 3/2019 |
| JP | 2019162804 | A | 9/2019 |

OTHER PUBLICATIONS

Office Action for JP Patent Application No. JP2020134458, issued on Mar. 19, 2024, 10 pages of Office Action.

* cited by examiner

CAPPING DEVICE AND LIQUID EJECTING APPARATUS

This application is a divisional application of U.S. patent application Ser. No. 17/394,956, filed on Aug. 5, 2021, is now U.S. Pat. No. 11,807,007 which claims priority from JP Application Serial Number 2020-134457, filed Aug. 7, 2020, JP Application Serial Number 2020-134458, filed Aug. 7, 2020, and JP Application Serial Number 2020-189453, filed Nov. 13, 2020, the disclosures of which are hereby incorporated by reference herein in their entirety.

BACKGROUND

1. Technical Field

The present disclosure relates to a capping device used in a liquid ejecting apparatus that ejects a liquid to a medium.

2. Related Art

In the related art, a liquid ejecting apparatus described in JP-A-2019-38159 includes a capping mechanism for contacting a liquid ejecting head to form a space surrounding a nozzle and discharging thickened liquid and air bubbles in the liquid ejecting head by suction. Further, the liquid ejecting apparatus includes a capping device for contacting the liquid ejecting head to form a space surrounding the nozzle and supplying a moisturizing liquid, which is an example of a humidifying fluid, from the inside of a moisturizing liquid storage portion, which is an example of a humidifying fluid accommodating section, through a coupling flow path to humidify the nozzle. That is, a liquid ejecting apparatus that not only prevents nozzle clogging but also suppresses nozzle drying by providing the capping mechanism and the capping device for maintenance is disclosed.

In the liquid ejecting apparatus described in JP-A-2019-38159, the liquid ejecting head moves from an ejection region where printing is performed on a medium to a maintenance region outside the ejection region for maintenance. That is, the cap of the capping mechanism and the cap of the capping device are arranged side by side in a moving direction of the liquid ejecting head in the maintenance region. For this reason, a space for arranging both caps is required, which makes the liquid ejecting apparatus large.

SUMMARY

According to an aspect of the present disclosure, there is provided a capping device capable of forming a space surrounding an opening of a nozzle by coming into contact with a liquid ejecting head having the nozzle for ejecting a liquid, the capping device including a cap including a recess that forms the space, a humidifying chamber that has an inlet through which a humidifying fluid for humidifying the space flows in and an outlet through which the humidifying fluid flows out, and a partition wall, having gas permeability, that partitions the recess and the humidifying chamber, in which the recess has a hole for discharging the liquid discharged from the liquid ejecting head.

DESCRIPTION OF EXEMPLARY EMBODIMENTS

Figure 1:
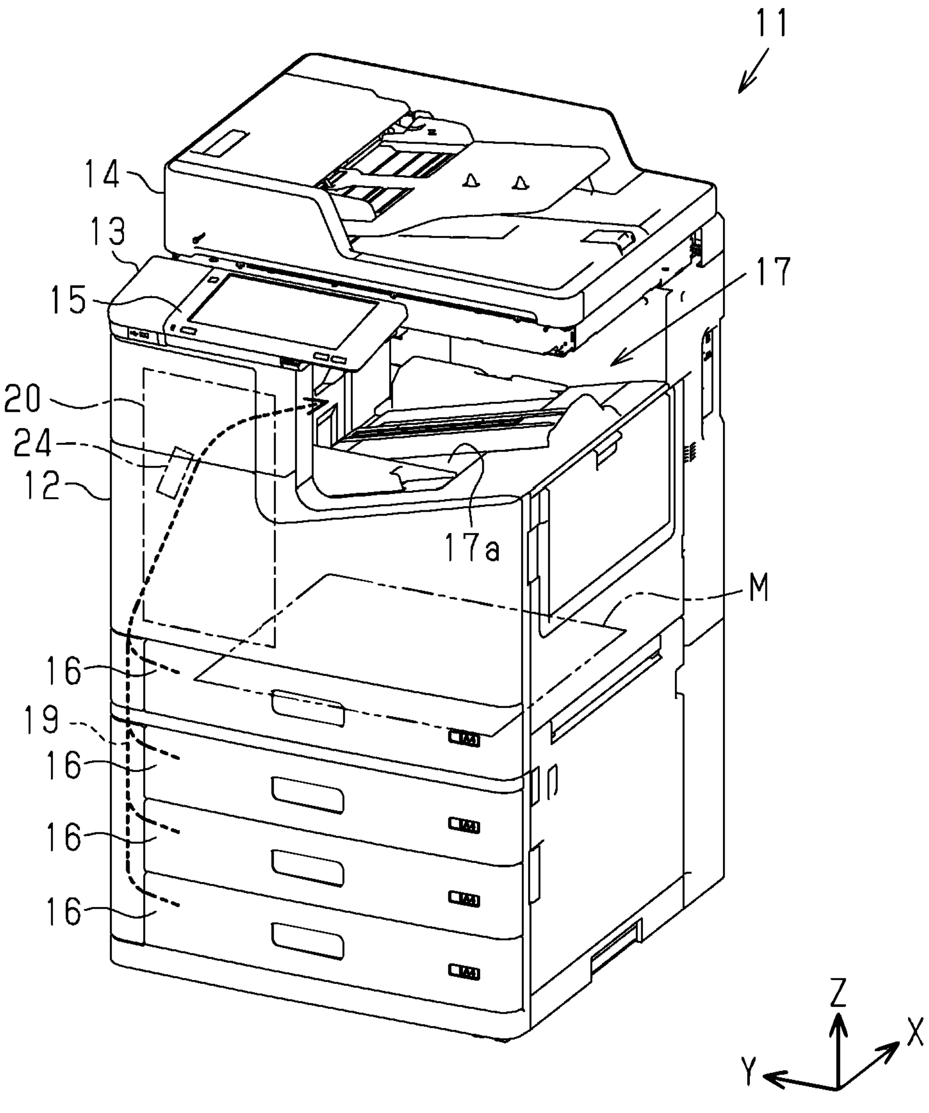
FIG. 1 is a perspective view showing a liquid ejecting apparatus according to a first embodiment.

Hereinafter, a first embodiment of a liquid ejecting apparatus, a capping device used in the liquid ejecting apparatus, and a maintenance method for the capping device used in the liquid ejecting apparatus will be described with reference to the drawings. The liquid ejecting apparatus is an ink jet printer which ejects ink, which is an example of a liquid, to perform printing on a medium such as a paper sheet.

In the drawings, it is assumed that the liquid ejecting apparatus 11 is placed on a planar surface, and a width direction and a depth direction are substantially horizontal. The vertical direction is indicated by a Z axis, and the directions along the plane intersecting the Z axis are indicated by an X axis and an Y axis. The X axis, the Y axis, and the Z axis are preferably orthogonal to one another. In the following description, the X-axis direction is also referred to as the width direction X, the Y-axis direction is also referred to as the depth direction Y, and the Z-axis direction is also referred to as the vertical direction Z.

About Configuration of Liquid Ejecting Apparatus

As shown in FIG. 1, the liquid ejecting apparatus 11 includes a main body 12 having a rectangular parallelepiped shape, an image reading section 13 attached to the upper portion thereof, and an automatic feeding section 14. The liquid ejecting apparatus 11 has a configuration in which the main body 12, the image reading section 13, and the automatic feeding section 14 are stacked in this order from the bottom in the vertical direction Z.

The image reading section 13 is configured to be able to read images such as characters and photographs recorded on the original document. The automatic feeding section 14 is configured to be able to feed the original document to the image reading section 13. Further, the image reading section 13 has an operation portion 15 operated when an instruction is given to the liquid ejecting apparatus 11. The operation portion 15 has, for example, a touch panel type liquid crystal screen, buttons for operation, and the like.

The main body 12 has a plurality of medium accommodating portions 16 capable of accommodating a medium such as a paper sheet. The main body 12 in the present embodiment has a total of four medium accommodating portions 16. The medium accommodating portion 16 is configured to be retractable with respect to the main body 12. Further, the main body 12 has a recording section 20 for making recording on the medium M in the main body 12. The recording section 20 includes a head unit 24 having a liquid ejecting head 21 capable of ejecting a liquid. Further, the main body 12 has a placement portion 17 on which the medium M on which recording has been made is placed. The placement portion 17 has a placement surface 17*a* on which the medium M is placed. The number of medium accommodating portions 16 may be only one.

The medium M accommodated in the medium accommodating portion 16 is transported along a transport path 19 from the medium accommodating portion 16 to the placement portion 17 through the recording section 20. As a feeding roller (not shown) comes into contact with the uppermost medium among the plurality of media M accommodated in the medium accommodating portion 16 and rotates, the uppermost medium M is sent from the medium accommodating portion 16 to the recording section 20 positioned above the medium accommodating portion 16. When the medium M passes through the recording section 20, the liquid ejecting head 21 makes recording by ejecting a liquid toward the medium M and attaching the ejected liquid to the medium M. The medium M after recording is discharged toward the placement portion 17 by a discharge roller pair (not shown).

Figure 2:
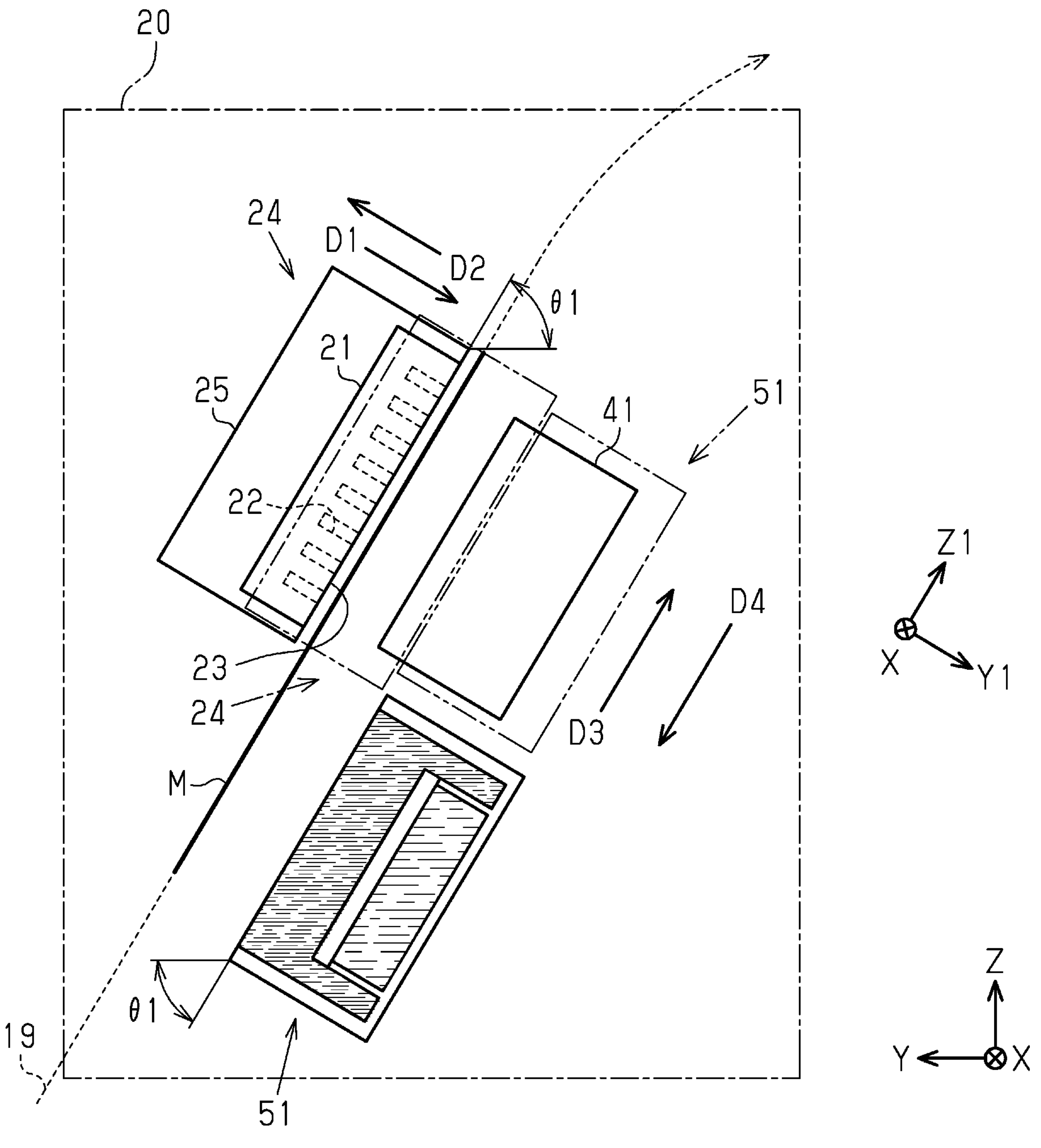
FIG. 2 is a schematic view showing the arrangement of components around a liquid ejecting head.

As shown in FIG. 2, around the liquid ejecting head 21 included in the recording section 20, a cap unit 51 included in a capping device to be described later and a wiper carriage 41 are disposed on the side opposite the head unit 24 with respect to the transport path 19. The head unit 24 includes the liquid ejecting head 21 and a support 25 for holding the liquid ejecting head 21.

The liquid ejecting head 21 is configured to eject liquid to the medium M from a plurality of nozzles 22 constituting a plurality of nozzle groups in a state extending in the width direction X. The direction in which the liquid is discharged when the liquid ejecting head 21 ejects the liquid to the medium M is referred to as an ejecting direction Y1. Further, the direction in which the medium M is transported when the liquid ejecting head 21 ejects the liquid to the medium M is referred to as a first transport direction Z1.

In the present embodiment, the nozzle surface 23 on which the nozzles 22 are arranged is not horizontal and has a first predetermined angle $\theta 1$ with respect to the horizontal. That is, in the present embodiment, the liquid ejecting head 21 is disposed in a state where the nozzle surface 23 has a first predetermined angle $\theta 1$ with respect to the horizontal, and the liquid ejecting head 21 ejects the liquid to the medium M in that state. The nozzle surface 23 on which the nozzles 22 are arranged may be disposed horizontally. That is, the liquid ejecting head 21 may be disposed in a state where the nozzle surface 23 is horizontal.

The liquid ejecting head 21 of the present embodiment is a line head having a number of nozzles 22 capable of simultaneously ejecting the liquid over the entire width of the medium M in the width direction X intersecting the first transport direction Z1 and the ejecting direction Y1. The liquid ejecting apparatus 11 performs line printing by ejecting the liquid from the plurality of nozzles 22, which are located at positions facing the entire width of the medium M which is transported at a constant speed, toward the medium M.

In the liquid ejecting apparatus 11, maintenance operations such as capping, cleaning, flushing, and wiping are performed in order to prevent or eliminate ejection failure caused by clogging of the nozzles 22 of the liquid ejecting head 21, adhesion of foreign matter, or the like.

Capping refers to an operation in which the cap unit 51 contacts the nozzle surface 23 of the liquid ejecting head 21 to surround the nozzles 22 when the liquid ejecting head 21 does not eject the liquid. Since the thickening of the liquid in the nozzles 22 is suppressed by the capping, the occurrence of ejection failure can be prevented.

Cleaning refers to an operation of forcibly discharging the liquid from the nozzles 22 by applying pressure upstream of the liquid ejecting head 21, or forcibly discharging the liquid from the nozzles 22 by applying a suction force to the nozzles 22 of the liquid ejecting head 21.

Flushing refers to an ejection operation for discharging droplets unrelated to printing from the nozzles 22. Flushing is also called empty ejection. By flushing, a thickened ink, air bubbles, or foreign matter that causes ejection failure is discharged from the nozzles 22, and thus clogging of the nozzles 22 can be prevented. In the liquid discharged from the liquid ejecting head 21, the liquid that is not used for printing is called waste liquid. The liquid discharged by flushing is waste liquid since it is not used for printing. The waste liquid discharged by flushing is received by the cap unit 51. That is, flushing is performed by the liquid ejecting head 21 ejecting droplets from the nozzles 22 toward the inside of the cap unit 51.

Wiping refers to an operation of wiping the nozzle surface 23 with a rubber wiper, a cloth wiper, or the like. By wiping, dirt such as liquid, dust, or the like adhering to the nozzle surface 23 of the liquid ejecting head 21 is removed. The liquid wiped off by wiping is also a waste liquid since it is not used for printing.

The position of the head unit 24 when the liquid ejecting head 21 ejects the liquid to the medium M, that is, when the liquid ejecting head 21 makes recording on the medium M is referred to as a recording position. Further, the position of the cap unit 51 when the liquid ejecting head 21 ejects the liquid to the medium M is referred to as a retreat position. Further, the position of the head unit 24 when the liquid ejecting apparatus 11 performs the maintenance operation is referred to as a maintenance position. The position of the cap unit 51 when the liquid ejecting apparatus 11 performs the maintenance operation is also referred to as the maintenance position.

As shown in FIG. 2, the head unit 24 is moved between the recording position indicated by a solid line in FIG. 2 and the maintenance position indicated by a two-dot chain line in FIG. 2, by a head moving mechanism (not shown). The direction in which the head unit 24 moves from the recording position to the maintenance position is referred to as a first direction D1. The direction in which the head unit 24 moves from the maintenance position to the recording position is referred to as a second direction D2.

The cap unit 51 is moved between the retreat position indicated by the solid line in FIG. 2 and the maintenance position indicated by the two-dot chain line in FIG. 2, by a cap moving mechanism (not shown). The direction in which the cap unit 51 moves from the recording position to the maintenance position is referred to as a third direction D3. The direction in which the cap unit 51 moves from the maintenance position to the recording position is referred to as a fourth direction D4.

As shown in FIG. 2, the cap unit 51 moves from the retreat position indicated by the solid line in FIG. 2 in the third direction D3, and is positioned at the maintenance position indicated by the two-dot chain line in FIG. 2, and then the head unit 24 moves from the recording position indicated by the solid line in FIG. 2 in the first direction D1 and is positioned at the maintenance position indicated by the two-dot chain line in FIG. 2. Thereby, the head unit 24 is capped by the cap unit 51. In the present embodiment, in the capped state, flushing is performed by the liquid ejecting head 21 ejecting droplets from the nozzle 22 toward the inside of the cap unit 51. That is, in the liquid ejecting apparatus 11 of the present embodiment, both capping and flushing are performed at the maintenance position. The flushing may be performed in a state where the liquid ejecting head 21 is separated from the cap unit 51.

When the maintenance is completed, the head unit 24 moves from the maintenance position indicated by the two-dot chain line in FIG. 2 in the second direction D2, and is positioned at the recording position indicated by the solid line in FIG. 2. Then, the cap unit 51 moves from the maintenance position indicated by the two-dot chain line in FIG. 2 in the fourth direction D4, and is positioned at the retreat position indicated by the solid line in FIG. 2. At this time, the wiper carriage 41 is positioned at a position that is not overlapped with the head unit 24 and the cap unit 51 in the width direction X. The movement of the wiper carriage 41 will be described later.

About Configuration of Liquid Ejecting Head and Cap Unit

Figure 3:
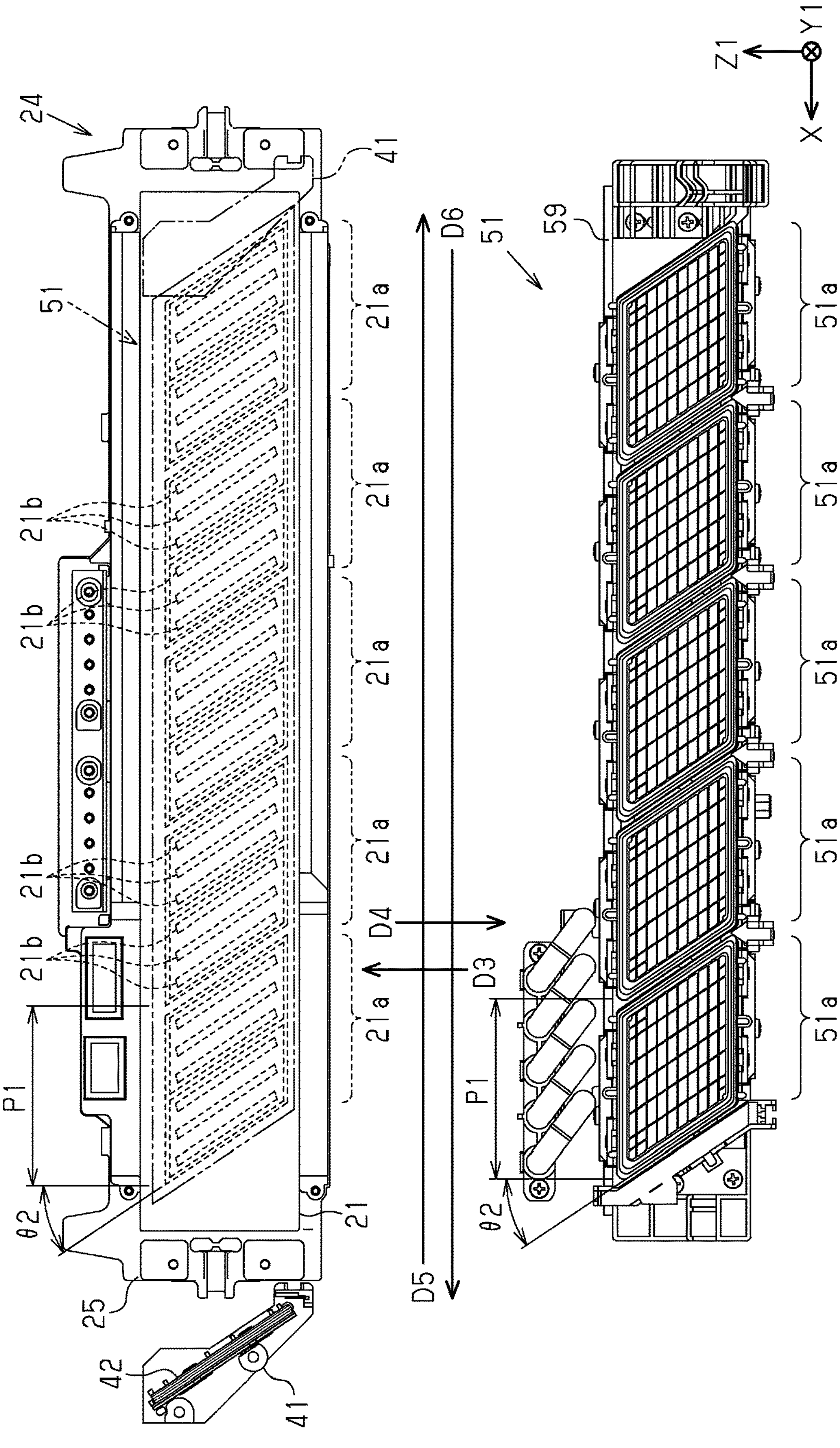
FIG. 3 is a schematic front view of components when viewed in a direction along an ejecting direction in FIG. 2.

As shown in FIG. 3, the liquid ejecting head 21 includes a plurality of unit ejecting heads 21*a*. On the surface of the support 25 facing the transport path 19 shown in FIG. 2, a plurality of unit ejecting heads 21*a* are arranged in the width direction X at a first predetermined pitch P1. The unit ejecting head 21*a* includes a plurality of nozzle rows 21*b*. The plurality of unit ejecting heads 21*a* are arranged in a state of being inclined by a second predetermined angle θ2 with respect to the first transport direction Z1 in which the medium M is transported. That is, the nozzle rows 21*b* are also arranged in a state of being inclined by the second predetermined angle θ2 with respect to the first transport direction Z1. In the present embodiment, the liquid ejecting head 21 includes five unit ejecting heads 21*a*, and each unit ejecting head 21*a* includes six nozzle rows 21*b*.

In the present embodiment, the cap unit 51 has a plurality of unit caps 51*a* and a holding portion 59 for holding the plurality of unit caps 51*a*. The unit cap 51*a* is an example of a cap. A plurality of unit caps 51*a* are arranged in the width direction X at the first predetermined pitch P1 on the side opposite the head unit 24 with respect to the transport path 19 shown in FIG. 2. The plurality of unit caps 51*a* are arranged in a state of being inclined by a second predetermined angle θ2 with respect to the first transport direction Z1 in which the medium M is transported. That is, the unit cap 51*a* has a substantially parallelogram shape when viewed in the direction along the ejecting direction Y1. In the present embodiment, the cap unit 51 includes five unit caps 51*a*.

For each unit ejecting head 21*a*, one unit cap 51*a* is disposed at the opposite position. Therefore, when the head unit 24 is capped by the cap unit 51, the plurality of unit ejecting heads 21*a* are each covered by a separate unit cap 51*a*. That is, the plurality of nozzles 22 included in the liquid ejecting head 21 are covered for each unit ejecting head 21*a* by the same number of unit caps 51*a* as the unit ejecting heads 21*a*. In the present embodiment, the plurality of nozzles 22 included in the liquid ejecting head 21 including the five unit ejecting heads 21*a* are covered for each unit ejecting head 21*a* by the five unit caps 51*a* included in the cap unit 51. Thereby, at the time of capping, all the nozzles 22 included in the liquid ejecting head 21 are covered by the cap unit 51.

Figure 4:
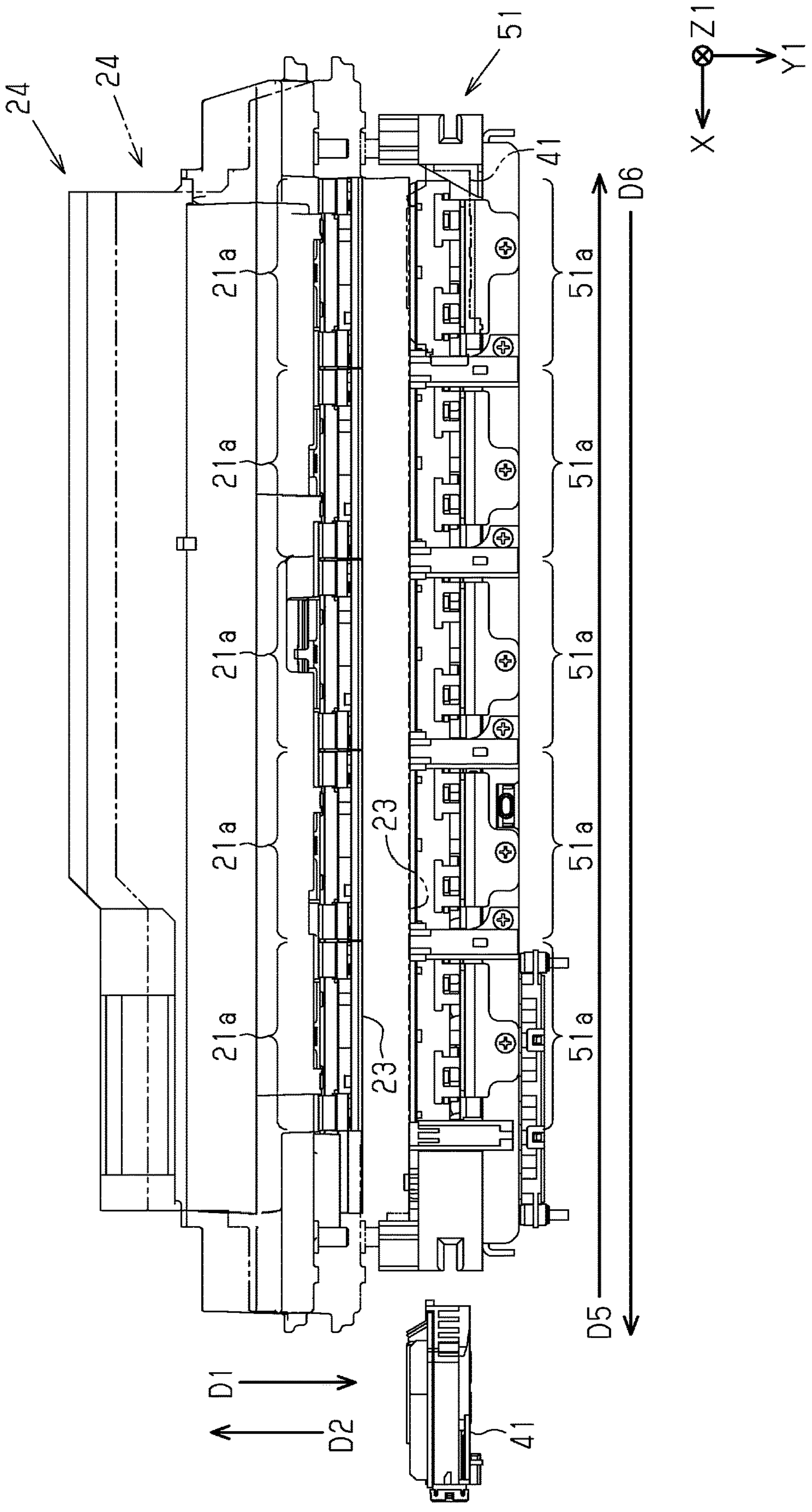
FIG. 4 is a schematic front view of components when viewed in a direction along a first transport direction in FIG. 2.

As shown in FIG. 4, the head unit 24 is moved between the recording position indicated by a solid line in FIG. 4 and the maintenance position indicated by a two-dot chain line in FIG. 4, by the head moving mechanism (not shown).

The wiper carriage 41 is reciprocally moved between the retreat position indicated by the solid line in FIG. 4 and a folding position shown by a two-dot chain line in FIG. 4 by the wiper moving mechanism (not shown). The direction in which the wiper carriage 41 moves from the retreat position to the folding position is referred to as a fifth direction D5. The direction in which the wiper carriage 41 moves from the folding position to the retreat position is referred to as a sixth direction D6.

As shown in FIG. 4, the head unit 24 moves from the recording position indicated by the solid line in FIG. 4 in the first direction D1, and is positioned at the maintenance position indicated by the two-dot chain line in FIG. 4, and then the wiper carriage 41 moves from the retreat position indicated by the solid line in FIG. 4 in the fifth direction D5 and moves to the folding position indicated by the two-dot chain line in FIG. 4. Thereby, the nozzle surface 23 of the head unit 24 is wiped by a wiper member 42 included in the wiper carriage 41.

When the wiping is completed, the head unit 24 moves from the maintenance position indicated by the two-dot chain line in FIG. 4 in the second direction D2, and is positioned at the recording position indicated by the solid line in FIG. 4. Then, the wiper carriage 41 moves from the folding position indicated by the two-dot chain line in FIG. 4 in the sixth direction D6, and is positioned at the retreat position indicated by the solid line in FIG. 4.

About Configuration of Cap

Figure 5:
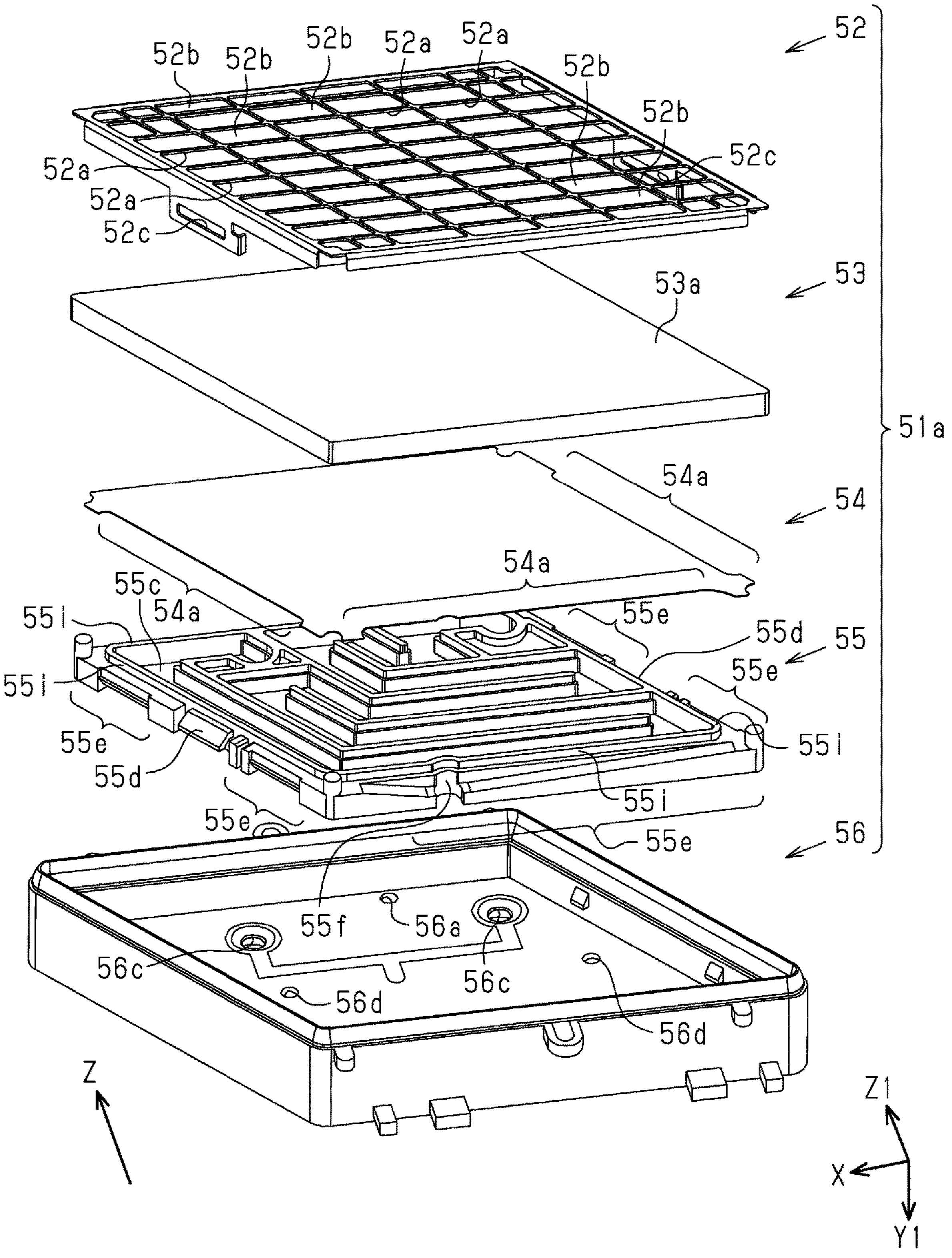
FIG. 5 is an exploded perspective view of a unit cap when viewed in diagonally above in FIG. 3.

As shown in FIG. 5, the unit cap 51*a*, which is an example of the cap, has a restriction member 52, an absorber 53, a first moisture permeable membrane 54, which is an example of the partition wall, a humidifying chamber 55, and a case 56. The unit cap 51*a* exhibits a low-height prismatic shape with a bottom surface of a substantially parallelogram. In the present embodiment, the unit cap 51*a* is used in a state where the bottom surface of the substantially parallelogram is disposed on a XZ1 plane shown in FIG. 2. That is, the unit cap 51*a* shown in FIG. 5 is used in a state where the bottom surface of the substantially parallelogram is inclined with respect to the horizontal. The XZ1 plane is a plane parallel to the nozzle surface 23 of the liquid ejecting head 21 shown in FIG. 4.

The restriction member 52 has a substantially parallelogram-shaped restriction surface 52*a* for restricting the position of a surface 53*a* of the absorber 53 in a −Y1 direction, and a positioning-engaged portion 52*c*. The material used for the restriction member 52 is, for example, a thin metal plate such as a stainless steel material. Then, the restriction member 52 ensures the planarity and strength of the restriction surface 52*a* and restricts the position of the absorber 53 by bending the four sides around the restriction surface 52*a* toward a +Y1 direction.

In the restriction member 52, the restriction surface 52*a* is formed in a mesh pattern. That is, the restriction surface 52*a* has a plurality of communication holes 52*b*. The −Y1 direction side and the +Y1 direction side of the restriction surface 52*a* communicate with each other through a plurality of communication holes 52*b*. Thereby, the unit cap 51*a* is configured to allow the liquid to pass through the restriction surface 52*a* from the −Y1 direction side to the +Y1 direction side and from the +Y1 direction side to the −Y1 direction side, in the unit cap 51*a*.

As shown in FIG. 5, the absorber 53 is formed in a shape of a substantially parallelogram thin plate extending in the XZ1 plane. The absorber 53 is configured to be able to absorb the liquid. Therefore, the absorber 53 may be displaced, or swollen, to increase its volume by absorbing the liquid.

The restriction member 52 restricts the absorber 53 at a predetermined position in order to widely expose the surface 53*a* of the absorber 53 and to keep constant the distance between the surface 53*a* and the nozzle surface 23 shown in FIG. 4. That is, the restriction member 52 suppresses the displacement of the absorber 53 in the −Y1 direction when the absorber 53 is swollen.

As shown in FIG. 5, the first moisture permeable membrane 54 is formed in a shape of a substantially parallelogram sheet extending in the XZ1 plane. The first moisture permeable membrane 54 has gas permeability. That is, the first moisture permeable membrane 54 allows the passing-through of gas, but restricts the passing-through of liquid. In the present embodiment, the material used for the first moisture permeable membrane 54 is a material obtained by coating a cloth with a fluororesin. The material used for the first moisture permeable membrane 54 may be any material that does not allow liquid to pass through but allows gas to pass through, and may be a film membrane or an elastomer membrane.

The first moisture permeable membrane 54 has a communication portion 54*a* on three of the four sides of the substantially parallelogram. The first moisture permeable membrane 54 is configured to allow liquid to pass through the first moisture permeable membrane 54 from the −Y1 direction side to the +Y1 direction side and from the +Y1 direction side to the −Y1 direction side only in the vicinity of three sides of the first moisture permeable membrane 54, by slightly cutting out the central portion of the three sides toward the inside of the substantially parallelogram. The first moisture permeable membrane 54 may also have a communication portion 54*a* on one side of the substantially parallelogram positioned foremost in the +Z direction.

As described above, in the present embodiment, the bottom surface of the substantially parallelogram of the unit cap 51*a* shown in FIG. 5 is provided on the XZ1 plane inclined with respect to the horizontal. Since the force that causes the liquid to flow in the −Z direction in the vertical direction acts by gravity, the liquid is difficult to flow to the side of the substantially parallelogram positioned foremost in the +Z direction. Therefore, in the present embodiment, the first moisture permeable membrane 54 does not have the communication portion 54*a* on one side of the substantially parallelogram positioned foremost in the +Z direction.

As shown in FIG. 5, the humidifying chamber 55 has a bottom surface of a substantially parallelogram extending in the XZ1 plane. The humidifying chamber 55 has a groove 55*c* in the central portion of the bottom surface thereof for the humidifying fluid described later to flow. The humidifying chamber 55 is formed by resin molding or the like. That is, the material used for the humidifying chamber 55 is a material that does not allow the liquid to pass through. The groove 55*c* has a groove wall 55*i*. The end of the groove wall 55*i* in the −Y1 direction and the first moisture permeable membrane 54 are sealed by, for example, welding or adhesion. Thereby, a chamber is formed by the groove 55*c* of the humidifying chamber 55 and the first moisture permeable membrane 54.

The humidifying chamber 55 has a communication portion 55*e* on three sides and a positioning-engaging portion 55*d* on two sides, among the four sides of the substantially parallelogram. The humidifying chamber 55 is configured to allow liquid to pass through from the −Y1 direction side to the +Y1 direction side and from the +Y1 direction side to the −Y1 direction side, of the humidifying chamber 55, only in the vicinity of the three sides of the humidifying chamber 55, by cutting out a few points on the three sides toward the inside of the substantially parallelogram. The humidifying chamber 55 may also have the communication portion 55*e* on one side of the substantially parallelogram positioned foremost in the +Z direction. Since the periphery of the humidifying chamber 55 is sealed, the humidifying chamber 55 and the communication portion 55*e* do not communicate with each other.

As described above, in the present embodiment, the unit cap 51*a* shown in FIG. 5 is used in a state where the bottom surface of the substantially parallelogram is inclined with respect to the horizontal. Since the force that causes the liquid to flow in the −Z direction in the vertical direction acts by gravity, the liquid is difficult to flow to the side of the substantially parallelogram positioned foremost in the +Z direction. Therefore, in the present embodiment, the humidifying chamber 55 does not have the communication portion 55*e* on one side of the substantially parallelogram positioned foremost in the +Z direction.

At the communication portion 55*e* on the side of the substantially parallelogram positioned foremost in the −Z direction, the humidifying chamber 55 has a communication hole 55*f* communicating with the space in the case 56 slightly toward the +X direction with respect to the center of the communication portion 55*e*. Thereby, the humidifying chamber 55 is provided such that the liquid flowing by gravity flows through the communication holes 55*f* more evenly and efficiently.

On one side of the substantially parallelogram positioned foremost in the +Z direction, the case 56 has an atmosphere communication hole 56*a* slightly toward the −X direction with respect to the center of the one side. Further, the humidifying chamber 55 has a communication hole 55*j* shown in FIG. 6 allowing the space inside the case 56 to communicate with the atmosphere communication hole 56*a*. Thereby, the space inside the case 56 and the atmosphere described later communicate with each other. In order to allow the atmosphere to flow into the case 56 more efficiently, it is desirable that an atmosphere communication hole 56*a* is positioned in the center of the case 56. In the present embodiment, the humidifying chamber 55 has a bottom surface of the substantially parallelogram. Therefore, the atmosphere communication hole 56*a* is positioned slightly toward the −X direction with respect to the width direction X.

Figure 6:
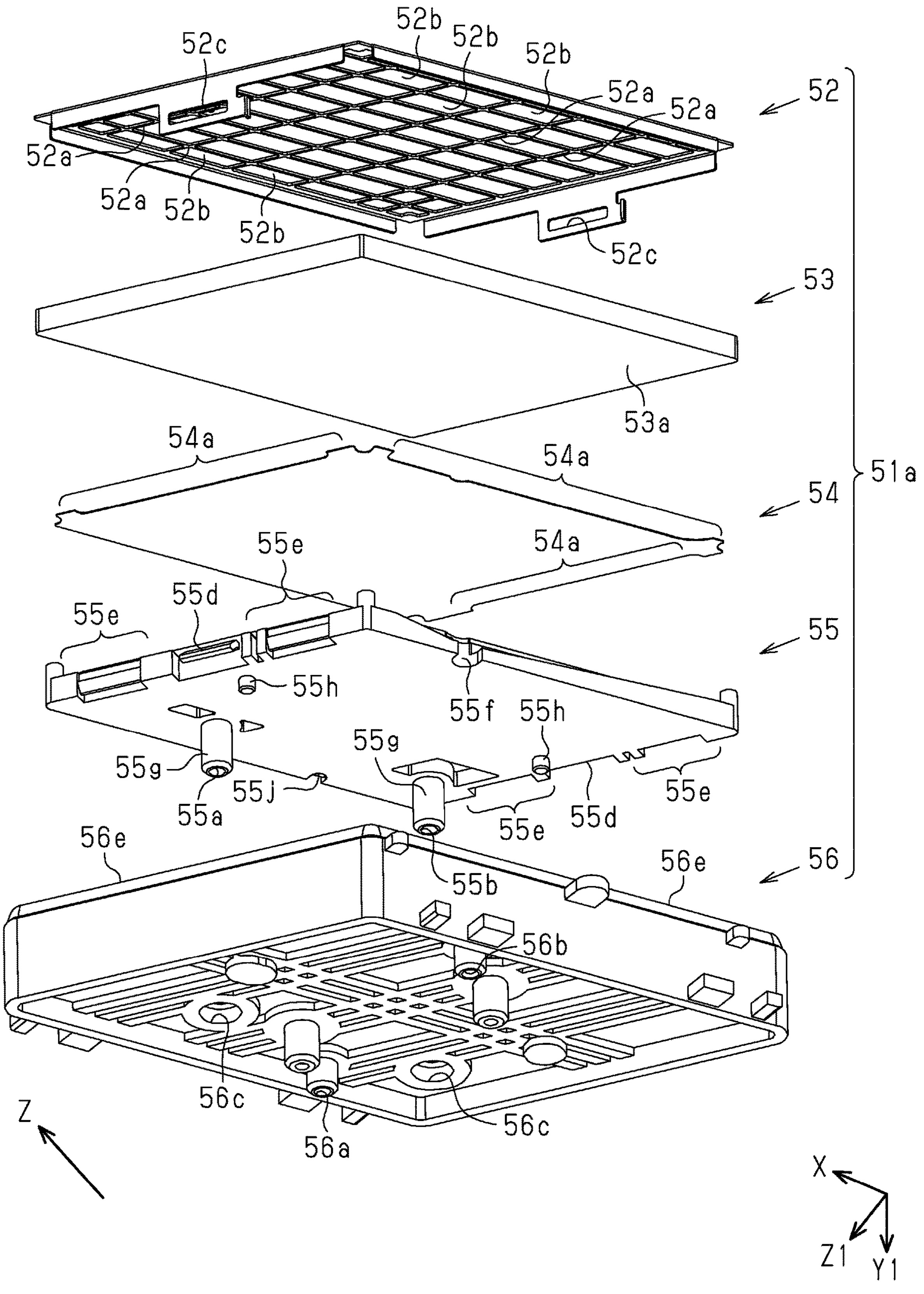
FIG. 6 is an exploded perspective view of the unit cap when viewed in diagonally below in FIG. 3.

As shown in FIG. 6, the humidifying chamber 55 has an inlet 55*a*, an outlet 55*b*, an engaging portion 55*g*, and a positioning-engaging portion 55*h* on the surface of the bottom surface of a substantially parallelogram positioned in the +Y1 direction. The engaging portion 55*g* is tubular, and the inlet 55*a* is formed inside the engaging portion 55*g* positioned in the +X direction, and the outlet 55*b* is formed inside the engaging portion 55*g* positioned in the −X direction. The inlet 55*a* and the outlet 55*b* allow the +Y1 direction side and the −Y1 direction side of the bottom surface of the substantially parallelogram to communicate with each other. Then, the inlet 55*a* and the outlet 55*b* communicate with each other by a flow path formed by the groove 55*c* and the first moisture permeable membrane 54 in the humidifying chamber 55. The flow path formed by the groove 55*c* and the first moisture permeable membrane 54 will be described later.

The case 56 has an atmosphere communication hole 56*a*, a discharge hole 56*b* which is an example of the hole, an engaged portion 56*c*, a positioning-engaged portion 56*d* shown in FIG. 5, and a seal portion 56*e*. The atmosphere communication hole 56*a* and the discharge hole 56*b* allow the +Y1 direction side and the −Y1 direction side of the bottom surface of the substantially parallelogram to communicate with each other.

On the surface of surrounding walls forming the case 56 positioned foremost in the −Y1 direction, the seal portion 56*e* is formed in a frame shape along the surrounding wall. The material used for the seal portion 56*e* is, for example, a flexible material such as a rubber material or an elastomer. In order to suppress drip of the liquid in the unit cap 51*a* from the seal portion 56*e* to the outside of the unit cap 51*a*, the material of the seal portion 56*e* may be a water-repellent elastomer material that repels the liquid ejected from the liquid ejecting head 21. In the present embodiment, the surface of the surrounding walls forming the case 56 positioned foremost in the −Y1 direction is positioned on the XZ1 plane inclined with respect to the horizontal. The liquid moves vertically by gravity. Therefore, the seal portion 56*e* below the center of the unit cap 51*a* in the vertical direction Z may have higher water repellency than the seal portion 56*e* above the center, or only the seal portion 56*e* below the center may have water repellency.

The case 56 forms a low-height prismatic outer shape having a bottom surface of a substantially parallelogram of the unit cap 51*a* to accommodate the restriction member 52, the absorber 53, the first moisture permeable membrane 54, and the humidifying chamber 55. The positioning-engaging portion 55*d* included in the humidifying chamber 55 engages with the positioning-engaged portion 52*c* included in the restriction member 52. The engaging portion 55*g* included in the humidifying chamber 55 engages with the engaged portion 56*c* included in the case 56. The positioning-engaging portion 55*h* included in the humidifying chamber 55 engages with the positioning-engaged portion 56*d* included in the case 56, which is shown in FIG. 5. Thereby, the restriction member 52, the absorber 53, the first moisture permeable membrane 54, and the humidifying chamber 55 are held in the case 56. Further, the communication hole 55*f* of the humidifying chamber 55 and the discharge hole 56*b* of the case 56 communicate with each other. Then, the communication hole 55*j* of the humidifying chamber 55 and the atmosphere communication hole 56*a* of the case 56 communicate with each other.

Figure 7:
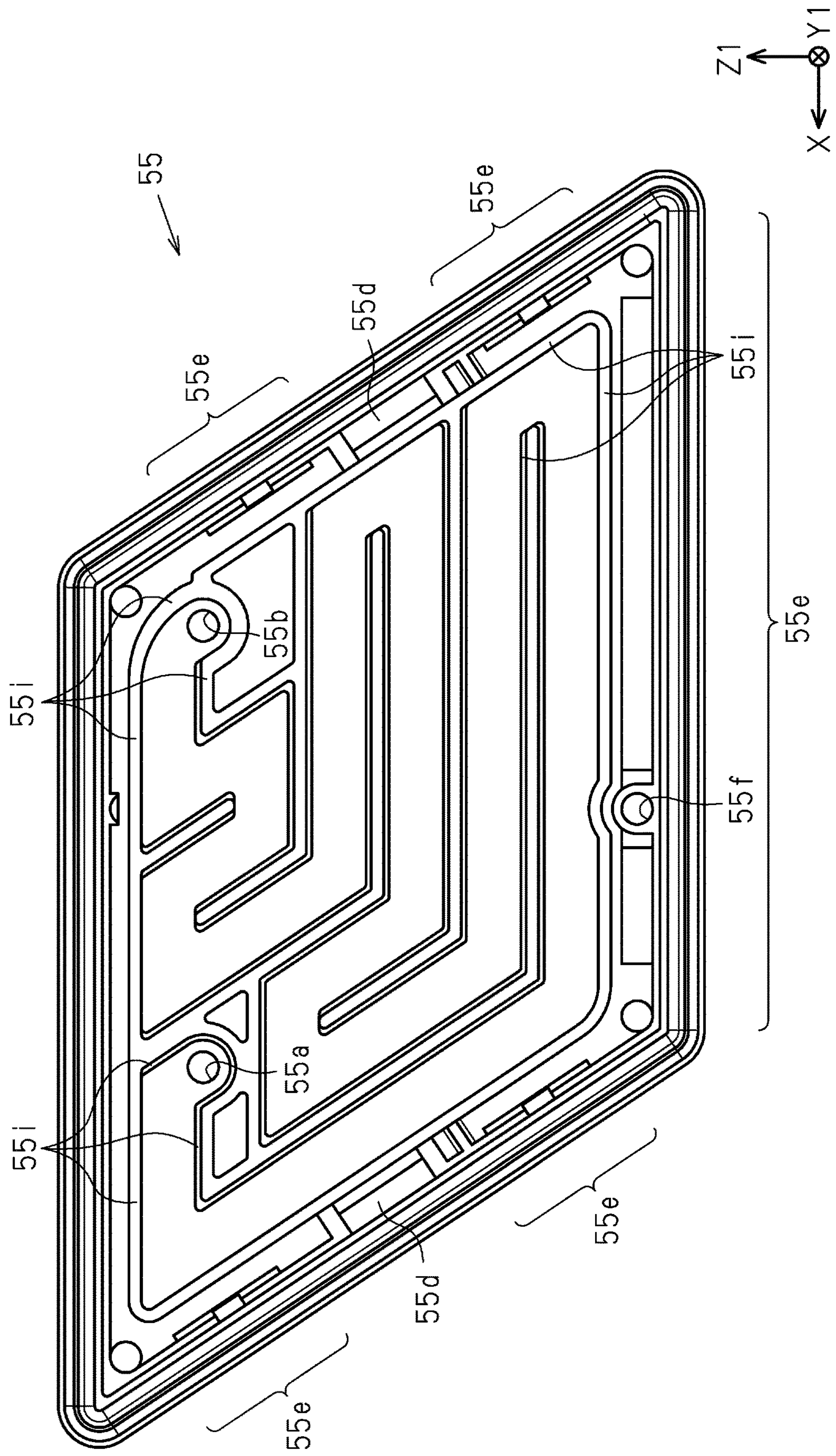
FIG. 7 is a plan view of a humidifying chamber when viewed in a direction along the ejecting direction in FIG. 5.

As shown in FIG. 7, the groove 55*c* of the humidifying chamber 55 is formed on the surface of the bottom surface in the −Y1 direction, which has a substantially parallelogram shape. The groove 55*c* winds in a meandering manner so as to cover the entire surface thereof, and is formed in a single-way labyrinthine shape from the inlet 55*a* to the outlet 55*b*. The end of the groove wall 55*i* forming the groove 55*c* in the −Y1 direction and the first moisture permeable membrane 54 shown in FIG. 5 are sealed over the entire area from the inlet 55*a* to the outlet 55*b*. Therefore, a single-way, winding flow path having a meandering and complicated path is formed by the groove 55*c* and the first moisture permeable membrane 54, and the inlet 55*a* and the outlet 55*b* communicate with each other. That is, the humidifying chamber 55 is formed in a shape of a flow path through which the inlet 55*a* and the outlet 55*b* communicate with each other, by the groove 55*c* through which a humidifying fluid to be described later flows and the first moisture permeable membrane 54 shown in FIG. 5, which is an example of the partition wall covering the groove 55*c*.

As will be described later, since the space inside the unit cap 51*a* is humidified by the humidifying fluid flowing through the groove 55*c*, it is desirable that, in the XZ1 plane, the area occupied by the groove 55*c* in the unit cap 51*a* is large. That is, in order to increase the area occupied by the groove 55*c* with respect to the bottom surface of the unit cap 51*a*, it is desirable to draw the flow path around the entire bottom surface of the unit cap 51*a*.

About Recess Forming Space

Figure 8:
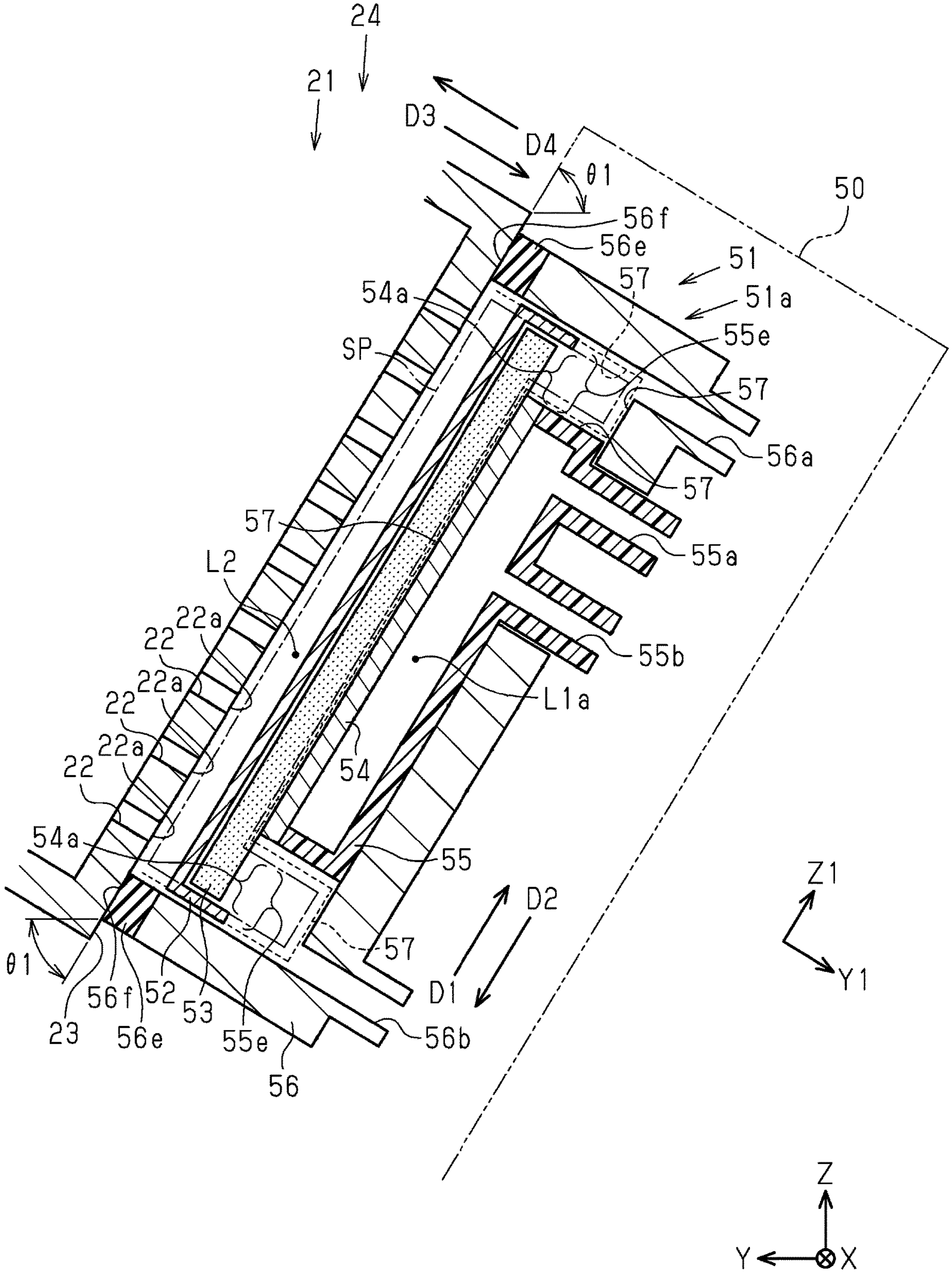
FIG. 8 is a schematic front cross-sectional view of the unit cap.

As shown in FIG. 8, the liquid ejecting apparatus 11 includes a capping device 50. The capping device 50 has the movable cap unit 51 shown in FIG. 3. The cap unit 51 has the unit cap 51*a*.

When the cap unit 51 moves in the first direction D1 and is positioned at a maintenance position shown in FIG. 8, and then the head unit 24 moves in the third direction D3 and is positioned at a maintenance position shown in FIG. 8, the unit cap 51*a* included in the capping device 50 comes into contact with the nozzle surface 23 of the liquid ejecting head 21. The surface of the seal portion 56*e* located around the case 56 and in the −Y1 direction is referred to as a close contact surface 56*f*. When the capping device 50 and the liquid ejecting head 21 come into contact with each other, the nozzle surface 23 and the close contact surface 56*f* come into close contact with each other, and the nozzle surface 23 is sealed by the seal portion 56*e*. That is, the capping device 50 is configured to be able to form a space SP surrounding openings 22*a* of the nozzles 22 when the unit cap 51*a*, which is an example of the cap, comes into contact with the liquid ejecting head 21 having the nozzles 22 for ejecting the liquid. In other words, the unit cap 51*a*, which is an example of the cap, can form the space SP surrounding the openings 22*a* of the nozzles 22 when coming into contact with the liquid ejecting head 21 having the nozzles 22 for ejecting the liquid.

The unit cap 51*a* has a recess 57 that forms the space SP. In the present embodiment, as shown in FIG. 8, the recess 57 is constituted by an inner surface of the case 56, an outer surface of the outer periphery of the humidifying chamber 55, and a surface of the first moisture permeable membrane 54 closed to the absorber 53. The recess 57 has an absorber 53 capable of absorbing a liquid at a position in contact with the first moisture permeable membrane 54, which is an example of the partition wall. The first moisture permeable membrane 54 having gas permeability separates the recess 57 and the humidifying chamber 55. Thereby, when the capping device 50 and the liquid ejecting head 21 come into contact with each other, the recess 57 forms the space SP surrounding the openings 22*a* of the nozzles 22. The recess 57 has a volume in which the liquid ejected into the recess by flushing does not overflow from the seal portion 56*e* when flushing is performed.

In the present embodiment, the nozzle surface 23 on which the nozzles 22 are arranged is not horizontal and has the first predetermined angle θ1 with respect to the horizontal. Therefore, the surface of the seal portion 56*e* located around the case 56 and in the −Y1 direction is also not horizontal, and has the first predetermined angle θ1 with respect to the horizontal. Thereby, the nozzle surface 23 and the close contact surface 56*f* of the seal portion 56*e* are in close contact with each other in a state where the unit cap 51*a* is inclined by the first predetermined angle θ1 with respect to the horizontal, and the nozzle surface 23 is sealed by the seal portion 56*e*. Even in the present embodiment in which the unit cap 51*a* is inclined with respect to the horizontal, the recess 57 has a volume in which the liquid ejected into the recess by flushing does not overflow from the lower portion of the inclined seal portion 56*e* when flushing is performed.

The nozzle surface 23 on which the nozzles 22 are arranged and the surface of the seal portion 56*e* positioned in the −Y1 direction may be arranged horizontally. That is, the nozzle surface 23 may be sealed by the seal portion 56*e* in a state where the liquid ejecting head 21 and the unit cap 51*a* are arranged horizontally.

Figure 9:
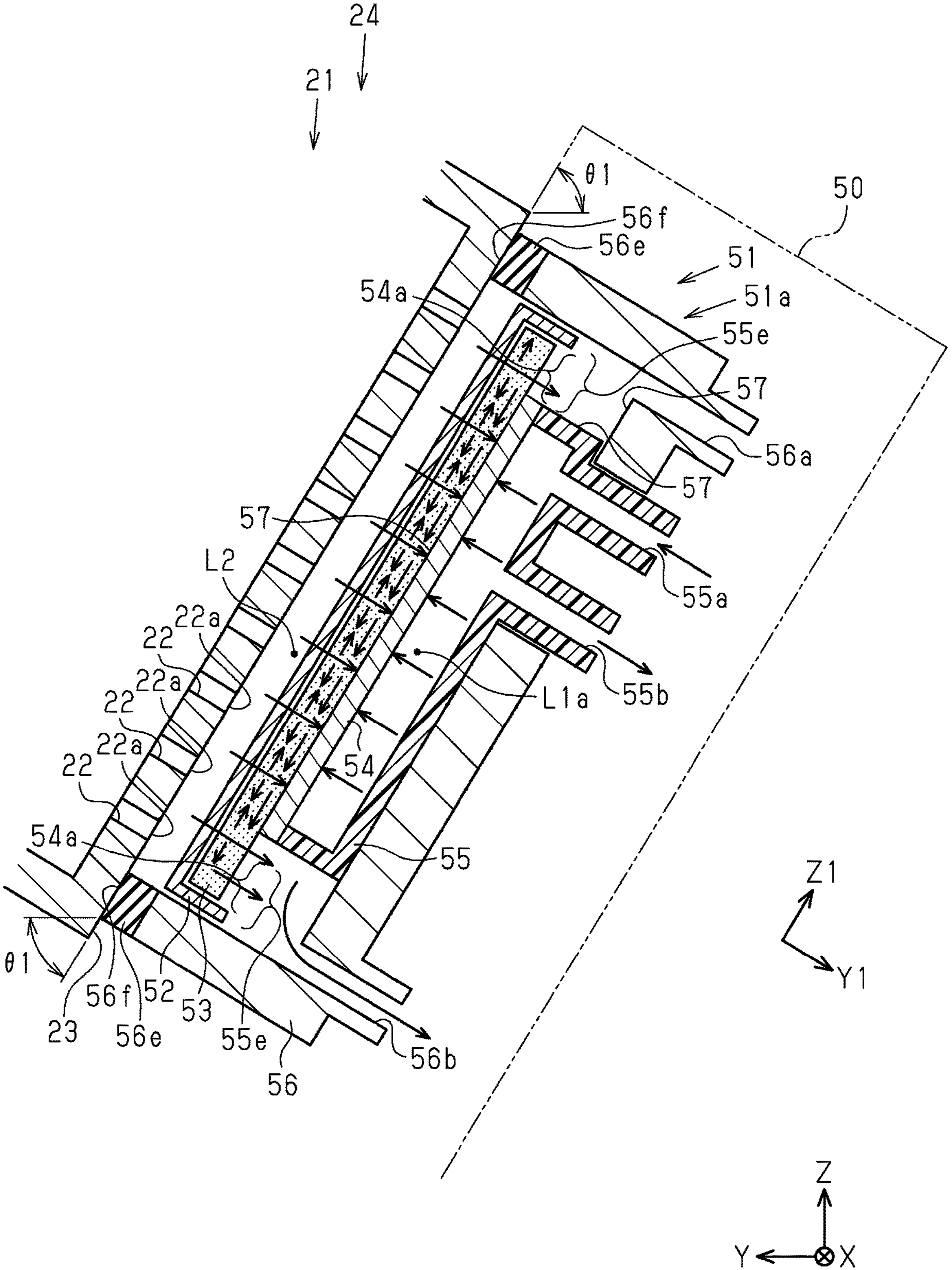
FIG. 9 is a schematic view showing flow of liquid in FIG. 8 with arrows.

As shown in FIG. 9, the restriction member 52 and the absorber 53 have liquid permeability, and the first moisture permeable membrane 54 does not have liquid permeability. Therefore, at the time of flushing, the liquid discharged from the nozzles 22 passes through the restriction member 52 and the absorber 53 from the −Y1 direction side to the +Y1 direction side, but does not pass through the first moisture permeable membrane 54 from the −Y1 direction to the +Y1 direction. Also, the liquid is absorbed by the absorber 53. Then, the liquid absorbed by the absorber 53 spreads over the entire absorber 53. More specifically, in the absorber 53, when there is a portion where the liquid is not absorbed so much around the portion where the liquid is absorbed much, the liquid flows from the portion where the liquid is absorbed much to the portion where the liquid is not absorbed so much.

When more liquid is absorbed by the absorber 53 and the absorber 53 approaches a state where it cannot absorb the liquid any more, the liquid flows in the absorber 53 in the −Z direction which is the vertical direction by gravity. Thereby, when the liquid reaches the surface of the first moisture permeable membrane 54 positioned in the −Y1 direction, it flows in the −Z1 direction by gravity. Since the first moisture permeable membrane 54 does not have liquid permeability, the first moisture permeable membrane 54 restricts the passing-through of liquid. That is, the liquid does not flow into the humidifying chamber 55. Then, the liquid passes through the communication portion 54*a* and the communication portion 55*e* by gravity, and is discharged to the outside of the unit cap 51*a* through the discharge hole 56*b* of the case 56. That is, the recess 57 has the discharge hole 56*b*, which is an example of the hole capable of discharging the liquid discharged from the liquid ejecting head 21 into the unit cap 51*a*.

In the present embodiment, the discharge hole 56*b*, which is an example of the hole, is provided in the recess 57 at a position lower than that of the first moisture permeable membrane 54, which is an example of the partition wall. That is, the discharge hole 56*b* is provided in the −Z direction with respect to the first moisture permeable membrane 54. Further, the discharge hole 56*b*, which is an example of the hole, may be provided at the lowermost portion of the recess 57. That is, the discharge hole 56*b* may be provided on the side of the recess 57 foremost in the −Z direction.

The humidifying chamber 55 has the inlet 55*a* through which the humidifying fluid described later for humidifying the space SP flows in, and the outlet 55*b* through which the humidifying fluid flows out. Since the first moisture permeable membrane 54 does not have liquid permeability, the first moisture permeable membrane 54 restricts the passing-through of liquid of the humidifying chamber 55 from the +Y1 direction side to the −Y1 direction. Thereby, in the humidifying chamber 55, the liquid flowing in through the inlet 55*a* flows out through the outlet 55*b*. The humidifying chamber 55 is provided in an inclined attitude with respect to the horizontal. The inlet 55*a* and the outlet 55*b* are provided above the center of the humidifying chamber 55 in the vertical direction Z. In the present embodiment, the inlet 55*a* and the outlet 55*b* are positioned in the +Z direction with respect to the center of the humidifying chamber 55 in the vertical direction Z. By providing the inlet 55*a* and the outlet 55*b* on the side of the humidifying chamber 55 in the +Z direction, it is possible to suppress the liquid in the humidifying chamber 55 from flowing out of the humidifying chamber 55 by the water head pressure from the inlet 55*a* or the outlet 55*b*.

Figure 10:
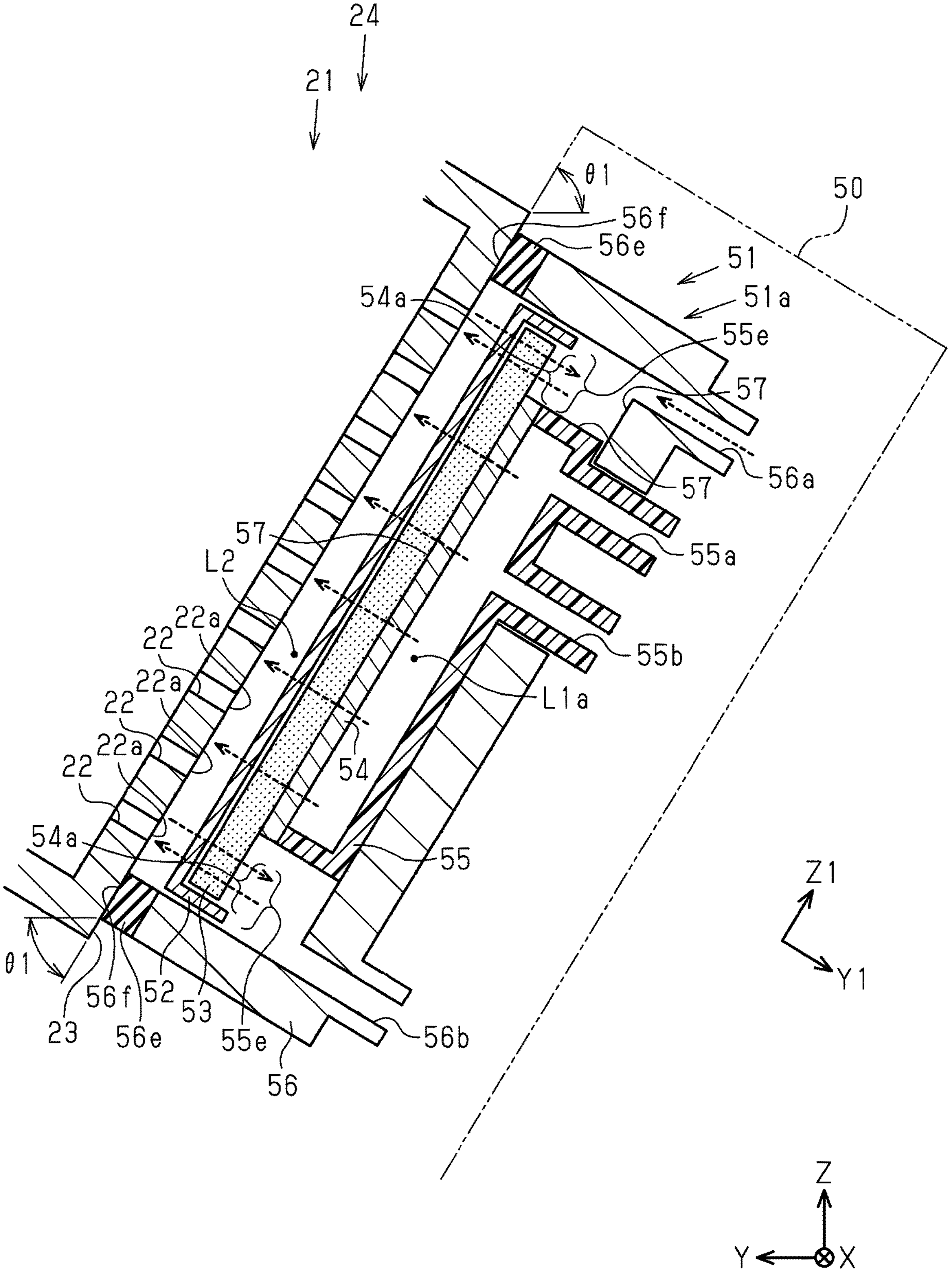
FIG. 10 is a schematic view showing flow of gas in FIG. 8 with arrows.

As shown in FIG. 10, the restriction member 52, the absorber 53, and the first moisture permeable membrane 54 have gas permeability. Therefore, the atmosphere or water vapor, which is a gas, passes through the restriction member 52, the absorber 53, and the first moisture permeable membrane 54 from the −Y1 direction side to the +Y1 direction side and from the +Y1 direction side to the −Y1 direction side. Thereby, the capping device 50 is configured such that the water vapor evaporated from the humidifying fluid described later can flow from the humidifying chamber 55 into the recess 57 in the unit cap 51*a*.

The recess 57 has the atmosphere communication hole 56*a* for allowing the space SP to communicate with the atmosphere. The atmosphere communication hole 56*a* is provided above the center of the unit cap 51*a* in the vertical direction. In the present embodiment, the atmosphere communication hole 56*a* is provided in the +Z direction with respect to the center of the recess 57 in the vertical direction Z. By providing the atmosphere communication hole 56*a* above the center of the unit cap 51*a* in the vertical direction, the blockage of the atmosphere communication hole 56*a* by the liquid can be suppressed. Further, the atmosphere communication hole 56*a* may be provided at a position higher than that of the first moisture permeable membrane 54, that is, in the +Z direction with respect to the first moisture permeable membrane 54.

Figure 11:
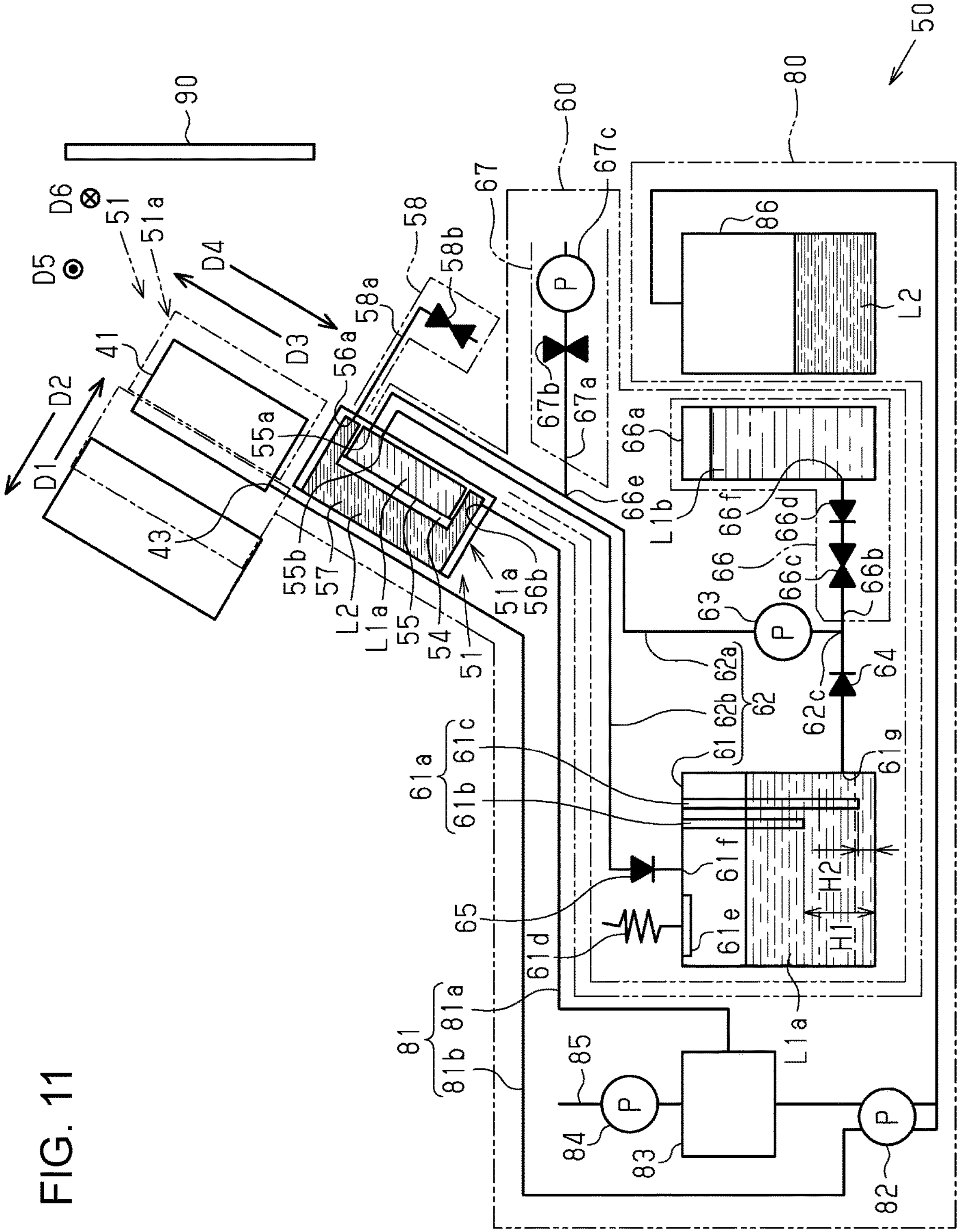
FIG. 11 is a schematic view showing a configuration of a capping device.

About Configuration of Humidifying Fluid Circulation Mechanism Provided in Capping Device As shown in FIG. 11, the capping device 50 includes the cap unit 51 having the unit cap 51*a*, the cap moving mechanism (not shown), a humidifying fluid circulation mechanism 60, and a waste liquid recovery mechanism 80.

The humidifying fluid circulation mechanism 60 included in the capping device 50 includes a humidifying fluid accommodating section 61 accommodating a humidifying fluid L1a, a supply flow path 62*a*, and a recovery flow path 62*b*. The supply flow path 62*a* allows the humidifying fluid accommodating section 61 to communicate with the inlet 55*a*. That is, the supply flow path 62*a* allows the humidifying fluid accommodating section 61 to communicate with the unit cap 51*a*, which is an example of the cap. The recovery flow path 62*b* allows the outlet 55*b* to communicate with the humidifying fluid accommodating section 61. That is, the recovery flow path 62*b* allows the unit cap 51*a*, which is an example of the cap, to communicate with the humidifying fluid accommodating section 61. The humidifying fluid circulation mechanism 60 includes the humidifying fluid accommodating section 61, the supply flow path 62*a*, and a circulation path 62 including a recovery flow path 62*b*.

The humidifying fluid accommodating section 61 has an inlet portion 61*f* and an outlet portion 61*g*. The humidifying fluid accommodating section 61 communicates with the recovery flow path 62*b* at the inlet portion 61*f*. The humidifying fluid accommodating section 61 communicates with the supply flow path 62*a* at the outlet portion 61*g*.

In the humidifying fluid circulation mechanism 60, the humidifying fluid L1a flowing in the circulation path 62 is a fluid containing moisture for humidifying the space SP shown in FIG. 8. It is desirable that the moisturizing power of the humidifying fluid L1a is equivalent to the moisturizing power of the liquid ejected from the liquid ejecting head 21. The moisturizing power refers to the concentration of the moisturizing agent contained in the humidifying fluid L1a and the liquid ejected from the liquid ejecting head 21. For example, it is desirable that when the liquid ejecting head 21 performs printing by ejecting an ink, which is an example of the liquid, to a medium such as a paper sheet, the moisturizing power of the humidifying fluid L1a is equivalent to the moisturizing power of fresh ink. Further, it is desirable that the moisturizing power of the ink is balanced in each color. The details of the humidifying fluid L1a will be described later.

As shown in FIG. 3, the cap unit 51 included in the capping device 50 of the present embodiment has five unit caps 51*a* shown in FIG. 6. That is, in the capping device 50, a plurality of unit caps 51*a*, each being an example of the cap, are arranged. Then, in the capping device 50, each of the five unit caps 51*a* has the inlet 55*a* shown in FIG. 6 and the outlet 55*b* shown in FIG. 6. Therefore, in the present embodiment, among the plurality of unit caps 51*a*, the outlet 55*b* of one unit cap 51*a* is coupled to the inlet 55*a* of another unit cap 51*a* adjacent to the unit cap 51*a*. For example, the outlet 55*b* of one unit cap 51*a* and the inlet 55*a* of another unit cap 51*a* adjacent to the unit cap 51*a* are coupled to each other by a tube (not shown), and the outlet 55*b* and the inlet 55*a* communicates with each other by the tube (not shown). Thereby, the inlet 55*a* positioned furthest upstream and the outlet 55*b* positioned furthest downstream communicate with each other. The inlet 55*a* positioned furthest upstream is coupled to the supply flow path 62*a* shown in FIG. 11. The outlet 55*b* positioned furthest downstream is coupled to the recovery flow path 62*b* shown in FIG. 11. That is, the capping device 50 of the present embodiment is configured such that the humidifying fluid L1a flowing in the circulation path 62 shown in FIG. 11 can flow through the groove 55*c* of the humidifying chamber 55 which is shown in FIG. 7 in the unit caps 51*a*. When the capping device 50 has only one unit cap 51*a*, the inlet 55*a* of the unit cap 51*a* may be coupled to the supply flow path 62*a*, and the outlet 55*b* of the unit cap 51*a* may be coupled to the recovery flow path 62*b*.

As shown in FIG. 11, the humidifying fluid accommodating section 61 accommodates the humidifying fluid L1a containing moisture for humidifying the space SP shown in FIG. 8. The humidifying fluid accommodating section 61 has a detecting portion 61*a* that detects a liquid surface in the humidifying fluid accommodating section 61. The detecting portion 61*a* has a first electrode 61*b* and a second electrode 61*c*.

The humidifying fluid L1a contains a conductive additive. The detecting portion 61*a* detects the liquid surface in the humidifying fluid accommodating section 61 with the electric resistance between the first electrode 61*b* and the second electrode 61*c*. When the liquid surface height of the humidifying fluid L1a accommodated in the humidifying fluid accommodating section 61 is higher than a first predetermined height H1 which is an example of the "predetermined height", conduction occurs between the first electrode 61*b* and the second electrode 61*c*. When the liquid surface height of the humidifying fluid L1a accommodated in the humidifying fluid accommodating section 61 is lower than the first predetermined height H1 and higher than a second predetermined height H2, there is no conduction between the first electrode 61*b* and the second electrode 61*c*. In this way, the detecting portion 61*a* can determine whether or not the liquid surface height of the humidifying fluid L1a is higher than the first predetermined height H1 since the output level is changed depending on whether the first electrode 61*b* is in contact with the liquid surface or not.

The reference 'when the liquid surface height of the humidifying fluid L1a exceeding the first predetermined height H1 is detected by the detecting portion 61*a*' means that the humidifying fluid L1a is sufficiently accommodated in the humidifying fluid accommodating section 61, that is, the humidifying fluid accommodating section 61 is fully filled with the humidifying fluid L1a. In the present embodiment, the full state of the humidifying fluid accommodating section 61 is detected. Not only the full state of the humidifying fluid accommodating section 61 may be detected, but also the empty state or the near-empty state of the humidifying fluid accommodating section 61 may be detected. Further, the method of detecting the liquid surface is not limited to the electrode method, and may be an optical method or a capacitance method.

The humidifying fluid accommodating section 61 has a second atmosphere communication passage 61*d* and a second moisture permeable membrane 61*e*. The second atmosphere communication passage 61*d* allows the humidifying fluid accommodating section 61 to communicate with the atmosphere. The second atmosphere communication passage 61*d* may have a labyrinthine capillary structure. The labyrinthine capillary structure refers to a tubular structure of conduits having a narrow, complicated, and meandering path to the extent that air can enter and exit but the ingress and egress of liquid is considerably restricted. The labyrinthine capillary structure suppresses evaporation of the liquid in the humidifying fluid accommodating section 61.

The second moisture permeable membrane 61*e* is provided at a coupling portion between the humidifying fluid accommodating section 61 and the second atmosphere communication passage 61*d*. Further, the second moisture permeable membrane 61*e* allows passing-through of gas from the inside of the humidifying fluid accommodating section 61 to the second atmosphere communication passage 61*d*, and restricts passing-through of liquid from the inside of the humidifying fluid accommodating section 61 to the second atmosphere communication passage 61*d*. In order to increase the efficiency of the passing-through of gas from the humidifying fluid accommodating section 61 to the second atmosphere communication passage 61*d*, it is desirable that the area of the second moisture permeable membrane 61*e* is large.

As shown in FIG. 11, the humidifying fluid circulation mechanism 60 included in the capping device 50 includes a first pump 63, which is an example of a pump capable of causing the humidifying fluid L1a to flow in the circulation path 62, and a first check valve 64, and a pressure control valve 65. The first pump 63 causes the fluid to flow in the circulation path 62. By driving the first pump 63, the liquid flowing through the supply flow path 62*a* is sent to the humidifying chamber 55 in the unit cap 51*a*.

The first check valve 64 allows the flow of liquid from the humidifying fluid accommodating section 61 side to the unit cap 51*a* side, and prevents the backflow of the liquid from the unit cap 51*a* side to the humidifying fluid accommodating section 61 side due to a water head difference. An on-off valve may be provided instead of the first check valve 64. By driving the first pump 63 when the on-off valve is open, the liquid may flow from the humidifying fluid accommodating section 61 side to the unit cap 51*a* side. Opening the valve of the on-off valve is called opening the valve. Further, closing the valve of the on-off valve is called closing the valve.

When the humidifying fluid accommodating section 61 side becomes a predetermined negative pressure, the pressure control valve 65 allows flow of the liquid from the unit cap 51*a* side to the humidifying fluid accommodating section 61 side and always prevents the liquid from flowing back from the humidifying fluid accommodating section 61 side to the unit cap 51*a* side. The pressure difference of the water head difference is controlled by the pressure control valve 65 such that the liquid does not flow from the unit cap 51*a* to the humidifying fluid accommodating section 61 due to the water head pressure.

As shown in FIG. 11, the humidifying fluid circulation mechanism 60 included in the capping device 50 includes a moisture supply portion 66 capable of supplying moisture L1b in the circulation path 62. The moisture supply portion 66 includes a moisture accommodating portion 66*a*, a moisture supply flow path 66*b*, a first on-off valve 66*c* which is an example of the on-off valve, and a second check valve 66*d*. The moisture accommodating portion 66*a* accommodates the moisture L1b that can be supplied into the circulation path 62. The moisture supply flow path 66*b* communicates with the circulation path 62. The first on-off valve 66*c* is configured to be able to open and close the moisture supply flow path 66*b*.

The moisture accommodating portion 66*a* has an outlet portion 66*f*. The moisture accommodating portion 66*a* communicates with the moisture supply flow path 66*b* at the outlet portion 61*g*. The moisture supply flow path 66*b* communicates with the circulation path 62 at a first merging portion 62*c* of the circulation path 62. That is, the moisture accommodating portion 66*a* and the circulation path 62 communicate with each other. It is desirable that the moisture accommodating portion 66*a* is configured to be replaceable.

The moisture L1b supplied from the moisture accommodating portion 66*a* into the circulation path 62 is moisture for replenishing the moisture evaporated from the humidifying fluid L1a. The moisture L1b is composed of pure water and a small amount of preservative.

By opening the first on-off valve 66*c*, the moisture accommodating portion 66*a* and the circulation path 62 communicate with each other by the moisture supply flow path 66*b*. The second check valve 66*d* allows the flow of the liquid from the moisture accommodating portion 66*a* side to the circulation path 62 side, and prevents the backflow of the liquid from the circulation path 62 side to the moisture accommodating portion 66*a* side due to the water head difference. The second check valve 66*d* may not be provided. When the second check valve 66*d* is not provided, by driving the first pump 63 when the first on-off valve 66*c* is open, the first pump 63 may cause the moisture L1b to flow from the moisture accommodating portion 66*a* side to the unit cap 51*a* side.

As shown in FIG. 11, the humidifying fluid circulation mechanism 60 included in the capping device 50 further includes a pressurized air supply section 67. The pressurized air supply section 67 is configured to be able to supply pressurized air into the circulation path 62. The pressurized air supply section 67 has a pressurized air supply path 67*a* communicating with the circulation path 62, a second on-off valve 67*b*, and a second pump 67*c*. By opening the second on-off valve 67*b*, the second pump 67*c* and the circulation path 62 communicates with each other by the pressurized air supply path 67*a*. The second pump 67*c* is, for example, a pressurizing pump. The second pump 67*c* applies pressure to the atmosphere to obtain pressurized air, and supplies the pressurized air to the pressurized air supply path 67*a*.

In the circulation path 62, the pressurized air supply section 67 may not be provided downstream of the first pump 63, and an atmosphere supply portion may be provided upstream of the first pump 63 and downstream of the first merging portion 62*c*. The atmosphere supply portion may have an atmosphere communication passage that communicates with the atmosphere and an on-off valve. Then, the atmosphere may be sent out to the circulation path 62 by the first pump 63 in a state where the circulation path 62 and the atmosphere communicates with each other through the atmosphere communication passage by opening the on-off valve. That is, in the circulation path 62 in which the humidifying fluid L1a flows, the capping device 50 may have an atmosphere supply portion for supplying the atmosphere to the circulation path 62 between the first merging portion 62*c* where the moisture supply portion 66 and the circulation path 62 merge and the inlet 55*a* of the unit cap 51*a*. The capping device 50 may further have a pump for pumping the atmosphere into the circulation path 62.

About Configuration of Waste Liquid Recovery Mechanism Included in Capping Device As shown in FIG. 11, the waste liquid recovery mechanism 80 included in the capping device 50 includes a waste liquid recovery path 81, a third pump 82, a buffer chamber 83, a fourth pump 84, a third atmosphere communication passage 85, and a waste liquid accommodating portion 86.

The waste liquid recovery path 81 includes a first waste liquid recovery path 81*a* and a second waste liquid recovery path 81*b*. The first waste liquid recovery path 81*a* communicates with the space SP formed by the recess 57 in the unit cap 51*a*, which is shown in FIG. 8, in the discharge hole 56*b* of the unit cap 51*a*. Then, the first waste liquid recovery path 81*a* allows the space SP and the waste liquid accommodating portion 86 to communicate with each other through the buffer chamber 83. Further, the second waste liquid recovery path 81*b* communicates with the wiper carriage 41 at a waste liquid outlet 43 of the wiper carriage 41. Then, the second waste liquid recovery path 81*b* allows the wiper carriage 41 and the waste liquid accommodating portion 86 to communicate with each other.

At the time of flushing or cleaning, the liquid is discharged as waste liquid L2 from the nozzle 22 of the liquid ejecting head 21. The waste liquid L2, which is an example of the liquid, is recovered from the unit cap 51*a* and flows to the first waste liquid recovery path 81*a*. Further, at the time of wiping, the liquid adhering to the nozzle surface 23 of the liquid ejecting head 21 is wiped off and recovered in the wiper carriage 41 as waste liquid L2. The waste liquid L2 is recovered from the wiper carriage 41 and flows to the second waste liquid recovery path 81*b*. The waste liquid L2 recovered by flushing or cleaning and the waste liquid L2 recovered by wiping are sent to the waste liquid accommodating portion 86 by the third pump 82. Then, the waste liquid L2 is accommodated in the waste liquid accommodating portion 86.

As shown in FIG. 3, the cap unit 51 included in the capping device 50 of the present embodiment has five unit caps 51*a* shown in FIG. 6. That is, in the capping device 50, a plurality of unit caps 51*a* are arranged side by side, and each of the five unit caps 51*a* has the discharge hole 56*b*. Therefore, in the present embodiment, the five discharge holes 56*b* are coupled to the first waste liquid recovery path 81*a*, and the five discharge holes 56*b* and the waste liquid accommodating portion 86 communicate with each other by the first waste liquid recovery path 81*a*. When the capping device 50 has only one unit cap 51*a*, only the discharge hole 56*b* of the unit cap 51*a* may be coupled to the first waste liquid recovery path 81*a*.

As shown in FIG. 11, in the present embodiment, the fourth pump 84 is a depressurization pump. The fourth pump 84 lowers the air pressure in the buffer chamber 83 by discharging the air in the buffer chamber 83 to the outside of the buffer chamber 83 through the third atmosphere communication passage 85. Thereby, the waste liquid L2 discharged from the nozzles 22 of the liquid ejecting head 21 into the unit cap 51*a* at the time of flushing or cleaning can easily flow into the buffer chamber 83 through the first waste liquid recovery path 81*a*. The buffer chamber 83, the fourth pump 84, and the third atmosphere communication passage 85 may not be provided.

As shown in FIG. 11, the cap unit 51 having the unit cap 51*a* has an atmosphere opening mechanism 58. The atmosphere opening mechanism 58 has a first atmosphere communication passage 58*a* and a third on-off valve 58*b*.

The first atmosphere communication passage 58*a* allows each atmosphere communication hole 56*a* of the unit cap 51*a* and the atmosphere to communicate with each other in the cap unit 51. The third on-off valve 58*b* is an on-off valve capable of opening and closing the first atmosphere communication passage 58*a*. In the present embodiment, the first atmosphere communication passage 58*a* on the side of the atmosphere is open. The capping device 50 is configured such that, when the cap unit 51 moves in the fourth direction D4 from the maintenance position indicated by a two-dot chain line in FIG. 11 and positioned at the retreat position indicated by a solid line in FIG. 11, the released portion hits a wall (not shown), and the wall blocks the first atmosphere communication passage 58*a*. That is, the movement of the cap unit 51 makes the third on-off valve 58*b* open and close. At the time of flushing or cleaning, the liquid ejecting head 21 discharges the liquid into the unit cap 51*a* in a state where the first atmosphere communication passage 58*a* is open.

About Electrical Configuration of Liquid Ejecting Apparatus

Figure 12:
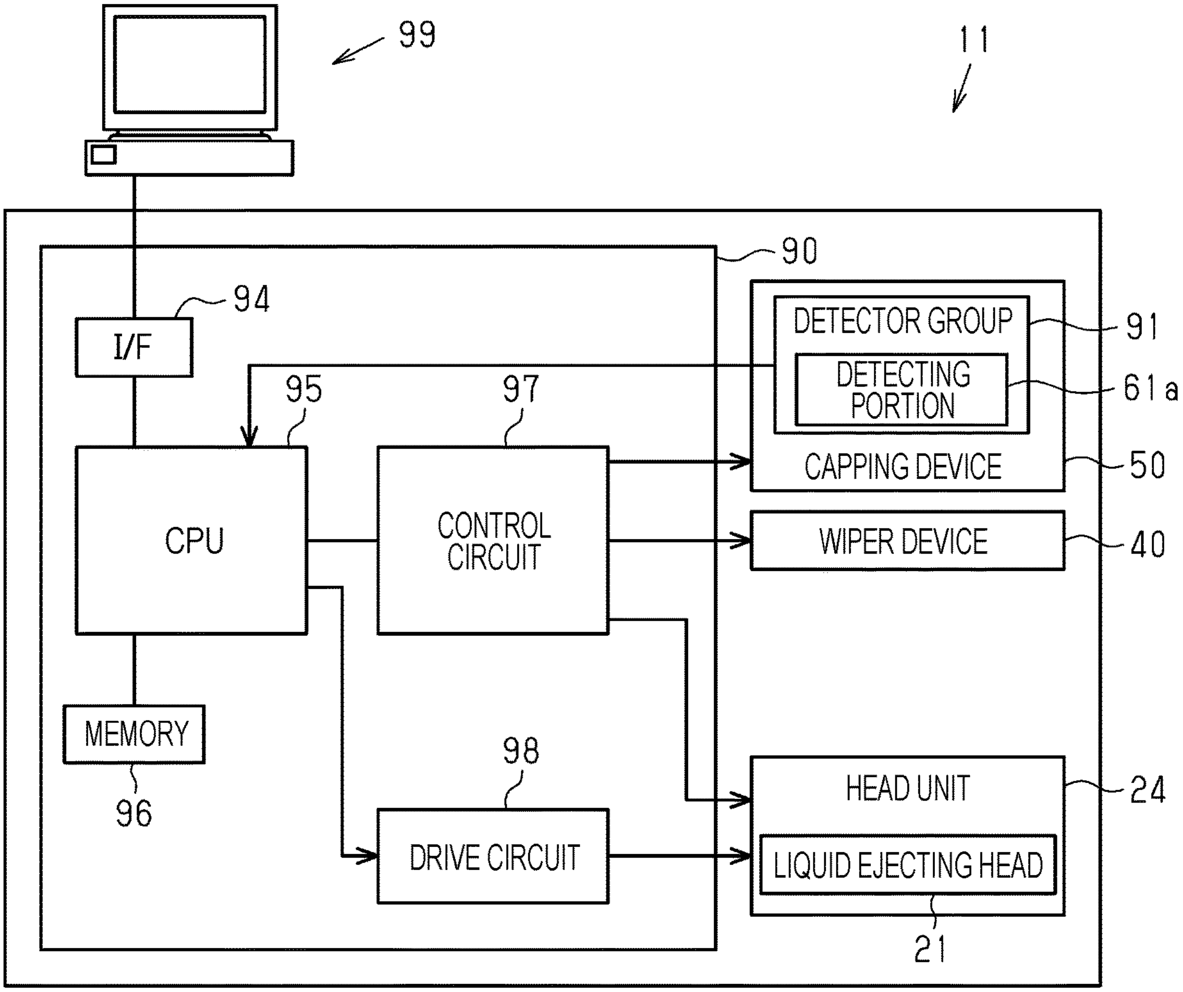
FIG. 12 is a block diagram showing an electrical configuration of the liquid ejecting apparatus.

As shown in FIG. 12, the liquid ejecting apparatus 11 includes the head unit 24, a wiper device 40, and a controller 90 that controls the capping device 50. The capping device 50 includes a detector group 91 controlled by the controller 90. The detector group 91 includes a detecting portion 61*a* that detects the liquid surface in the humidifying fluid accommodating section 61. The detecting portion 61*a* outputs a detection result to the controller 90.

The controller 90 includes an interface portion 94, a CPU 95, a memory 96, a control circuit 97, and a drive circuit 98. The interface portion 94 transmits and receives data between a computer 99, which is an external device, and the liquid ejecting apparatus 11. The drive circuit 98 generates a drive signal for driving an actuator of the liquid ejecting head 21.

The CPU 95 is an arithmetic processing unit. The memory 96 is a storage device that secures an area or a work area for storing a program of the CPU 95, and has a storage element such as a RAM or an EEPROM. The CPU 95 controls the head unit 24, the wiper device 40, the capping device 50, and the like via the control circuit 97 according to the program stored in the memory 96.

About Circulation Operation of Humidifying Fluid

A circulation operation in a maintenance method for the capping device will be described.

Figure 13:
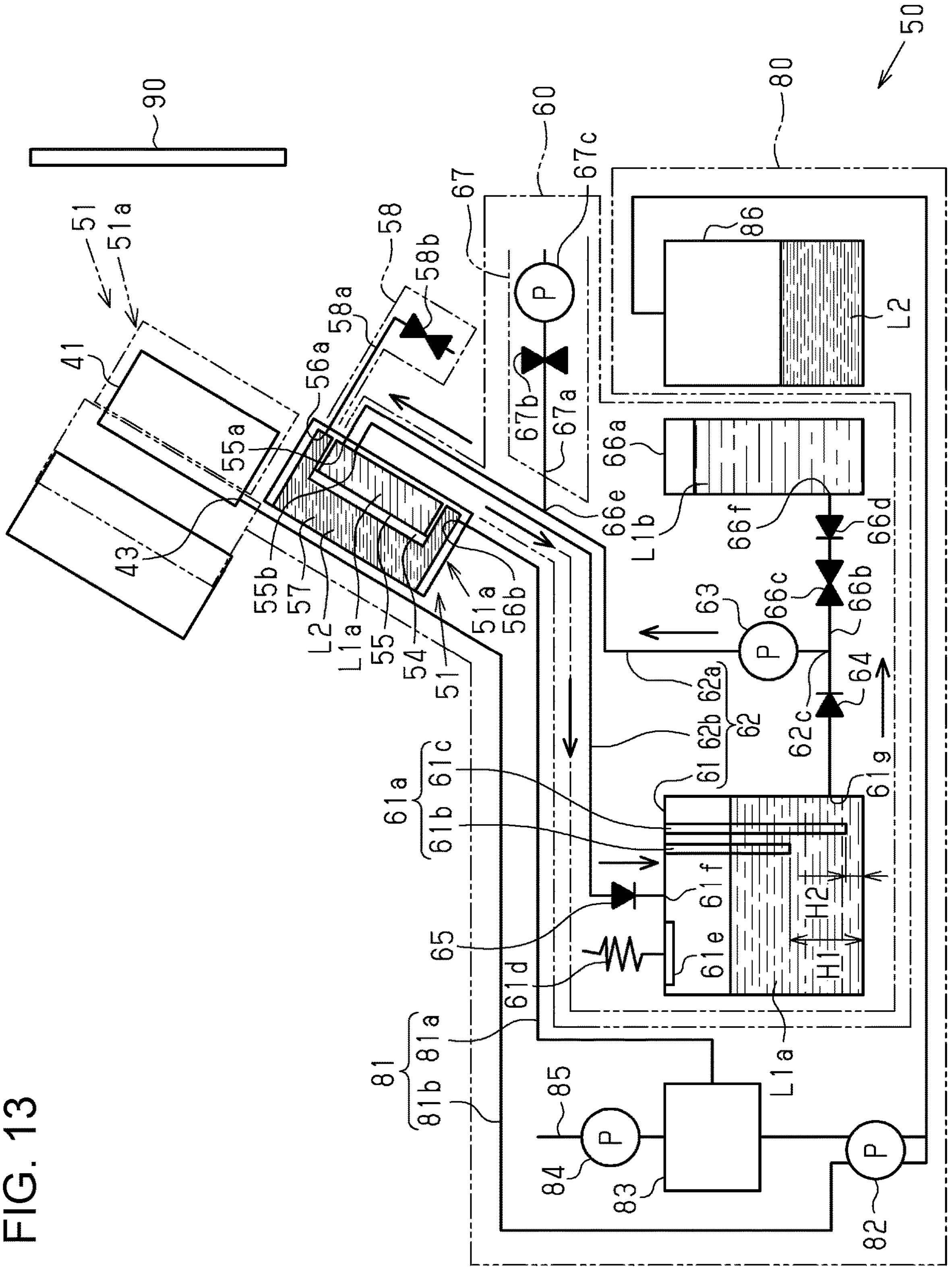
FIG. 13 is a schematic view showing a state of a humidifying fluid when a circulation operation is executed.

As shown in FIG. 13, the capping device 50 performs the circulation operation. In the circulation operation, the controller 90 controls the humidifying fluid circulation mechanism 60 to cause the humidifying fluid L1a in the circulation path 62 to flow in the direction of a solid arrow shown in FIG. 13 in a state where the first on-off valve 66*c* is closed. Then, the controller 90 checks the amount of moisture evaporated from the humidifying fluid L1a.

The circulation path is constituted by the humidifying fluid accommodating section 61 accommodating the humidifying fluid L1a containing moisture for humidifying the space SP shown in FIG. 8, the supply flow path 62*a* through which the humidifying fluid accommodating section 61 and the unit cap 51*a* communicate with each other, the recovery flow path 62*b* allowing the unit cap 51*a* and the humidifying fluid accommodating section 61 to communicate with each other, and the humidifying chamber 55 in the unit cap 51*a* shown in FIG. 8. It is desirable that the internal pressure in the unit cap 51*a* at the time of the circulation operation be set to be equal to or lower than the meniscus pressure resistance of the liquid ejecting head 21 by adjusting the circulation flow rate by the first pump 63.

As shown in FIG. 13, in the circulation operation of the humidifying fluid L1a, the humidifying fluid L1a flows through the circulation path 62 in the direction of the solid arrow shown in FIG. 13 to circulate in the circulation path. By the controller 90 causing the humidifying fluid L1a to flow in the circulation path 62, the humidifying fluid L1a flows through the single-way, winding flow path having the complicated, meandering path shown in FIG. 7 in the humidifying chamber 55. Moisture from the humidifying fluid L1a evaporates mainly in the humidifying chamber 55 in the unit cap 51*a*. Then, for example, at the timing when the humidifying fluid L1a in the humidifying chamber 55 flows into the humidifying fluid accommodating section 61 and the humidifying fluid L1a in the humidifying fluid accommodating section 61 flows into the humidifying chamber 55, the controller 90 stops the flow of the humidifying fluid L1a and checks the amount of moisture evaporated from the humidifying fluid L1a. That is, the purpose of the circulation operation in the maintenance method for the capping device includes checking the amount of moisture evaporated from the humidifying fluid L1a.

As shown in FIG. 13, the controller 90 manages the time by a timer or the like and regularly executes the circulation operation. For example, when the liquid ejecting apparatus 11 is powered on, the controller 90 executes the circulation operation once a day. At the end of a flow of the circulation operation described later, the controller 90 acquires information on the liquid surface height in the humidifying fluid accommodating section 61 from the detecting portion 61*a* in order to check the amount of moisture evaporated from the humidifying fluid L1a. When the amount of moisture evaporated in the unit cap 51*a* is large, the liquid surface height in the humidifying fluid accommodating section 61 is low. The amount of moisture evaporated increases during the time when the unit cap 51*a* is positioned at the retreat position shown in FIG. 13, that is, the time when the unit cap 51*a* does not form the space SP surrounding the openings 22*a* of the nozzles 22 shown in FIG. 8. Therefore, the controller 90 may manage the time when the unit cap 51*a* is in the retreat position and perform the circulation operation for each temperature and humidity environment. The controller 90 may execute the circulation operation even before the liquid ejecting apparatus 11 is installed and the first recording is made on the medium M, before the cap unit 51 is replaced with a new cap unit 51 and the first recording is made on the medium M, or before the moisture accommodating portion 66*a* is replaced with the full moisture accommodating portion 66*a* and the first recording is made on the medium M.

In order to reduce the frequency of circulation operation, it is desirable that the humidifying fluid accommodating section 61 has a large area of the liquid surface as compared with the depth inside the humidifying fluid accommodating section 61. Thereby, the change in the height of the liquid surface can be reduced when the amount of the liquid in the humidifying fluid accommodating section 61 changes due to the evaporation of the moisture contained in the humidifying fluid L1a. Further, in order to make as gentle as possible the change in the concentration of the humidifying fluid L1a due to the evaporation of the moisture contained in the humidifying fluid L1a from the humidifying fluid L1a, it is desirable that the volume of the humidifying fluid accommodating section 61 is as large as possible within the size of the liquid ejecting apparatus 11.

Figure 14:
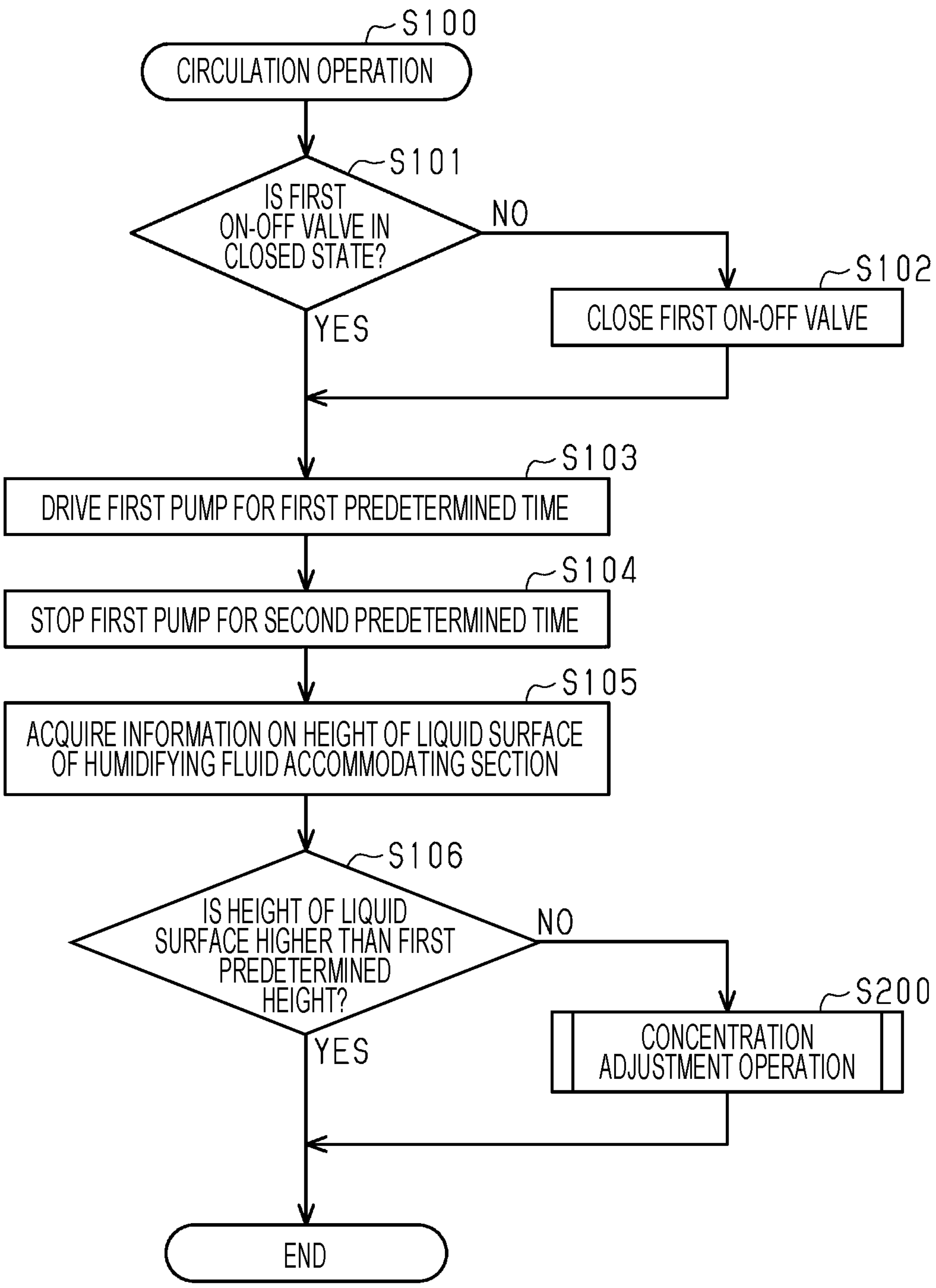
FIG. 14 is a flowchart showing the circulation operation.

Next, with reference to a flowchart shown in FIG. 14, controls executed by the controller 90 in respective steps will be described in order for a flow of the circulation operation in the maintenance method for the capping device.

In step S101, the controller 90 determines whether or not the first on-off valve 66*c* is in the closed state. When the first on-off valve 66*c* is in the closed state, the flow proceeds to step S103. When the first on-off valve 66*c* is in the open state, the flow proceeds to step S102. Then, in step S102, the controller 90 closes the first on-off valve 66*c*.

In step S103, the controller 90 drives the first pump 63 for a first predetermined time T1 in a state where the first on-off valve 66*c* is closed. Thereby, as shown in FIG. 13, the humidifying fluid L1a flows in the circulation path 62 in the direction of the solid arrow shown in FIG. 13.

In step S104, the controller 90 stops the first pump 63 for a second predetermined time T2 in a state where the first on-off valve 66*c* is closed. Thereby, the liquid surface state in the humidifying fluid accommodating section 61 is stabilized. In addition, in order to shorten the time until the liquid surface state stabilizes, the area of the liquid surface is made large as compared with the depth inside the humidifying fluid accommodating section 61, and thus it is desirable to reduce the amount of change in the height of the liquid surface when the amount of liquid in the humidifying fluid accommodating section 61 changes.

In step S105, the controller 90 acquires information on the height of the liquid surface in the humidifying fluid accommodating section 61 from the detecting portion 61*a*. Then, in step S106, the controller 90 determines whether or not the height of the liquid surface is higher than the first predetermined height H1. When the height of the liquid surface is higher than the first predetermined height H1, the flow ends.

When the height of the liquid surface is lower than the first predetermined height H1, the flow proceeds to step S200. Then, in step S200, the controller 90 executes a subroutine of a concentration adjustment operation described later. When the subroutine of the concentration adjustment operation is completed, the controller 90 ends the flow.

About Concentration Adjustment Operation of Humidifying Fluid

The concentration adjustment operation in the maintenance method for the capping device will be described.

Figure 15:
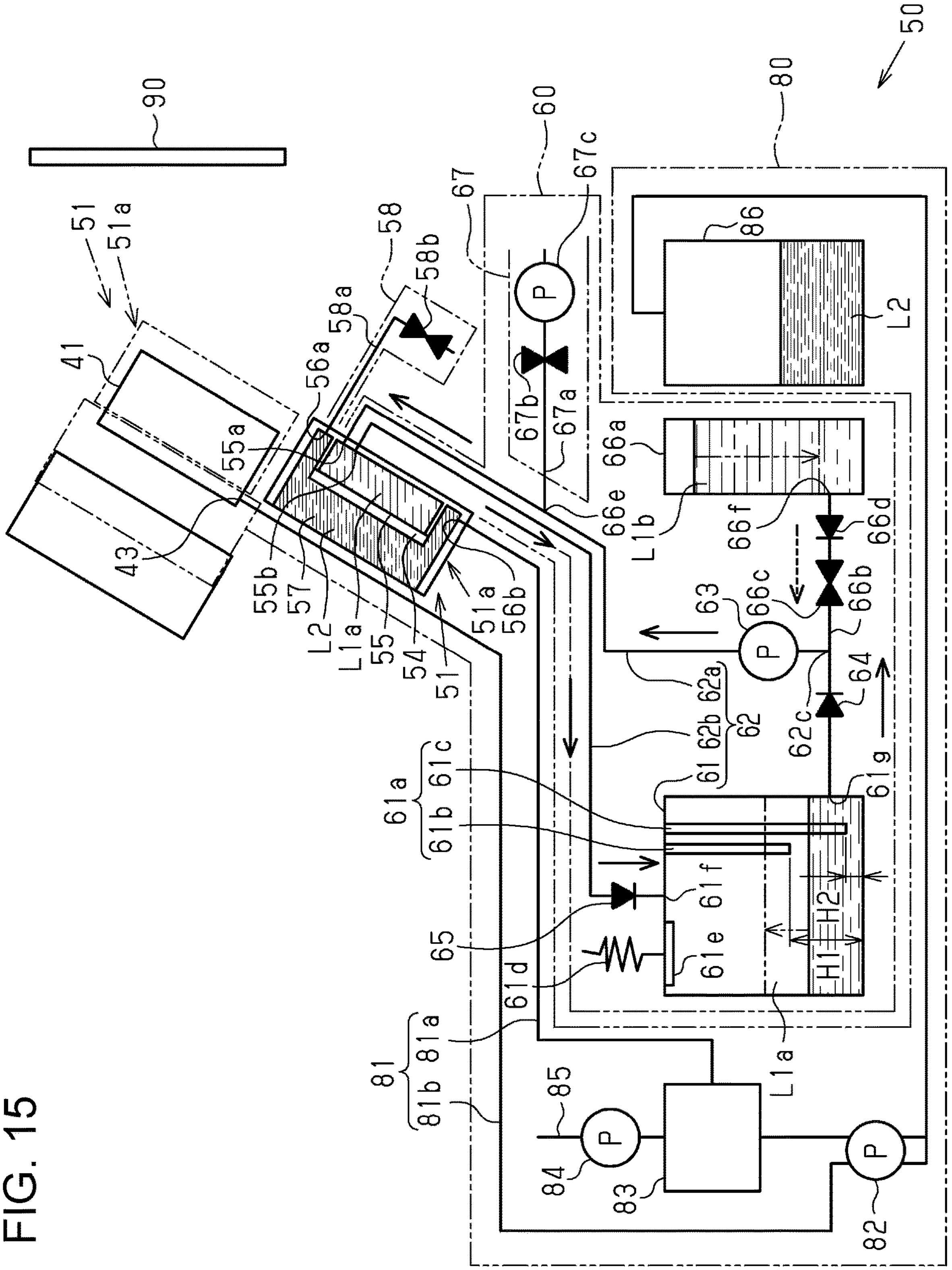
FIG. 15 is a schematic view showing a state of the humidifying fluid when a concentration adjustment operation is executed.

As shown in FIG. 15, the capping device 50 performs the concentration adjustment operation. In the concentration adjustment operation, the controller 90 controls the humidifying fluid circulation mechanism 60 to cause the humidifying fluid L1a in the circulation path 62 to flow in the direction of a solid arrow shown in FIG. 15 in a state where the first on-off valve 66*c* is open. At this time, since the first on-off valve 66*c* is in the open state, the moisture L1b in the moisture supply portion 66 flows in the direction of a broken line arrow shown in FIG. 15 and is supplied into the circulation path 62. That is, the concentration adjustment operation in the maintenance method for the capping device includes supplying the moisture L1b into the circulation path 62 by the moisture supply portion 66 and causing the humidifying fluid L1a to flow in the circulation path 62.

That is, the concentration adjustment operation is executed by the controller 90 when, at the end of the flow of the circulation operation described above, it is detected by the detecting portion 61*a* that the height of the liquid surface in the humidifying fluid accommodating section 61 when the controller 90 acquires information on the height of the liquid surface in the humidifying fluid accommodating section 61 is lower than the first predetermined height H1, which is an example of the "predetermined height". That is, when the concentration adjustment operation is performed when the detecting portion 61*a* detects that the liquid surface in the humidifying fluid accommodating section 61 is below the predetermined height, the capping device 50 supplies the moisture L1b in the moisture accommodating portion 66*a* into the circulation path 62 until it is detected that the liquid surface is or is above the predetermined height. Then, thereafter, the humidifying fluid L1a is caused to flow in the circulation path 62.

Moisture evaporates from the humidifying fluid L1a in the unit cap 51*a*, and the humidifying fluid L1a circulates in the circulation path 62 by the above-mentioned circulation operation. Thereby, the moisture in the humidifying fluid accommodating section 61 is also reduced, and the height of the liquid surface in the humidifying fluid accommodating section 61 is lowered. As the evaporation progresses further, the height of the liquid surface in the humidifying fluid accommodating section 61 becomes lower than the first predetermined height H1. The first predetermined height H1 is set such that the concentration of the humidifying fluid L1a at this time becomes larger than the predetermined concentration. By the controller 90 executing the concentration adjustment operation, the moisture L1b in the moisture accommodating portion 66*a* is supplied into the circulation path 62 such that the liquid surface thereof becomes higher than the first predetermined height H1. Thereby, substantially the same amount of moisture as the moisture evaporated in the unit cap 51*a* is supplied into the circulation path 62, and the concentration of the humidifying fluid L1a becomes smaller than the predetermined concentration. That is, the concentration of the humidifying fluid L1a returns to the concentration of the humidifying fluid L1a before the moisture evaporates in the unit cap 51*a*.

In the concentration adjustment operation, the controller 90 opens the first on-off valve 66*c* and supplies the moisture L1b in the moisture accommodating portion 66*a* into the circulation path 62. Then, when the controller 90 determines that the height of the liquid surface in the humidifying fluid accommodating section 61 is higher than the first predetermined height H1, the first on-off valve 66*c* is closed and the above-mentioned circulation operation is performed to allow the humidifying fluid L1a in the humidifying fluid accommodating section 61 to flow in the circulation path 62. That is, the concentration adjustment operation in the maintenance method for the capping device includes opening the first on-off valve 66*c*, which is an example of the on-off valve, when the moisture L1b in the moisture accommodating portion 66*a* is supplied into the circulation path 62, and closing the first on-off valve 66*c* when the humidifying fluid L1a is made to flow in the circulation path 62.

In the first merging portion 62*c* of the circulation path 62, the humidifying fluid L1a flowing from the humidifying fluid accommodating section 61 and the moisture L1b flowing from the moisture supply portion 66 merge. When the volume of the moisture L1b flowing from the moisture supply portion 66 is larger than the volume of the humidifying fluid L1a flowing from the humidifying fluid accommodating section 61, the rate of change in the height of the liquid surface in the humidifying fluid accommodating section 61 becomes faster and the liquid surface detection variation becomes large, which makes it difficult to detect the height of the liquid surface at the right time. Therefore, in the first merging portion 62*c*, it is desirable that the pressure loss of the flow path close to the moisture supply portion 66 is set to be the same as or larger than the pressure loss of the flow path close to the humidifying fluid accommodating section 61.

Next, with reference to a flowchart shown in FIG. 16, controls executed by the controller 90 in respective steps will be described in order for a flow of the concentration adjustment operation in the maintenance method for the capping device.

In step S201, the controller 90 determines whether or not the first on-off valve 66*c* is in the open state. When the first on-off valve 66*c* is in the open state, the flow proceeds to step S203. When the first on-off valve 66*c* is in the closed state, the flow proceeds to step S202, and in step S202, the controller 90 opens the first on-off valve 66*c*.

In step S203, the controller 90 drives the first pump 63 for a third predetermined time T3 in a state where the first on-off valve 66*c* is open. Thereby, as shown in FIG. 15, the humidifying fluid L1a flows in the circulation path 62 in the direction of the solid arrow shown in FIG. 15. Then, the moisture L1b flows in the moisture supply flow path 66*b* in the direction of the arrow shown by the broken line shown in FIG. 15, and merges with the humidifying fluid L1a at the first merging portion 62*c*. Then, the merged humidifying fluid L1a and the moisture L1b become the humidifying fluid L1a in which the amount of moisture is increased, which flows from the first merging portion 62*c* toward the unit cap 51*a*, flows in the circulation path 62 in the direction of the solid arrow shown in FIG. 15, and flows into the humidifying fluid accommodating section 61. Then, the liquid surface in the humidifying fluid accommodating section 61 becomes higher than the first predetermined height H1.

In step S204, the controller 90 acquires information on the height of the liquid surface in the humidifying fluid accommodating section 61 from the detecting portion 61*a*. Then, in step S205, the controller 90 determines whether or not the height of the liquid surface is higher than the first predetermined height H1. When the height of the liquid surface is higher than the first predetermined height H1, the flow proceeds to step S206. When the height of the liquid surface is lower than the first predetermined height H1, the flow proceeds to step S207.

In step S206, the controller 90 closes the first on-off valve 66*c* and the flow proceeds to the subroutine of the above-mentioned circulation operation in step S100. When the controller 90 ends the subroutine of the circulation operation, the controller 90 ends the flow.

In step S207, the controller 90 determines that the moisture L1b in the moisture accommodating portion 66*a* is exhausted, and in step S400, the controller 90 executes a subroutine of the operation before replacing the moisture accommodating portion, which will be described later. That is, when the amount of the moisture L1b in the moisture accommodating portion 66*a* reaches the amount at which it is determined that the moisture accommodating portion 66*a* is required to be replaced, the capping device 50 executes the operation before replacing the moisture accommodating portion. The controller 90 ends the flow when the subroutine of the operation before replacing the moisture accommodating portion is ended.

In steps S203 to S205, the controller 90 may drive the first pump 63 while acquiring information on the height of the liquid surface in the humidifying fluid accommodating section 61 from the detecting portion 61*a* in a state where the first on-off valve 66*c* is open, and may stop the first pump 63 when the height of the liquid surface is higher than the first predetermined height H1. Then, when the third predetermined time T3 elapses after driving the first pump 63, in step S207, the controller 90 may determine that the moisture L1b in the moisture accommodating portion 66*a* is exhausted when it is detected by the detecting portion 61*a* that the height of the liquid surface is lower than the first predetermined height H1.

About Cap Replacement Preparation Operation

The cap replacement preparation operation in the maintenance method for the capping device will be described.

The cap replacement preparation operation is an operation performed by the capping device 50 when the cap is replaced. Before the cap is replaced, the humidifying fluid L1a in the cap is recovered. In the capping device 50 of the present embodiment, when the cap is replaced, the cap unit 51 shown in FIG. 3 is replaced. The capping device 50 may be configured such that the unit cap 51*a* is replaced when the cap is replaced.

Figure 17:
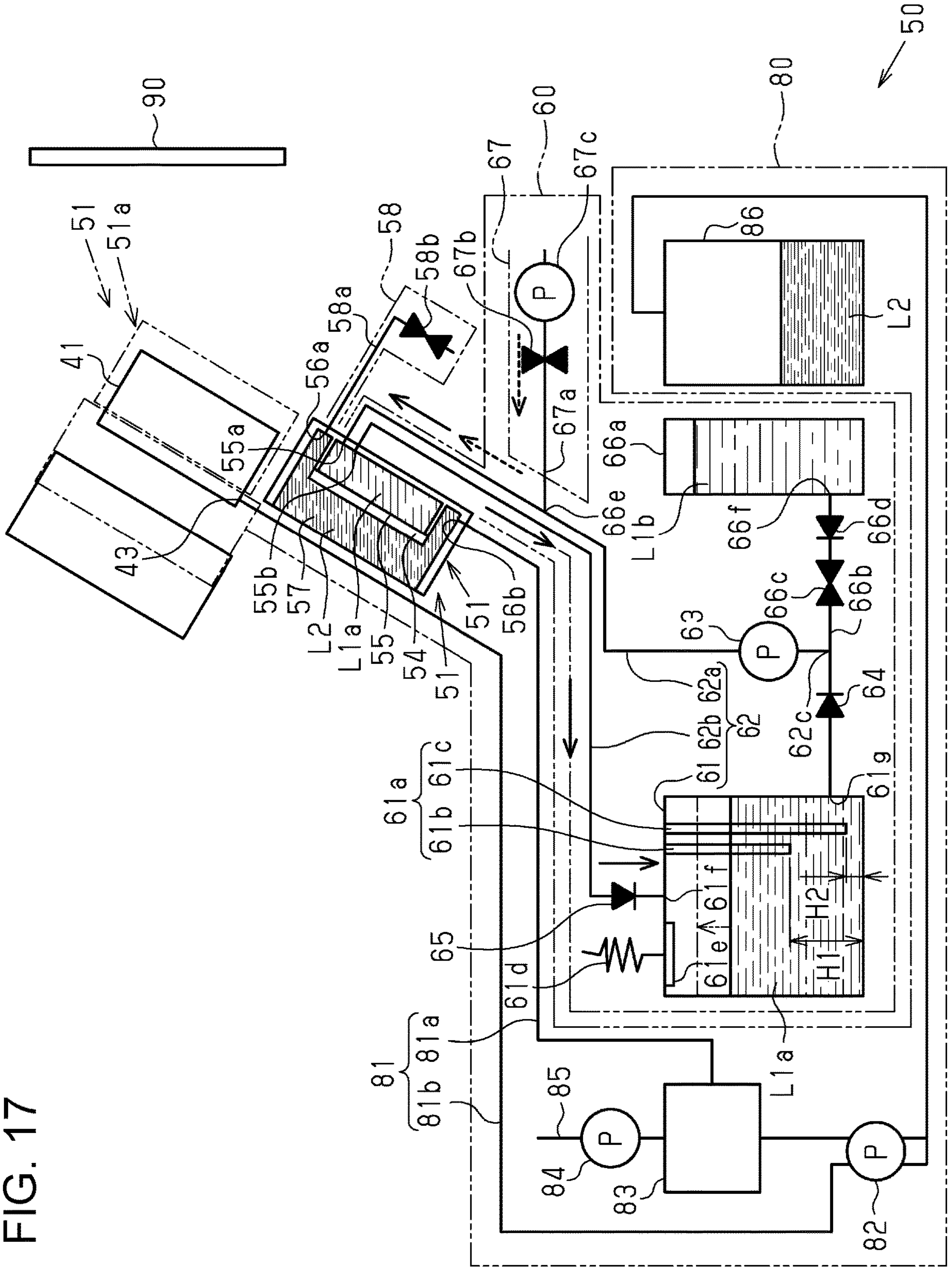
FIG. 17 is a schematic view showing a state of the humidifying fluid when a cap replacement preparation operation is executed.

As shown in FIG. 17, the capping device 50 performs the cap replacement preparation operation. At the time of the cap replacement preparation operation, in a state where the first on-off valve 66*c* is closed and when the second on-off valve 67*b* is open, the controller 90 controls the pressurized air supply section 67 of the humidifying fluid circulation mechanism 60 to cause pressurized air to flow in the pressurized air supply path 67*a* in the direction of the broken line arrow shown in FIG. 17. In this case, by the second on-off valve 67*b* in the valve open state, the humidifying fluid L1a in the circulation path 62 flows in the direction of the solid arrow shown in FIG. 17, and the pressurized air is supplied into the circulation path 62.

By the pressurized air supply section 67 continuing to supply the pressurized air into the circulation path 62, the humidifying fluid L1a in the flow path from the second merging portion 66*e* to the inlet portion 61*f* in the circulation paths formed by the circulation path 62 is pushed into the humidifying fluid accommodating section 61. Then, the flow path from the second merging portion 66*e* to the inlet portion 61*f* is filled with air. Thereby, the humidifying fluid L1a in the unit cap 51*a* is recovered in the humidifying fluid accommodating section 61. That is, the cap replacement preparation operation in the maintenance method for the capping device is an operation for supplying the pressurized air from the pressurized air supply section 67 into the unit cap 51*a*, which is an example of the cap, to discharge the humidifying fluid L1a in the unit cap 51*a* to the humidifying fluid accommodating section 61 and supply the pressurized air into the unit cap 51*a*.

Since the moisture in the humidifying fluid L1a evaporates in the unit cap 51*a*, the concentration of the humidifying fluid L1a in the unit cap 51*a* is high. Thereby, when the humidifying fluid L1a in the unit cap 51*a* is recovered in the humidifying fluid accommodating section 61, the concentration of the humidifying fluid L1a in the humidifying fluid accommodating section 61 increases. Further, when the humidifying fluid L1a in the unit cap 51*a* is recovered in the humidifying fluid accommodating section 61, a small amount of the humidifying fluid L1a having a high concentration remains in the unit cap 51*a*. Thereby, when the humidifying fluid L1a is replenished with moisture L1b next time, the concentration of the humidifying fluid L1a in the humidifying fluid accommodating section 61 decreases. In order to reduce the change in the concentration of the humidifying fluid L1a, it is desirable that the volume of the humidifying fluid accommodating section 61 is as large as possible within the size of the liquid ejecting apparatus 11.

Figure 18:
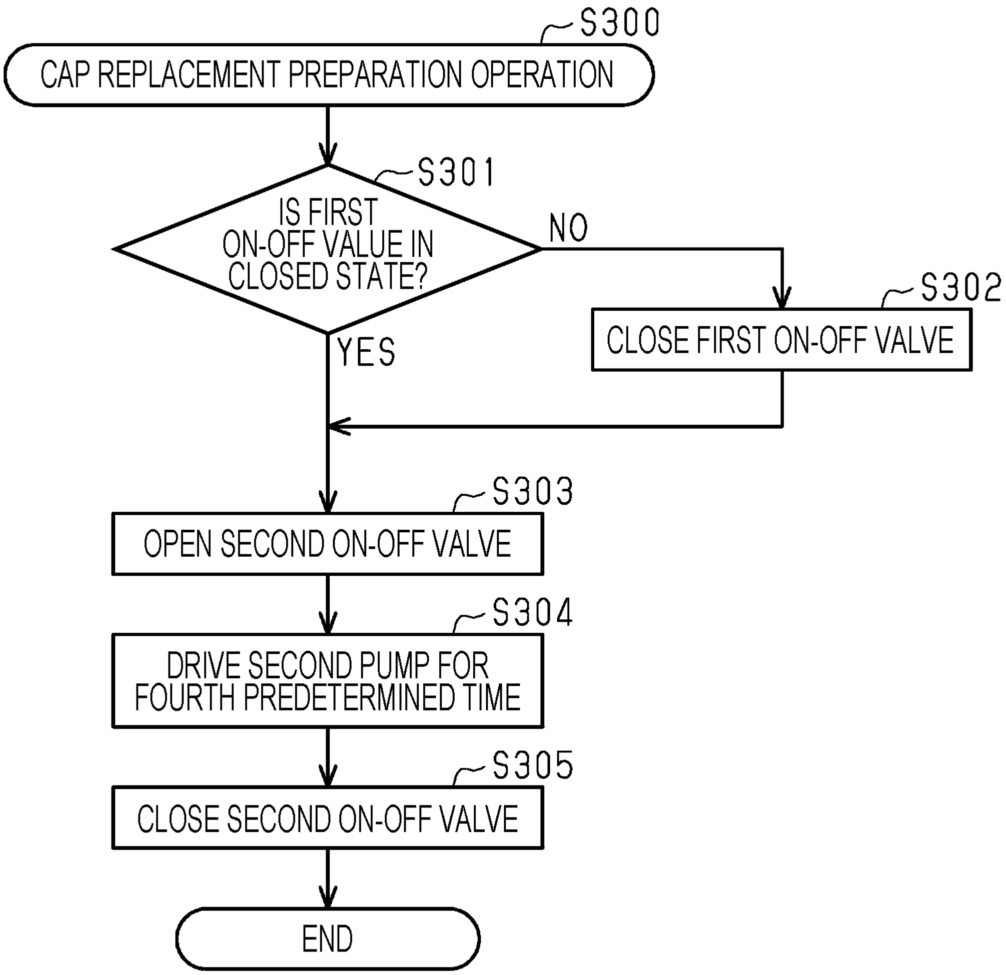
FIG. 18 is a flowchart showing the cap replacement preparation operation.

Next, with reference to a flowchart shown in FIG. 18, controls executed by the controller 90 in respective steps will be described in order for a flow of the cap replacement preparation operation in the maintenance method of the capping device.

In step S301, the controller 90 determines whether or not the first on-off valve 66*c* is in the closed state. When the first on-off valve 66*c* is in the closed state, the flow proceeds to step S303. When the first on-off valve 66*c* is in the open state, the flow proceeds to step S302. Then, in step S302, the controller 90 closes the first on-off valve 66*c*.

In step S303, the controller 90 opens the second on-off valve 67*b*. Then, in step S304, the controller 90 drives the second pump 67*c* for a fourth predetermined time T4 in a state where the first on-off valve 66*c* is closed and the second on-off valve 67*b* is open. Thereby, the humidifying fluid L1a in the unit cap 51*a* is recovered in the humidifying fluid accommodating section 61. Then, in step S305, the controller 90 closes the second on-off valve 67*b* and ends the flow.

Operation Before Replacing Moisture Accommodating Portion

The operation before replacing the moisture accommodating portion in the maintenance method for the capping device will be described.

Figure 19:
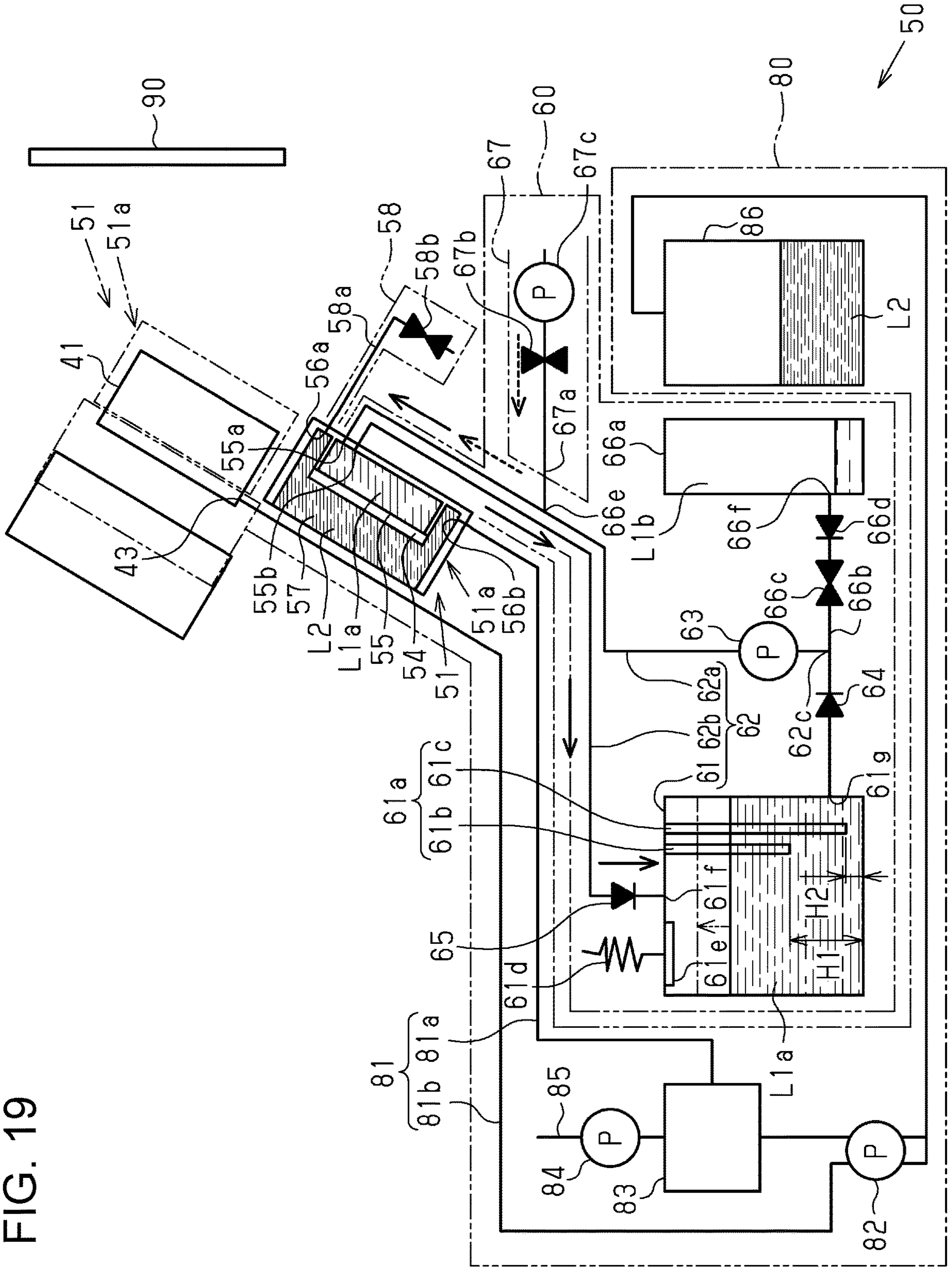
FIG. 19 is a schematic view showing a state of a humidifying fluid when an operation before replacing a moisture accommodating portion is executed.

As shown in FIG. 19, the capping device 50 performs the operation before replacing the moisture accommodating portion. The operation before replacing the moisture accommodating portion is an operation executed by the controller 90 when the amount of the moisture L1b in the moisture accommodating portion 66*a* reaches an amount at which the determination is to be made that replacement of the moisture accommodating portion 66*a* is required. In the present embodiment, when the first pump 63 is driven by for the third predetermined time T3 in the above-mentioned concentration adjustment operation, the controller 90 determines that the moisture in the moisture accommodating portion 66*a* is exhausted when it is detected by the detecting portion 61*a* that the height of the liquid surface in the humidifying fluid accommodating section 61 is lower than the first predetermined height H1. That is, when the concentration of the humidifying fluid L1a in the circulation path 62 cannot be returned to the concentration before the moisture evaporates in the unit cap 51*a*, the controller 90 determines that the moisture accommodating portion 66*a* is required to be replaced.

When it is determined that the moisture accommodating portion 66*a* is required to be replaced, the controller 90 executes an operation such as the cap replacement preparation operation described above. Then, after the humidifying fluid L1a in the unit cap 51*a* is recovered, until the moisture accommodating portion 66*a* is replaced, a first parameter table for flushing is switched to a second parameter table when the moisture L1b in the moisture accommodating portion 66*a* is exhausted.

The parameter table is a table in which the conditions and the number of times flushing is performed are described, and flushing is performed based on this table. When the humidifying fluid L1a in the unit cap 51*a* is recovered, the space SP in the unit cap 51*a* is not humidified by the humidifying fluid L1a, and accordingly, the controller 90 executes empty ejection, which is an ejection of a liquid not related to printing, to the space SP in the unit cap 51*a* to humidify the nozzles 22. Therefore, the conditions and the number of times of flushing are changed to parameters suitable for humidifying the nozzles 22.

In summary, the operation before replacing the moisture accommodating portion includes the above-mentioned cap replacement preparation operation, and humidifying the nozzles 22 by performing, by the capping device 50, the empty ejection, which is the ejection of the liquid not related to printing, from liquid ejecting head 21 to the space SP in the unit cap 51*a*, which is an example of the cap, until the moisture accommodating portion 66*a* is replaced.

Until the moisture accommodating portion 66*a* is replaced, the above-mentioned circulation operation that has been performed regularly up until then is not executed. When the moisture accommodating portion 66*a* is replaced, the controller 90 starts the above-mentioned concentration adjustment operation after returning the second parameter table to the first parameter table before the parameter table is switched. Then, thereafter, the above-mentioned circulation operation is also regularly executed.

Figure 20:
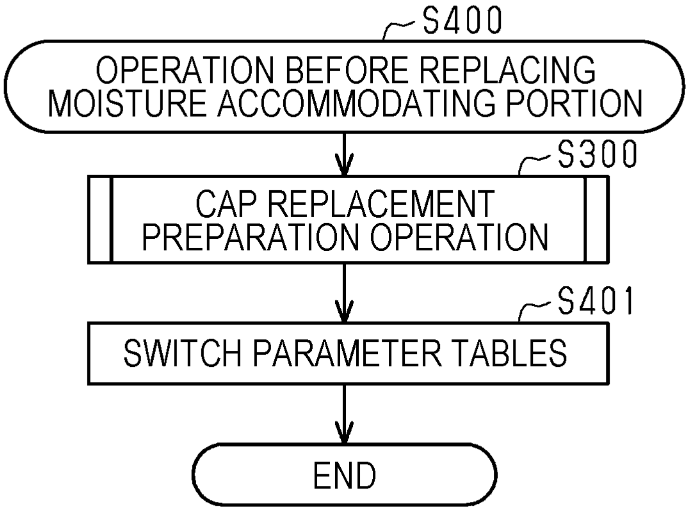
FIG. 20 is a flowchart showing the operation before replacing a moisture accommodating portion.

Next, with reference to a flowchart shown in FIG. 20, controls executed by the controller 90 in respective steps will be described in order for a flow of the operation before replacing the moisture accommodating portion in the maintenance method of the capping device.

In step S300, the controller 90 executes the subroutine of the cap replacement preparation operation described above. When the subroutine of the cap replacement preparation operation is completed, in step S401, the controller 90 switches the parameter tables and ends the flow.

About Humidifying Fluid Filling Operation

A humidifying fluid filling operation in the maintenance method for the capping device will be described.

The humidifying fluid filling operation is a flow performed for accommodating the humidifying fluid L1a in the humidifying fluid accommodating section 61 before the liquid ejecting apparatus 11 shown in FIG. 1 is assembled and shipped from the factory. In a state where the humidifying fluid L1a is accommodated in the humidifying fluid accommodating section 61 and then the humidifying fluid L1a in the unit cap 51*a* is recovered in the humidifying fluid accommodating section 61, the liquid ejecting apparatus 11 is shipped from the factory. A humidifying fluid filling operation is performed before the moisture accommodating portion 66*a* is attached to the moisture supply flow path 66*b*. When the moisture accommodating portion 66*a* is already attached to the moisture supply flow path 66*b*, the flow of the humidifying fluid filling operation is executed after the moisture accommodating portion 66*a* is removed from the moisture supply flow path 66*b*. In the flow of the humidifying fluid filling operation, some steps are manually performed by an operator.

Figure 21:
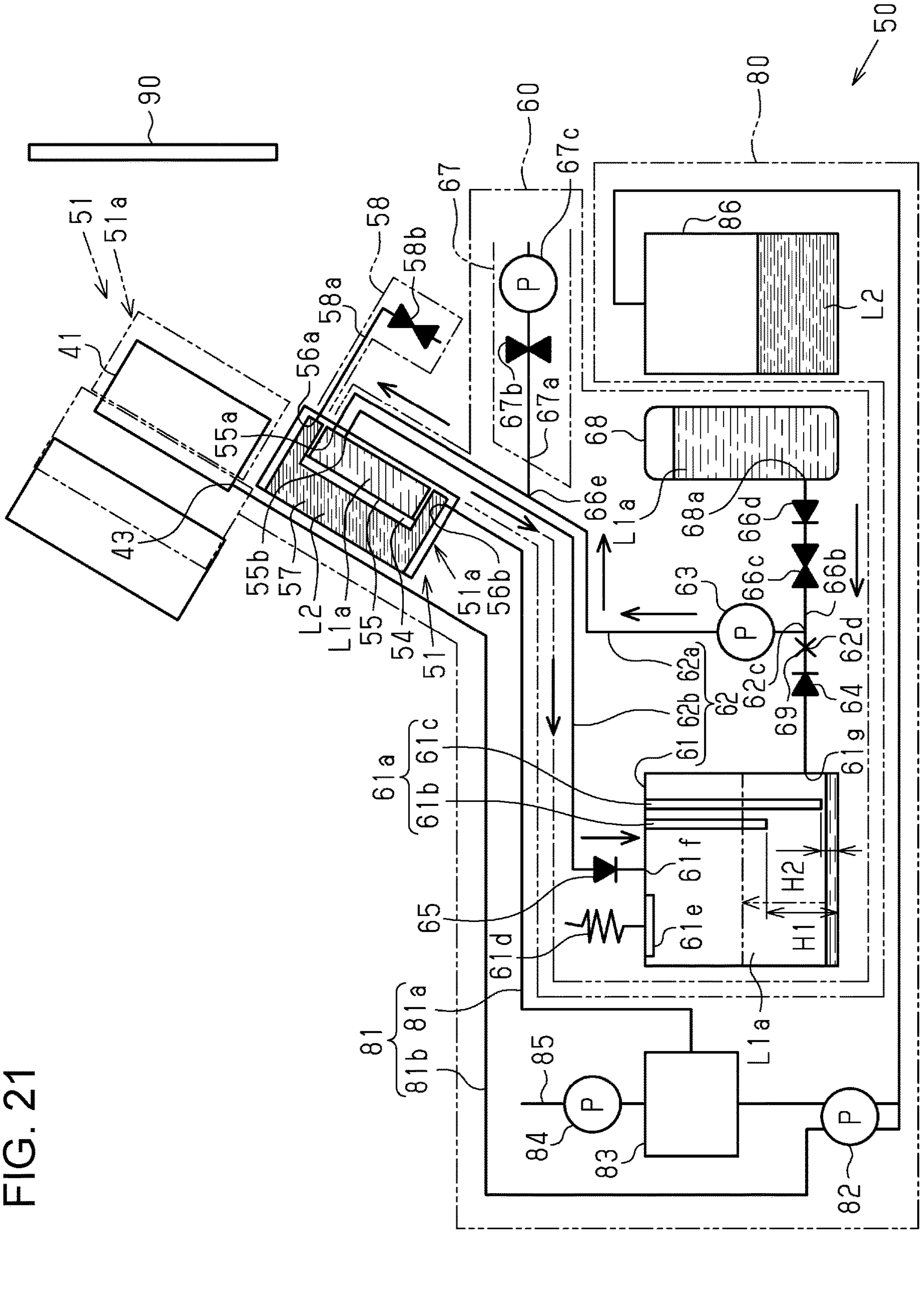
FIG. 21 is a schematic view showing a state of the humidifying fluid when a humidifying fluid filling operation is executed.

As shown in FIG. 21, the humidifying fluid pack 68 containing the humidifying fluid L1a to be accommodated in the humidifying fluid accommodating section 61 is attached to the moisture supply flow path 66*b*. Then, the humidifying fluid pack 68 and the moisture supply flow path 66*b* communicate with each other at an outlet portion 68*a* of the humidifying fluid pack 68. Thereby, when the first on-off valve 66*c* is in the open state, the humidifying fluid pack 68 and the first merging portion 62*c* are in a communication state by the moisture supply flow path 66*b*.

The circulation path 62 has a clamp portion 62*d* upstream of the first merging portion 62*c*. It is desirable that the distance between the clamp portion 62*d* and the first merging portion 62*c* is as short as possible. When the clamp portion 62*d* is closed by a clamp 69, the flow path is closed at the clamp portion 62*d*. That is, the humidifying fluid accommodating section 61 and the first merging portion 62*c* are in a non-communication state by the clamp 69. The clamp is an instrument provided in the middle of the flow path and adjusting the flow rate of the flow path by clamping the flow path.

In this state, the controller 90 controls the humidifying fluid circulation mechanism 60 to cause the humidifying fluid L1a in the circulation path 62 to flow in the direction of a solid arrow shown in FIG. 21 by driving the first pump 63, in a state where the first on-off valve 66*c* is open. At this time, the humidifying fluid L1a in the humidifying fluid pack 68 flows in the direction of the solid arrow shown in FIG. 21. Then, when the first on-off valve 66*c* is in the valve open state, the humidifying fluid L1a is supplied into the circulation path 62. Further, at this time, the clamp portion 62*d* is closed by the clamp 69. Therefore, the humidifying fluid L1a in the humidifying fluid accommodating section 61 is not supplied into the circulation path 62. Thereby, a predetermined amount of the humidifying fluid L1a in the humidifying fluid pack 68 flows into the humidifying fluid accommodating section 61. Then, the height of the liquid surface in the humidifying fluid accommodating section 61 becomes higher than the first predetermined height H1.

The controller 90 closes the first on-off valve 66*c*, and the operator removes the clamp 69. Then, the humidifying fluid L1a circulates in the circulation path 62, and the state of the liquid surface in the humidifying fluid accommodating section 61 is stabilized. After that, the controller 90 executes the cap replacement preparation operation such that the humidifying fluid L1a in the unit cap 51*a* is recovered in the humidifying fluid accommodating section 61. The liquid ejecting apparatus 11 is shipped from the factory in this state.

Next, with reference to a flowchart shown in FIG. 22, operations in respective steps will be described in order for a flow of the humidifying fluid filling operation.

In step S501, the humidifying fluid pack 68 is attached by the operator. Then, in step S502, the clamp 69 is attached to the clamp portion 62*d* by the operator, and the clamp 69 is closed.

In step S503, the controller 90 determines whether or not the first on-off valve 66*c* is in the open state. When the first on-off valve 66*c* is in the open state, the flow proceeds to step S505. When the first on-off valve 66*c* is in the closed state, the flow proceeds to step S504. Then, in step S504, the controller 90 opens the first on-off valve 66*c*.

In step S505, the controller 90 starts driving the first pump 63. Thereby, as shown in FIG. 21, the humidifying fluid L1a flows in the moisture supply flow path 66*b* in the direction of the solid arrow shown in FIG. 21. Then, the humidifying fluid L1a flows from the first merging portion 62*c* toward the unit cap 51*a* in the circulation path 62 in the direction of the solid arrow shown in FIG. 21.

In step S506, the controller 90 acquires information on the height of the liquid surface in the humidifying fluid accommodating section 61 from the detecting portion 61*a*. Then, in step S507, the determination is made whether or not the height of the liquid surface in the humidifying fluid accommodating section 61 is higher than the first predetermined height H1. When the height of the liquid surface is higher than the first predetermined height H1, the flow proceeds to step S508. Then, in step S508, the controller 90 stops driving the first pump 63. When the height of liquid surface is lower than the first predetermined height H1, the driving of the first pump 63 is continued and the flow proceeds to step S506.

In step S509, the controller 90 closes the first on-off valve 66*c*. Then, in step S510, the clamp 69 is removed by the operator.

In step S511, the controller 90 drives the first pump 63 for a first predetermined time T1 in a state where the first on-off valve 66*c* is closed. Thereby, as shown in FIG. 13, the humidifying fluid L1a flows in the circulation path 62 in the direction of the solid arrow shown in FIG. 13.

In step S512, the controller 90 stops the first pump 63 for a second predetermined time T2 in a state where the first on-off valve 66*c* is closed. Thereby, the liquid surface state in the humidifying fluid accommodating section 61 is stabilized.

In step S513, the controller 90 acquires information on the height of the liquid surface in the humidifying fluid accommodating section 61 from the detecting portion 61*a*. Then, in step S514, the determination is made whether or not the height of the liquid surface in the humidifying fluid accommodating section 61 is higher than the first predetermined height H1. When the height of the liquid surface is higher than the first predetermined height H1, the flow proceeds to step S300. Then, in step S300, the controller 90 executes the subroutine of the cap replacement preparation operation. Thereby, the humidifying fluid L1a in the unit cap 51*a* is recovered in the humidifying fluid accommodating section 61. When the cap replacement preparation operation is executed, the height of the liquid surface may be further increased by the humidifying fluid L1a in the unit cap 51*a*. Therefore, in the cap replacement preparation operation, before all the humidifying fluid L1a in the unit cap 51*a* is recovered in the humidifying fluid accommodating section 61, the first predetermined height H1 is set to a height at which the inside of the humidifying fluid accommodating section 61 is not completely filled with the humidifying fluid L1a.

In step S514, when the height of the liquid surface is lower than the first predetermined height H1, the controller 90 proceeds with the flow to step S502. Thereby, the humidifying fluid L1a in the humidifying fluid pack 68 is supplied into the circulation path 62 again. That is, the height of the liquid surface in the humidifying fluid accommodating section 61 is finely adjusted.

When the subroutine of the cap replacement preparation operation is completed, in step S515, the humidifying fluid pack 68 is removed and the moisture accommodating portion 66*a* is attached, by the operator. Then, the flow ends.

About Liquid Ejected by Liquid Ejecting Head

The ink, which is an example of the liquid ejected by the liquid ejecting apparatus 11, will be described in detail below.

The ink used in the liquid ejecting apparatus 11 contains a resin in constitution, and does not substantially contain glycerin with a boiling point at one atmosphere of 290° C. If the ink substantially contains glycerin, the drying properties of the ink significantly decrease. As a result, in various media, in particular, in a medium which is non-absorbent or has low absorbency to ink, not only light and dark unevenness in the image is noticeable, but also fixability of the ink are not obtained. It is preferable that the ink do not substantially contain alkyl polyols (except glycerin described above) having a boiling point corresponding to one atmosphere is 280° C. or higher.

Here, the wording "does not substantially contain" in the specification means that an amount or more which sufficiently exhibits the meaning of adding is not contained. To put this quantitatively, it is preferable that glycerin be not included at 1.0% by mass or more with respect to the total mass (100% by mass) of the ink, not including 0.5% by mass or more is more preferable, not including 0.1% by mass or more is further preferable, not including 0.05% by mass or more is even more preferable, and not including 0.01% by mass or more is particularly preferable. It is most preferable that 0.001% by mass or more of glycerin be not included.

Next, additives (components) which are included in or may be included in the ink will be described.

1. Coloring Material

The ink may contain a coloring material. The coloring material is selected from a pigment and a dye.

1-1. Pigment

It is possible to improve light resistance of the ink by using a pigment as the coloring material. Either of an inorganic pigment or an organic pigment may be used as the pigment. Although not particularly limited, examples of the inorganic pigment include carbon black, iron oxide, titanium oxide and silica oxide.

Although not particularly limited, examples of the organic pigment include quinacridone-based pigments, quinacridonequinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketo-pyrrolo-pyrrole-based pigments, perinone-based pigments, quinophthalone-based pigments, anthraquinone-based pigments, thioindigo-based pigments, benzimidazolone-based pigments, isoindolinone-based pigments, azomethine-based pigments and azo-based pigments. Specific examples of the organic pigment include substances as follows.

Examples of the pigment used in the cyan ink include C.I. Pigment Blue 1, 2, 3, 15, 15:1, 15:2, 15:3, 15:4, 15:6, 15:34, 16, 18, 22, 60, 65, and 66, and C.I. Vat Blue 4 and 60. Among these substances, either of C.I. Pigment Blue 15:3 and 15:4 is preferable.

Examples of the pigment used in the magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, and C.I. Pigment Violet 19, 23, 32, 33, 36, 38, 43, and 50. Among these substances, one type or more selected from a group consisting of C.I. Pigment Red 122, C.I. Pigment Red 202, and C.I. Pigment Violet 19 are preferable.

Examples of the pigment used in the yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213. Among these substances, one type or more selected from a group consisting of C.I. Pigment Yellow 74, 155, and 213 are preferable.

Examples of pigments used in other colors of ink, such as green ink and orange ink, include pigments known in the related art.

It is preferable that the average particle diameter of the pigment be equal to or less than 250 nm in order to be able to suppress clogging in the nozzles 22 and to cause the ejection stability to be more favorable. The average particle diameter in the specification is volumetric basis. As a measurement method, for example, it is possible to perform measurement with a particle size distribution analyzer in which a laser diffraction scattering method is the measurement principle. Examples of the particle size distribution analyzer include a particle size distribution meter (for example, Microtrac UPA manufactured by Nikkiso Co., Ltd.) in which dynamic light scattering is the measurement principle.

1-2. Dye

A dye may be used as the coloring material. Although not particularly limited, acid dyes, direct dyes, reactive dyes, and basic dyes can be used as the dye. The content of the coloring material is preferably 0.4% to 12% by mass with respect to the total mass (100% by mass) of the ink, and is more preferably 2% by mass or more and 5% by mass or less.

2. Resin

The ink contains a resin. The ink contains a resin, and thus a resin coating film is formed on a medium, and as a result, the ink is sufficiently fixed on the medium, and an effect of favorable abrasion resistance of the image is mainly exhibited. Thus, the resin emulsion is preferably a thermoplastic resin. The thermal deformation temperature of the resin is preferably equal to or higher than 40° C. and more preferably equal to or higher than 60° C., in order to obtain advantageous effects in that clogging of the nozzles 22 does not easily occur, and the abrasion resistance of the medium is maintained.

Here, the "thermal deformation temperature" in the present specification is a temperature value represented by a glass transition temperature (Tg) or a minimum film forming temperature (MFT). That is, "a thermal deformation temperature of 40° C. or higher" means that either of the Tg or the MFT may be 40° C. or higher. Since the MFT is superior to the Tg for easily grasping redispersibility of the resin, the thermal deformation temperature is preferably the temperature value represented by the MFT. If the ink is excellent in redispersibility of the resin, the nozzles 22 are not easily clogged because the ink is not fixed.

Although not particularly limited, specific examples of the thermoplastic resin include (meth)acrylic polymers, such as poly(meth)acrylic ester or copolymers thereof, polyacrylonitrile or copolymers thereof, polycyanoacrylate, polyacrylamide, and poly(meth)acrylic acid; polyolefin-based polymers, such as polyethylene, polypropylene, polybutene, polyisobutylene, polystyrene and copolymers thereof, petroleum resins, coumarone-indene resins and terpene resins; vinyl acetate or vinyl alcohol polymers, such as polyvinyl acetate or copolymers thereof, polyvinyl alcohol, polyvinyl acetal, and polyvinyl ether; halogen-containing polymers, such as polyvinyl chloride or copolymers thereof, polyvinylidene chloride, fluororesins and fluororubbers; nitrogen-containing vinyl polymers, such as polyvinyl carbazole, polyvinylpyrrolidone or copolymers thereof, polyvinylpyridine, or polyvinylimidazole; diene based polymers, such as polybutadiene or copolymers thereof, polychloroprene and polyisoprene (butyl rubber); and other ring-opening polymerization type resins, condensation polymerization-type resins and natural macromolecular resins.

The content of the resin is preferably 1% to 30% by mass with respect to the total mass (100% by mass) of the ink, and 1% to 5% by mass is more preferable. In a case where the content is in the above-described range, it is possible further improve glossiness and abrasion resistance of the coated image to be formed. Examples of the resin which may be included in the ink include a resin dispersant, a resin emulsion, and a wax.

2-1. Resin Emulsion

The ink may contain a resin emulsion. The resin emulsion forms a resin coating film preferably along with a wax (emulsion) when the medium is heated, and thus the ink is sufficiently fixed onto the medium, and the resin emulsion exhibits an effect of improving abrasion resistance of the image, accordingly. In a case of printing the medium with an ink which contains a resin emulsion according to the above effects, the ink has particularly excellent abrasion resistance on a medium which is non-absorbent or has low absorbency to ink.

The resin emulsion which functions as a binder is contained in the ink, in an emulsion state. The resin which functions as the binder is contained in the ink in the emulsion state, and thus it is possible to easily adjust the viscosity of the ink to an appropriate range in an ink jet recording method, and to improve the storage stability and ejection stability of the ink.

Although not limited to the following, examples of the resin emulsion include homopolymers or copolymers of (meth)acrylate, (meth)acrylic ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, fluororesins, and natural resins. Among these substances, either of a methacrylic resin and a styrene-methacrylate copolymer resin is preferable, either of an acrylic resin and a styrene-acrylate copolymer resin is more preferable, and a styrene-acrylate copolymer resin is still more preferable. The above copolymers may have a form of any of random copolymers, block copolymers, alternating copolymers, and graft copolymers.

The average particle diameter of the resin emulsion is preferably in a range of 5 nm to 400 nm, and more preferably in a range 20 nm to 300 nm, in order to further improve the storage stability and ejection stability of the ink. The content of the resin emulsion among the resins is preferably in a range of 0.5% to 7% by mass to the total mass (100% by mass) of the ink. If the content is in the above range, it is possible to reduce the solid content concentration, and to further improve the ejection stability.

2-2. Wax

The ink may contain a wax. The ink contains the wax, and thus fixability of the ink on a medium which is non-absorbent or with low absorbency to ink is more excellent. Among these, it is preferable that the wax be an emulsion type. Although not limited to the following, examples of the wax include a polyethylene wax, a paraffin wax, and a polyolefin wax, and among these, a polyethylene wax, described later, is preferable. In the present specification, the "wax" mainly means a substance in which solid wax particles are dispersed in water using a surfactant which will be described later.

The ink contains a polyethylene wax, and thus it is possible to improve the abrasion resistance of the ink. The average particle diameter of a polyethylene wax is in a range of 5 nm to 400 nm, and more preferably in a range 50 nm to 200 nm, in order to further improve the storage stability and ejection stability of the ink.

The content (solid content conversion) of the polyethylene wax is independently of one another and is in a range of 0.1% to 3% by mass with respect to the total mass (100% by mass) of the ink, a range of 0.3% to 3% by mass is more preferable, and a range of 0.3% to 1.5% by mass is further preferable. If the content is in the above ranges, it is possible to favorably solidify and fix the ink even on a medium that is non-absorbent or with low absorbency to ink, and it is possible to further improve the storage stability and ejection stability of the ink.

3. Surfactant

The ink may contain a surfactant. Although not limited to the following, examples of the surfactant include nonionic surfactants. The nonionic surfactant has an action of evenly spreading the ink on the medium. Therefore, in a case where printing is performed by using an ink including the nonionic surfactant, a high definition image with very little bleeding is obtained. Although not limited to the following, examples of such a nonionic surfactant include silicon-based, polyoxyethylene alkylether-based, polyoxypropylene alkylether-based, polycyclic phenyl ether-based, sorbitan derivative and fluorine-based surfactants, and among these a silicon-based surfactant is preferable.

The content of the surfactant is preferably in a range of 0.1% by mass or more and 3% by mass or less with respect to the total mass (100% by mass) of the ink, in order to further improve the storage stability and ejection stability of the ink.

4. Organic Solvent

The ink may include a known volatile water-soluble organic solvent. As described above, it is preferable that the ink does not substantially contain glycerin (boiling point at one atmosphere of 290° C.) which is one type of an organic solvent, and do not substantially contain alkyl polyols (excluding glycerin described above) having a boiling point corresponding to one atmosphere of 280° C. or higher.

5. Aprotic Polar Solvent

The ink may contain an aprotic polar solvent. The ink contains an aprotic polar solvent, and thus the above-described resin particles included in the ink are dissolved, and thus, it is possible to effectively suppress clogging of the nozzles 22 at a time of printing. Since the aprotic polar solvent has properties of dissolving a medium such as vinyl chloride, adhesiveness of an image is improved.

Although not particularly limited, the aprotic polar solvent preferably includes one type or more selected from pyrrolidones, lactones, sulfoxides, imidazolidinones, sulfolanes, urea derivatives, dialkylamides, cyclic ethers, and amide ethers. Representative examples of the pyrrolidones include 2-pyrrolidone, N-methyl-2-pyrrolidone, and N-ethyl-2-pyrrolidone, representative examples of the lactones include γ-butyrolactone, γ-valerolactone, and ε-caprolactone, and representative examples of the sulfoxides include dimethyl sulfoxide, and tetramethylene sulfoxide.

Representative examples of the imidazolidinones include 1,3-dimethyl-2-imidazolidinone, representative examples of the sulfolanes include sulfolane, and dimethyl sulfolane, and representative examples of the urea derivatives include dimethyl urea and 1,1,3,3-tetramethyl urea. Representative examples of the dialkylamides include dimethyl formamide and dimethylacetamide, and representative examples of the cyclic ethers include 1,4-dioxane, and tetrahydrofuran.

Among these substances, pyrrolidones, lactones, sulfoxides and amide ethers, are particularly preferable from a viewpoint of the above-described effects, and 2-pyrrolidone is the most preferable. The content of the above-described aprotic polar solvent is preferably in a range of 3% to 30% by mass with respect to the total mass (100% by mass) of the ink, and is more preferably in a range of 8% to 20% by mass.

6. Other Components

The ink may further include a fungicide, an antirust agent, a chelating agent, and the like in addition to the above components.

About Humidifying Fluid

Next, the components of the surfactant mixed into the humidifying fluid L1a will be described.

As the surfactant, cationic surfactants such as alkylamine salts and quaternary ammonium salts; anionic surfactant such as dialkyl sulfosuccinate salts, alkyl naphthalene sulfosuccinate salts and fatty acid salts; amphoteric surfactants, such as alkyl dimethyl amine oxide, and alkylcarboxybetaine; nonionic surfactants such as polyoxyethylene alkyl ethers, polyoxyethylene alkyl allyl ethers, acetylene glycols, and polyoxyethylene-polyoxypropylene block copolymers may be used; among these substances, particularly, anionic surfactants or nonionic surfactants are preferable.

The content of the surfactant is preferably 0.1% to 5.0% by mass with respect to the total mass of the humidifying fluid L1a. The content of the surfactant is preferably 0.5% to 1.5% by mass with respect to the total mass of the humidifying fluid L1a, from a viewpoint of foamability and defoaming properties after forming air bubbles. The surfactant may be used singly or in a combination of two or more. It is preferable that the surfactant contained in the humidifying fluid L1a be the same as the surfactant contained in the ink (liquid). For example, in a case where the surfactant contained in the ink (liquid) is a nonionic surfactant, although not limited to the following, examples of nonionic surfactants include silicon-based surfactants, polyoxy ethylene alkylether-based surfactants, polyoxy propylene alkyl ether-based surfactants, polycyclic phenyl ether-based surfactants, sorbitan derivatives, and fluorine-based surfactants; Among these substances, silicon-based surfactants are preferable.

In particular, it is preferable that an adduct in which 4 to 30 added mols of ethyleneoxide (EO) are added to acetylene diol be used as the surfactant, in order that the heights of foams directly after foaming and after five minutes elapses from the foaming, which are obtained by using the Ross Miles method are set to be in the above range (foam height directly after foaming is equal to or higher than 50 mm, and foam height after five minutes elapses from the foaming is equal to or lower than 5 mm), and the content of the adduct be 0.1% to 3.0% by weight with respect to the total weight of a cleaning solution. Further, it is preferable that an adduct in which 10 to 20 added mols of ethyleneoxide (EO) are added to acetylene diol, in order that the heights of foams directly after foaming and after five minutes elapses from the foaming, which are obtained by using the Ross Miles method is set to be in the above range (foam height directly after foaming is equal to or higher than 100 mm, and foam height after five minutes elapses from the foaming is equal to or lower than 5 mm), and the content of the adduct be 0.5% to 1.5% by weight with respect to the total weight of the cleaning solution. If the content of the ethyleneoxide adduct of acetylene diol is excessively high, there is a concern of reaching the critical micelle concentration and forming an emulsion.

The surfactant has a function of causing wetting and spreading of the water-based ink on a recording medium to be easily performed. The surfactants able to be used in the present disclosure are not particularly limited, and examples thereof include anionic surfactants such as dialkyl sulfosuccinate salts, alkyl naphthalene sulfosuccinate salts, fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkyl amine salts and quaternary ammonium salts; silicone-based surfactants, and fluorine-based surfactants.

The surfactant has an effect of causing aggregations to be divided and dispersed by a surface activity effect between the humidifying fluid L1a and the aggregation. Because of the ability to lower the surface tension of the cleaning solution, there is an effect that the cleaning solution easily performs infiltration between the aggregation and the nozzle surface 23, and the aggregation is easily peeled from the nozzle surface 23.

It is possible to suitably use any surfactant as long as the compound has a hydrophilic portion and a hydrophobic portion in the same molecule. Specific examples thereof preferably include compounds represented by Formulas (I) to (IV). That is, examples include a polyoxyethylene alkyl phenyl ether-based surfactant in Formula (I), an acetylene glycol-based surfactant in Formula (II), a polyoxyehtylenealkyl ether-based surfactants in Formula (III), and a polyoxyethylene polyoxypropylenealkyl ether-based surfactants in Formula (IV).

(I)

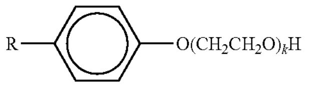

(R is a hydrocarbon chain which has 6 to 14 carbon atoms and may be branched, and k: 5 to 20)

(II)

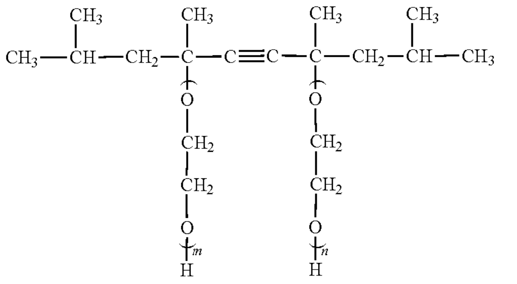

(M, n≤20, 0<m+n≤40)

$$R—(OCH_2CH_2)nH \quad (II)$$

(R is a hydrocarbon chain which has 6 to 14 carbon atoms and may be branched, and n is 5 to 20)

$$R—(OCH_2CH_2)_nH \quad (III)$$

(R is a hydrocarbon chain having 6 to 14 carbon atoms and m and n are numerals of 20 or lower)

The followings may be used as the surfactant in addition to the compounds in Formulas (I) to (IV): alkyl and aryl ethers of polyhydric alcohols such as diethylene glycol monophenyl ether, ethylene glycol monophenyl ether, ethylene glycol monoallyl ether, diethylene glycol monophenyl ether, diethylene glycol mono-butyl ether, propylene glycol mono-butyl ether, and tetraethylene glycol chlorophenyl ether, nonionic surfactants such as polyoxyethylene polyoxypropylene block copolymers and fluorine-based surfactants, and lower alcohols such as ethanol and 2-propanol. In particular, diethylene glycol mono-butyl ether is preferable.

The operation of the present embodiment will be described.

Figure 22:
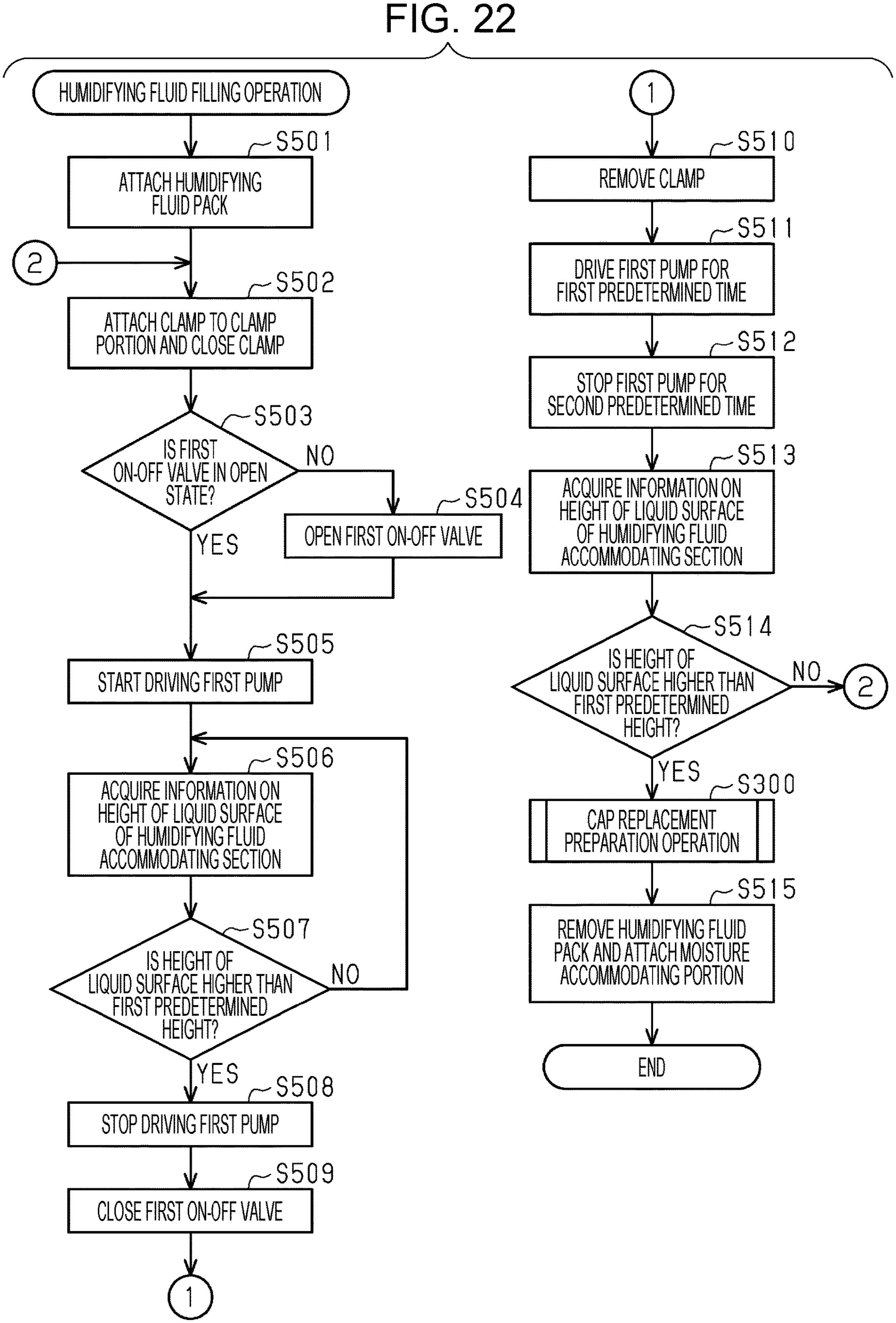
FIG. 22 is a flowchart showing the humidifying fluid filling operation.

Before the liquid ejecting apparatus 11 is assembled and shipped from the factory, the flow of the humidifying fluid filling operation shown in FIG. 22 is performed.

As shown in FIG. 21, in the humidifying fluid filling operation, the controller 90 drives the first pump 63 to cause the humidifying fluid L1a to flow in the circulation path 62 in the direction of the solid arrow shown in FIG. 21, in the state where the humidifying fluid L1a in the humidifying fluid accommodating section 61 is not supplied into the circulation path 62 by the clamp 69 and in the state where the first on-off valve 66*c* is open. The first pump 63 is driven until it is detected by the detecting portion 61*a* that the height of the liquid surface in the humidifying fluid accommodating section 61 is higher than the first predetermined height H1, thereby making it possible to accommodate, in the humidifying fluid accommodating section 61, a predetermined amount of the humidifying fluid L1a in the humidifying fluid pack 68. Therefore, the liquid ejecting apparatus 11 can be shipped from the factory in a state where a predetermined amount of the humidifying fluid L1a is accommodated in the humidifying fluid accommodating section 61.

By the cap replacement preparation operation executed by the controller 90 at the end of the humidifying fluid filling operation, most of the humidifying fluid L1a in the unit cap 51*a* is discharged to the outside of the unit cap 51*a*. Therefore, the liquid ejecting apparatus 11 can be shipped from the factory with almost no humidifying fluid L1a in the unit cap 51*a*.

The liquid ejecting apparatus 11 shipped from the factory is installed by the user, and the use of the liquid ejecting apparatus 11 is started. Before the liquid ejecting apparatus 11 is installed and the first recording is made on the medium M, the controller 90 executes the flow of the circulation operation shown in FIG. 14.

As shown in FIG. 13, in the circulation operation, the controller 90 drives the first pump 63 to cause the humidifying fluid L1a in the circulation path 62 to flow in the direction of a solid arrow shown in FIG. 13, in the state where the first on-off valve 66*c* is closed. As a result, the humidifying fluid L1a can be circulated in the unit cap 51*a*, which has been in a state where there has been almost no humidifying fluid L1a at the time of shipment. Then, the humidifying chamber 55 of the unit cap 51*a* can be filled with the humidifying fluid L1a.

More specifically, as shown in FIG. 7, the humidifying fluid L1a can be circulated into the humidifying chamber 55 provided in the form of a single-way flow path through which the inlet 55*a* and the outlet 55*b* communicates with each other by the first moisture permeable membrane 54 covering the groove 55*c* and the groove 55*c*. That is, the groove 55*c* of the humidifying chamber 55, which has been in a state where there has been almost no humidifying fluid L1a at the time of shipment, can be filled with the humidifying fluid L1a.

By forming the humidifying chamber 55 in such a single-way flow path, the humidifying chamber 55 can be easily filled with humidifying fluid L1a by a circulation operation. Further, since the humidifying chamber 55 is formed in a winding flow path, it is possible to suppress the flowing-out of the humidifying fluid L1a filled in the humidifying chamber 55 by the circulation operation from the humidifying chamber 55 through the inlet 55*a* or the outlet 55*b*.

As shown in FIG. 3, the capping device 50 includes a plurality of unit caps 51*a* arranged side by side. Then, as described above, among the plurality of unit caps 51*a*, the outlet 55*b* of one unit cap 51*a* is coupled to the inlet 55*a* of another unit cap 51*a* adjacent to the unit cap 51*a*. Then, as shown in FIG. 11, the inlet 55*a* positioned furthest upstream is coupled to the supply flow path 62*a*, and the outlet 55*b* positioned furthest downstream is coupled to the recovery flow path 62*b*. Thereby, with only one supply flow path 62*a* and the recovery flow path 62*b*, the plurality of unit caps 51*a* can be filled with the humidifying fluid L1a.

As shown in FIG. 8, the humidifying chamber 55 is provided in an inclined attitude with respect to the horizontal. The inlet 55*a* and the outlet 55*b* are provided above the center of the humidifying chamber 55 in the vertical direction. Therefore, it is possible to suppress flowing-out of the humidifying fluid L1a filled in the humidifying chamber 55 by the circulation operation from the humidifying chamber 55 through the inlet 55*a* or the outlet 55*b* by the water head pressure.

As shown in FIG. 2, when the liquid ejecting head 21 makes recording on the medium M in the liquid ejecting apparatus 11, the medium M in the medium accommodating portion 16 shown in FIG. 1 is fed, and the medium M goes to the recording section 20 through the transport path 19. Then, in the recording section 20, the liquid ejecting head 21 ejects the liquid toward the medium M transported in the first transport direction Z1. Then, the liquid ejecting apparatus 11 alternately repeats the transport operation of transporting the medium M to the next recording position and the recording operation of ejecting the liquid from the liquid ejecting head 21, and characters, images, and the like are recorded on the medium M, accordingly.

As shown in FIG. 8, when the liquid ejecting head 21 does not eject the liquid, the liquid ejecting apparatus 11 performs capping, which is an operation in which the cap unit 51 contacts the nozzle surface 23 of the liquid ejecting head 21 so as to surround the nozzle 22. That is, when the liquid ejecting head 21 does not eject the liquid, a state where the unit cap 51*a* is in contact with the nozzle surface 23 of the liquid ejecting head 21 to surround the nozzle 22 is maintained.

As shown in FIG. 2, during capping, the cap unit 51 moves from the retreat position in the third direction D3 and is positioned at the maintenance position, and then the head unit 24 moves from the recording position in the first direction D1 and is positioned at the maintenance position. Thereby, the cap unit 51 caps the head unit 24. That is, the capping device 50 and the liquid ejecting head 21 come into contact with each other. Therefore, the close contact surface 56*f* of the unit cap 51*a* and the nozzle surface 23 of the liquid ejecting head 21 can come into close contact with each other and the seal portion 56*e* can seal the nozzle surface 23.

As shown in FIG. 10, the humidifying chamber 55 is filled with the humidifying fluid L1a. Moisture evaporated from the humidifying fluid L1a can pass through the first moisture permeable membrane 54 and the absorber 53 together with the moist air containing the moisture and reach the inside of the recess 57. Then, the moisture can humidify the inside of the recess 57. Thereby, the space SP surrounding the openings of the nozzles 22 when the unit cap 51*a* comes into contact with the liquid ejecting head 21 is humidified, and thus the openings of the nozzles 22 can be humidified. Then, since the thickening of the liquid in the nozzles 22 is suppressed, the occurrence of ejection failure can be prevented.

As shown in FIG. 8, in the humidifying chamber 55, since the flow path is drawn around the entire bottom surface of the unit cap 51*a*, the entire inside of the recess 57 can be humidified. Thereby, the openings of the plurality of nozzles 22 of the liquid ejecting head 21 can be humidified more uniformly.

As shown in FIG. 8, the liquid ejecting apparatus 11 regularly performs flushing, which is an ejection operation for discharging droplets unrelated to printing from the nozzles 22 to the space SP in the unit cap 51*a*. Even at the time of flushing, a state where the unit cap 51*a* is in contact with the nozzle surface 23 of the liquid ejecting head 21 to surround the nozzle 22 is maintained.

As shown in FIG. 2, at the time of flushing or cleaning, the cap unit 51 moves from the retreat position in the third direction D3 and is positioned at the maintenance position, and then the head unit 24 moves from the recording position in the first direction D1 and is positioned at the maintenance position. Thereby, the capping device 50 and the liquid ejecting head 21 come into contact with each other. Therefore, the close contact surface 56*f* of the unit cap 51*a* and the nozzle surface 23 of the liquid ejecting head 21 can come into close contact with each other and the seal portion 56*e* can seal the nozzle surface 23.

As shown in FIG. 9, the waste liquid L2 discharged from the nozzles 22 to the recess 57 by flushing or cleaning passes through the restriction member 52 and the absorber 53. The waste liquid L2 is absorbed by the absorber 53. Then, the waste liquid L2 absorbed by the absorber 53 spreads over the entire absorber 53. Further, when the absorber 53 approaches a state where the waste liquid L2 cannot be absorbed any more, the waste liquid L2 flows in the vertical direction by gravity in the absorber 53. Since the first moisture permeable membrane 54 does not have liquid permeability, the waste liquid L2 does not flow into the humidifying chamber 55. Since the recess 57 has the discharge hole 56*b*, the waste liquid L2 that the absorber 53 could not absorb in the recess 57 can be discharged to the outside of the unit cap 51*a* through the discharge hole 56*b*.

The discharge hole 56*b* may be provided in the recess 57 at a position lower than that of the first moisture permeable membrane 54. The waste liquid L2 can be discharged to the outside of the unit cap 51*a* through the discharge hole 56*b* by gravity. Then, it is possible to suppress the phenomenon that the surface of first moisture permeable membrane 54 is blocked by the waste liquid L2 and gas cannot pass therethrough.

The discharge hole 56*b* may be provided at the lowermost portion of the recess 57. The waste liquid L2 can be discharged to the outside of the unit cap 51*a* through the discharge hole 56*b* by gravity. Then, remaining of the waste liquid L2 in the recess 57 can be suppressed.

As shown in FIG. 11, the recess 57 has the atmosphere communication hole 56*a* for allowing the space SP to communicate with the atmosphere. As described above, in the present embodiment, the third on-off valve 58*b* for communicating the space SP with the atmosphere is opened and closed by the movement of the cap unit 51. Thereby, the space SP and the atmosphere can communicate with each other by opening and closing the third on-off valve 58*b* without using an actuator dedicated to the third on-off valve.

When the third on-off valve 58*b* is opened and closed, the space SP communicates with the atmosphere. Thereby, even when the space SP surrounding the openings of the nozzles 22 is formed, the atmosphere flows into the space SP, and thus the waste liquid L2 in the recess 57 can be easily discharged to the outside of the unit cap 51*a* through the discharge hole 56*b*.

At the time of flushing or cleaning, the liquid ejecting head 21 discharges the liquid into the unit cap 51*a* in a state where the first atmosphere communication passage 58*a* is open. The first atmosphere communication passage 58*a* is also in the open state even when the liquid ejecting head 21 is in the capped state that does not eject the liquid. That is, since the first atmosphere communication passage 58*a* is in the open state most of the time, remaining of the waste liquid L2 in the recess 57 can be suppressed.

As shown in FIG. 10, the atmosphere communication hole 56*a* may be provided above the center of the recess 57 in the vertical direction. The phenomenon that the atmosphere communication hole 56*a* is blocked with the waste liquid L2 and the waste liquid L2 cannot be discharged from the recess 57 can be suppressed.

The atmosphere communication hole 56*a* may be provided in the recess 57 at a position higher than that of the first moisture permeable membrane 54. The phenomenon that the atmosphere communication hole 56*a* is blocked with the waste liquid L2 flowing on the surface of the first moisture permeable membrane 54 and the waste liquid L2 cannot be discharged from the recess 57 can be suppressed.

As shown in FIG. 9, the waste liquid L2 discharged from the nozzles 22 to the recess 57 by flushing or cleaning is absorbed by the absorber 53. Further, as shown in FIG. 10, the moisture that evaporates from the humidifying fluid L1a and passes through the first moisture permeable membrane 54 humidifies the waste liquid L2 absorbed by the absorber 53. Thereby, when the viscosity of the waste liquid L2 absorbed by the absorber 53 is high, the viscosity of the waste liquid L2 is adjusted by the moisture evaporated from the humidifying fluid L1a. The space SP can be humidified more efficiently by the moisture evaporated from the humidifying fluid L1a and the waste liquid L2 of having the adjusted viscosity.

In the present embodiment, since the moisturizing power of the humidifying fluid L1a is equivalent to the moisturizing power of the fresh ink, the moisturizing power of the ink absorbed by the absorber 53 can be maintained at the same moisturizing power as that of the fresh ink by humidifying the ink absorbed by the absorber 53 when the ink absorbed by the absorber 53 is thickened.

The waste liquid L2 absorbed by the absorber 53 spreads over the entire absorber 53. Thereby, the distribution of the waste liquid L2 absorbed by the absorber 53 can be made uniform, and thus the entire space SP can be humidified more uniformly. Then, the openings of the plurality of nozzles 22 of the liquid ejecting head 21 can be humidified more uniformly.

When flushing or cleaning is performed, the liquid discharged from the nozzles 22 of the liquid ejecting head 21 adheres to the nozzle surface 23. Therefore, after flushing and cleaning, the liquid ejecting apparatus 11 performs wiping.

As shown in FIG. 4, the head unit 24 moves from the recording position in the first direction D1 and is positioned at the maintenance position, and then the wiper carriage 41 moves from the retreat position in the fifth direction D5 and moves to the folding position. Thereby, the nozzle surface 23 of the head unit 24 can be wiped by the wiper member 42 included in the wiper carriage 41. Then, the liquid adhering to the nozzle surface 23 can be recovered in the wiper carriage 41 as waste liquid L2. Thereby, dirt such as the liquid, dust, or the like adhering to the nozzle surface 23 of the liquid ejecting head 21 can be removed.

As shown in FIG. 11, the waste liquid recovery mechanism 80 causes the waste liquid L2 recovered by flushing and cleaning and the waste liquid L2 recovered by wiping to flow out to the waste liquid accommodating portion 86 through the waste liquid recovery path 81 by the third pump 82. Thereby, both the waste liquid L2 recovered by flushing and cleaning and the waste liquid L2 recovered by wiping can be collectively accommodated in the waste liquid accommodating portion 86.

The fourth pump 84 is a depressurization pump. Therefore, in the first waste liquid recovery path 81*a*, the fourth pump 84 lowers the air pressure in the buffer chamber 83 by discharging the air in the buffer chamber 83 to the outside of the buffer chamber 83. Thereby, the waste liquid L2 recovered by flushing and cleaning can be easily flowed into the buffer chamber 83. Then, the waste liquid L2 recovered by flushing and cleaning can be easily flowed into the waste liquid accommodating portion 86. That is, remaining of the waste liquid L2 in the recess 57 can be suppressed.

As shown in FIG. 10, the space SP surrounding the openings of the nozzles 22 when the unit cap 51*a* comes into contact with the liquid ejecting head 21 is humidified by the moisture contained in the humidifying fluid L1a filled in the humidifying chamber 55 at the time of capping. Thereby, the amount of moisture contained in the humidifying fluid L1a filled in the humidifying chamber 55 is reduced. That is, the concentration of the humidifying fluid L1a filled in the humidifying chamber 55 is higher than the concentration of the humidifying fluid L1a accommodated in the humidifying fluid accommodating section 61.

As shown in FIG. 13, in the capping device 50 including the humidifying fluid accommodating section 61, the supply flow path 62*a*, the recovery flow path 62*b*, and the first pump 63, the humidifying fluid L1a is circulated in the circulation path 62 by the circulation operation. Thereby, the humidifying fluid L1a in the circulation path 62 can be agitated. By agitating the humidifying fluid L1a in the circulation path 62, the concentration of the humidifying fluid L1a in the entire circulation path 62 can be made uniform. That is, by the circulation operation, the amount of moisture contained in the humidifying fluid L1a filled in the humidifying chamber 55 can be returned to an amount close to the amount at the time of shipment.

The controller 90 manages the time by a timer or the like, and regularly executes the circulation operation. Thereby, the concentration of the humidifying fluid L1a in the entire circulation path 62 can be made uniform at an appropriate timing. That is, the phenomenon that the concentration of the humidifying fluid L1a filled in the humidifying chamber 55 remains higher than the concentration of the humidifying fluid L1a accommodated in the humidifying fluid accommodating section 61 can be suppressed. More specifically, even if the amount of moisture contained in the humidifying fluid L1a filled in the humidifying chamber 55 decreases, the amount of moisture can be returned to the amount close to the amount at the time of shipment at an appropriate timing. Thereby, the occurrence of ejection failure by insufficient humidification of the openings of the nozzles 22 can be prevented.

As described above, among the plurality of unit caps 51*a*, the outlet 55*b* of one unit cap 51*a* is coupled to the inlet 55*a* of another unit cap 51*a* adjacent to the unit cap 51*a*, and the inlet 55*a* positioned furthest upstream is coupled to the supply flow path 62*a*, and the outlet 55*b* positioned furthest downstream is coupled to the recovery flow path 62*b*. Thereby, the humidifying fluid L1a in the circulation path 62 including the inside of the humidifying chambers 55 of the plurality of unit caps 51*a* can be agitated by only one supply flow path 62*a* and the recovery flow path 62*b*. Further, the concentration of the humidifying fluid L1a in the circulation path 62 including the inside of the humidifying chambers 55 of the plurality of unit caps 51*a* can be made uniform only by one supply flow path 62*a* and the recovery flow path 62*b*.

The volume of the humidifying fluid L1a accommodated in the humidifying fluid accommodating section 61 is reduced by the amount of the evaporated moisture by the capping device 50 humidifying the space SP with the moisture contained in the humidifying fluid L1a filled in the humidifying chamber 55, and periodically performing the circulation operation. Since the humidifying fluid accommodating section 61 has a detecting portion 61*a* for detecting the liquid surface in the humidifying fluid accommodating section 61, it can be determined that the concentration of the humidifying fluid L1a is higher than a predetermined concentration.

Figure 16:
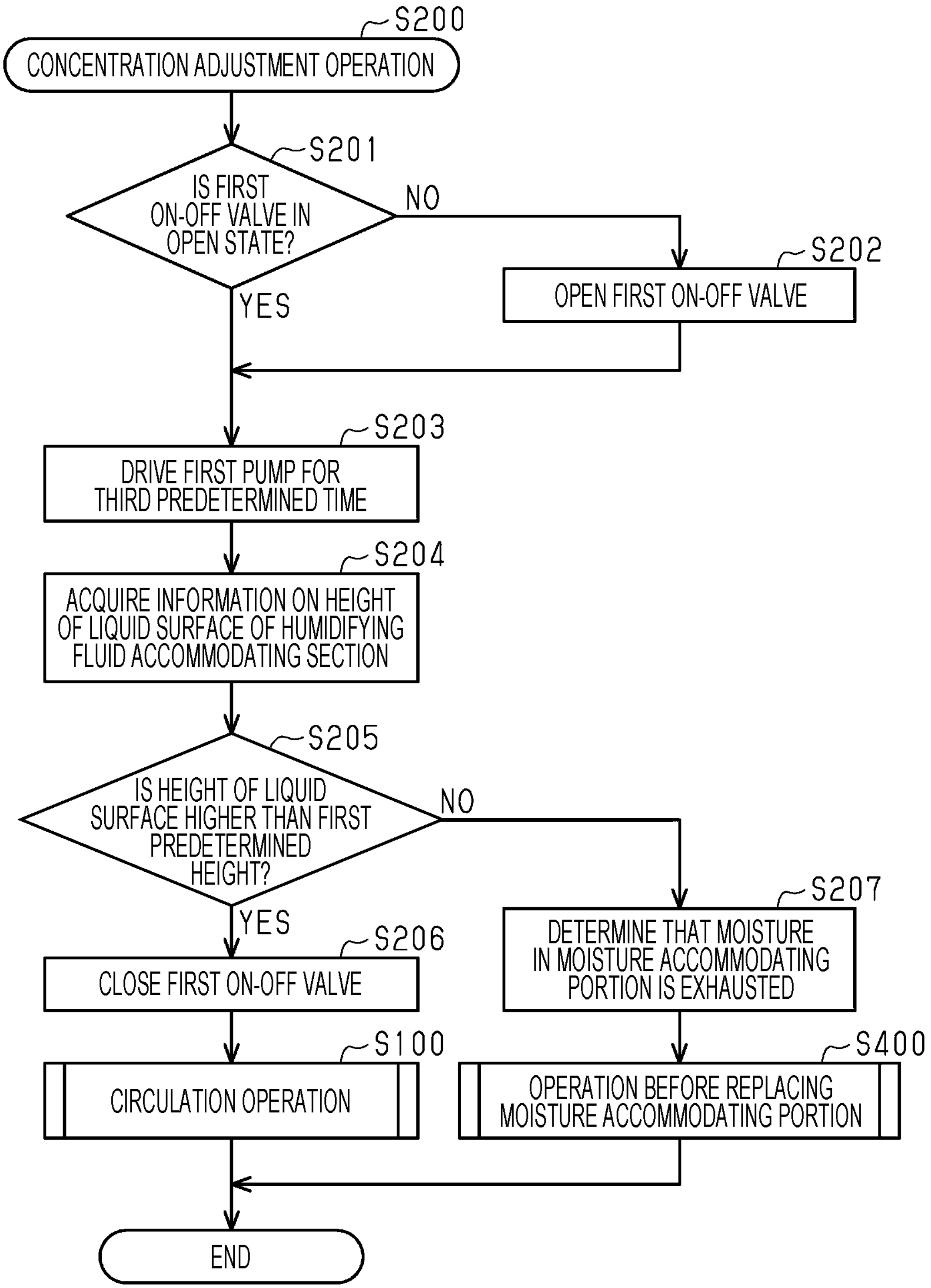
FIG. 16 is a flowchart showing the concentration adjustment operation.

In the circulation operation, when it is detected by the detecting portion 61*a* that the height of the liquid surface in the humidifying fluid accommodating section 61 is lower than the first predetermined height H1, it is determined that the concentration of the humidifying fluid L1a in the circulation path 62 is greater than the predetermined concentration, and the concentration adjustment operation flow shown in FIG. 16 is executed.

As shown in FIG. 15, by further providing the moisture supply portion 66 capable of supplying moisture in the circulation path 62, the humidifying fluid L1a can replenished with the moisture L1b when moisture evaporates from the humidifying fluid L1a to optimize the concentration of the humidifying fluid L1a. That is, the amount of moisture contained in the humidifying fluid L1a can be returned to the amount of moisture at the time of shipment.

The pressure loss of the flow path close to the moisture supply portion 66 is set to be the same as or larger than the pressure loss of the flow path close to the humidifying fluid accommodating section 61. Thereby, the rate of change in the height of the liquid surface in the humidifying fluid accommodating section 61 becomes slow and the liquid surface detection variation becomes small, and thus the height of the liquid surface can be detected in the right time.

That is, when the concentration adjustment operation is performed when the detecting portion 61*a* detects that the liquid surface in the humidifying fluid accommodating section 61 is below the first predetermined height H1, the capping device 50 supplies the moisture in the moisture accommodating portion 66*a* into the circulation path 62 until it is detected that the liquid surface reaches the first predetermined height H1 or higher. Then, the capping device 50 causes the humidifying fluid L1a to flow in the circulation path 62. Thereby, the concentration of the humidifying fluid L1a can be optimized by replenishing the humidifying fluid L1a with the moisture by the evaporated amount and then circulating the humidifying fluid L1a in the circulation path 62.

When it is detected by the detecting portion 61*a* that the height of the liquid surface in the humidifying fluid accommodating section 61 exceeds the first predetermined height H1 in the concentration adjustment operation, the capping device 50 closes the first on-off valve 66*c* and performs the above-mentioned circulation operation. That is, when the concentration adjustment operation is performed, the circulation operation is performed before the concentration adjustment operation is completed. Thereby, the humidifying fluid L1a in the circulation path 62 is agitated, and thus the concentration of the humidifying fluid L1a in the entire circulation path 62 can be made uniform even when the concentration adjustment operation is performed.

The volume of the humidifying fluid L1a in the circulation path 62 is increased by the capping device 50 replenishing the humidifying fluid L1a in the circulation path 62 with moisture by the evaporated amount. Further, the second moisture permeable membrane 61*e* provided at a coupling portion between the humidifying fluid accommodating section 61 and the second atmosphere communication passage 61*d* allows passage of the gas in the humidifying fluid accommodating section 61 and the second atmosphere communication passage 61*d*. Thereby, the same volume of air as the increased volume of the humidifying fluid L1a can flow out from the inside of the humidifying fluid accommodating section 61 to the second atmosphere communication passage 61*d* as the volume of the humidifying fluid L1a increases. Therefore, it is possible to easily replenish the humidifying fluid L1a in the circulation path 62 with moisture. Further, by making the area of the second moisture permeable membrane 61*e* large relative to the volume of the humidifying fluid accommodating section 61, the amount of air flowing out from the second atmosphere communication passage 61*d* to the atmosphere can be increased. Therefore, it is possible to efficiently replenish the humidifying fluid L1a with moisture by the evaporated amount.

As shown in FIG. 15, the capping device 50 performs the concentration adjustment operation including supplying the moisture L1b into the circulation path 62 by the moisture supply portion 66 and causing the humidifying fluid L1a to flow in the circulation path 62. Further, the capping device 50 performs the concentration adjustment operation including opening the first on-off valve 66*c* when supplying the moisture L1b in the moisture accommodating portion 66*a* into the circulation path 62, and closing the first on-off valve 66*c* when causing the humidifying fluid L1a to flow in the circulation path 62. Depending on the state of the first on-off valve 66*c*, moisture can be supplied into the circulation path 62 by the evaporated amount, and the humidifying fluid L1a can be caused to flow in the circulation path 62, as necessary. Thereby, the concentration of the humidifying fluid L1a can be optimized by replenishing the humidifying fluid L1a with the moisture by the evaporated amount and then circulating the humidifying fluid L1a in the circulation path 62.

When recording on the medium M by the liquid ejecting head 21 is repeated in the liquid ejecting apparatus 11, the seal portion 56*e* of the unit cap 51*a* may lose its adhesiveness to the nozzle surface 23 due to deterioration or fatigue by repeated stress over a long period of time. In addition, malfunction may occur in the parts constituting the cap unit 51. In such a case, the cap unit 51 that has been used up until then is replaced with a new cap unit 51. The cap unit 51 may be configured so that the unit caps 51*a* are replaced one by one.

As shown in FIG. 17, when the cap unit 51 is replaced, the cap replacement preparation operation is performed. By supplying the pressurized air into the unit cap 51*a* from the pressurized air supply section 67, the pressurized air is supplied into the unit cap 51*a* and the humidifying fluid L1a in the unit cap 51*a* is discharged to the humidifying fluid accommodating section 61. Thereby, the humidifying fluid L1a in the unit cap 51*a* can be discharged to the outside of the unit cap 51*a*. Further, the humidifying fluid L1a in the unit cap 51*a* can be recovered in the humidifying fluid accommodating section 61. That is, the humidifying fluid L1a in the cap unit 51 that has been used up until then can be used as the humidifying fluid L1a in the cap unit 51 that will be used in the future.

In the circulation path 62 in which the humidifying fluid L1a flows, the capping device 50 may have the atmosphere supply portion for supplying the atmosphere to the circulation path 62 between the first merging portion 62*c* where the moisture supply portion 66 and the circulation path 62 merge and the inlet 55*a* of the unit cap 51*a*. The capping device 50 may further have a pump for pumping the atmosphere into the circulation path 62. Thereby, the humidifying fluid L1a in the unit cap 51*a* can be discharged to the outside of the unit cap 51*a*. Further, the humidifying fluid L1a in the unit cap 51*a* can be recovered in the humidifying fluid accommodating section 61.

As shown in FIG. 7, the humidifying chamber 55 is formed in a single-way flow path through which the inlet 55*a* and the outlet 55*b* communicate with each other by the first moisture permeable membrane 54 that covers the groove 55*c* and the groove 55*c*. Therefore, in the cap replacement preparation operation, by supplying pressurized air from the inlet 55*a* of the single-way flow path in the humidifying chamber 55, the humidifying fluid L1a can be easily discharged from the outlet 55*b* in the humidifying chamber 55.

As described above, among the plurality of unit caps 51*a*, the outlet 55*b* of one unit cap 51*a* is coupled to the inlet 55*a* of another unit cap 51*a* adjacent to the unit cap 51*a*, and the inlet 55*a* positioned furthest upstream is coupled to the supply flow path 62*a*, and the outlet 55*b* positioned furthest downstream is coupled to the recovery flow path 62*b*. Thereby, one supply flow path 62*a*, one recovery flow path 62*b*, and one pressurized air supply section 67 can discharge the humidifying fluid L1a in the humidifying chambers 55 of the plurality of unit caps 51*a* by the cap replacement preparation operation.

As shown in FIG. 17, the humidifying fluid accommodating section 61 has the second atmosphere communication passage 61*d*. The second atmosphere communication passage 61*d* allows the humidifying fluid accommodating section 61 to communicate with the atmosphere by a labyrinthine capillary structure. In the cap replacement preparation operation, even when pressurized air is supplied into the humidifying fluid accommodating section 61, the flowing-out of the humidifying fluid L1a from the humidifying fluid accommodating section 61 to the outside of the humidifying fluid accommodating section 61 through the second atmosphere communication passage 61*d* can be suppressed by the labyrinthine capillary structure of the second atmosphere communication passage 61*d*.

As shown in FIG. 17, the humidifying fluid accommodating section 61 has the second moisture permeable membrane 61*e*. The second moisture permeable membrane 61*e* allows the passage of gas while restricting the passage of liquid. In the cap replacement preparation operation, even when pressurized air is supplied into the humidifying fluid accommodating section 61, the flowing-out of the humidifying fluid L1a from the humidifying fluid accommodating section 61 to the outside of the humidifying fluid accommodating section 61 through the second atmosphere communication passage 61*d* can be suppressed.

The above-mentioned circulation operation is executed before the cap unit 51 that has been used up until then is replaced with a new cap unit 51 and first recording is made on the medium M, and the humidifying chamber 55 of the unit cap 51*a* of the new cap unit 51 is filled with the humidifying fluid L1a. Thereby, even in the replaced cap unit 51, the space SP surrounding the openings of the nozzles 22 when the unit cap 51*a* comes into contact with the liquid ejecting head 21 is humidified, and thus the openings of the nozzles 22 can be humidified.

In the liquid ejecting apparatus 11, even in the cap unit 51 after replacement, the space SP surrounding the openings of the nozzles 22 when the unit cap 51*a* comes into contact with the liquid ejecting head 21 is humidified, and thus the moisture in the humidifying fluid L1a is used. The used moisture is replenished from the moisture accommodating portion 66*a* into the humidifying fluid L1a at the time of the concentration adjustment operation. That is, even in the replaced cap unit 51, the opening of the nozzle 22 of the liquid ejecting head 21 can be humidified without newly replenishing the humidifying fluid L1a in the circulation path 62.

As shown in FIG. 15, when the first pump 63 is driven by for the third predetermined time T3 in the above-mentioned concentration adjustment operation, the controller 90 determines that the moisture in the moisture accommodating portion 66*a* is exhausted when it is detected by the detecting portion 61*a* that the height of the liquid surface in the humidifying fluid accommodating section 61 is lower than the first predetermined height H1. Since the humidifying fluid accommodating section 61 has the detecting portion 61*a* for detecting the liquid surface in the humidifying fluid accommodating section 61, it is detected that the amount of moisture in the moisture accommodating portion 66*a* has reached an amount at which it is determined that the moisture accommodating portion 66*a* is required to be replaced.

When the amount of moisture in the moisture accommodating portion 66*a* used for humidifying the openings of the nozzles 22 has reached the amount at which it is determined that the moisture accommodating portion 66*a* is required to be replaced, the moisture accommodating portion 66*a* that has been used up to now is replaced with a full moisture accommodating portion 66*a*. However, when the user does not have a moisture accommodating portion 66*a* for replacement, the openings of the nozzles 22 cannot be humidified by the humidifying fluid L1a until the user acquires the moisture accommodating portion 66*a* for replacement. Further, when the moisture accommodating portion 66*a* is configured so as not to be replaced by the user, the openings of the nozzles 22 cannot be humidified by the humidifying fluid L1a until the moisture accommodating portion 66*a* is replaced by the serviceman.

Until the moisture accommodating portion 66*a* is replaced, the first parameter table for flushing is switched to the second parameter table when the moisture L1b in the moisture accommodating portion 66*a* is exhausted. Thereby, the openings of the nozzles 22 are humidified by flushing. That is, the space SP can be humidified by performing empty ejection from the liquid ejecting head 21 into the unit cap 51*a* until the moisture accommodating portion 66*a* is replaced. Therefore, the printing work by the user can be continued.

As shown in FIG. 19, when the moisture accommodating portion 66*a* is replaced, the cap replacement preparation operation is performed. By supplying the pressurized air into the unit cap 51*a* from the pressurized air supply section 67, the humidifying fluid L1a in the unit cap 51*a* is discharged to the humidifying fluid accommodating section 61 and the pressurized air is supplied into the unit cap 51*a*. Thereby, the humidifying fluid L1a in the unit cap 51*a* can be discharged.

As shown in FIG. 9, the recess 57 has the absorber 53 capable of absorbing a liquid at a position in contact with the first moisture permeable membrane 54. Since the amount of waste liquid L2 ejected into the unit cap 51*a* increases due to flushing or cleaning, a larger amount of waste liquid L2 than usual is absorbed by the absorber 53. Then, the waste liquid L2 absorbed by the absorber 53 spreads over the entire absorber 53. With the large amount of waste liquid L2 absorbed by the absorber 53, the space SP can be humidified more effectively until the moisture accommodating portion 66*a* is replaced. Then, the openings of the nozzles 22 of the liquid ejecting head 21 can be humidified more effectively.

As in the present embodiment, even when the humidifying chamber 55 is provided in an inclined attitude with respect to the horizontal, the waste liquid L2 absorbed by the absorber 53 spreads over the entire absorber 53. That is, by absorbing the waste liquid L2 by the absorber 53, the influence of the bias of the waste liquid L2 in the recess 57 by gravity can be suppressed. Thereby, even when the humidifying chamber 55 is provided in an inclined attitude with respect to the horizontal, the entire space SP can be humidified more uniformly. Then, the openings of the plurality of nozzles 22 of the liquid ejecting head 21 can be humidified more uniformly.

The absorber 53 is positioned at a position in contact with the first moisture permeable membrane 54. Therefore, the position of the absorber 53 can be restricted by restricting only the surface on the side where the absorber 53 is not in contact with the first moisture permeable membrane 54 by the restriction member 52.

By using a material that repels the liquid ejected from the liquid ejecting head 21 for the seal portion 56*e*, even when the amount of waste liquid L2 discharged into the unit cap 51*a* increases by flushing or cleaning, the dripping of the liquid in the unit cap 51*a* from the seal portion 56*e* to the outside of the unit cap 51*a* can be suppressed.

When the moisture accommodating portion 66*a* is replaced, the second parameter table of flushing is returned to the normal first parameter table, and the concentration adjustment operation is executed. Since the period during which the amount of waste liquid L2 ejected into the unit cap 51*a* increases by flushing is only the period until the moisture accommodating portion 66*a* is replaced, the amount of liquid used by flushing can be reduced.

As described above, the capping device 50 includes the unit cap 51*a* having the recess 57 forming the space SP, the humidifying chamber 55, and the first moisture permeable membrane 54, and further, the recess 57 has the discharge hole 56*b*, and thus with one unit cap 51*a*, the liquid discharged from the nozzles 22 can be received and discharged, and the nozzles 22 can be humidified, as necessary. Then, agitation and concentration of the humidifying fluid L1a can be optimized by circulating the humidifying fluid L1a in the circulation path 62 while replenishing moisture to the humidifying fluid L1a by the evaporated amount. That is, the humidifying fluid L1a in the entire circulation path 62 can be maintained in a state suitable for humidifying the nozzles 22 of the liquid ejecting head 21.

The effect of the present embodiment will be described.

(1) The capping device 50 includes the unit cap 51*a* including the recess 57 that forms the space SP when the unit cap 51*a* comes into contact with the liquid ejecting head 21, the humidifying chamber 55 through which the humidifying fluid L1a flows, and the first moisture permeable membrane 54 having gas permeability that partitions the recess 57 and the humidifying chamber 55. The recess 57 has the discharge hole 56*b* capable of discharging the waste liquid L2 discharged from the nozzles 22 of the liquid ejecting head 21 into the unit cap 51*a*. Moisture evaporated from the humidifying fluid L1a in the humidifying chamber 55 passes through the first moisture permeable membrane 54 and reaches the inside of the recess 57, and accordingly, the space SP formed by the recess 57 is humidified and the openings of the nozzles 22 is humidified. Further, the waste liquid L2 discharged into the unit cap 51*a* does not flow into the inside of the humidifying chamber 55 by the first moisture permeable membrane 54, and accordingly, is discharged to the outside of the unit cap 51*a* through the discharge hole 56*b* in the recess 57. Thereby, with one unit cap 51*a*, the waste liquid L2 discharged from the nozzles 22 can be received and discharged, and the nozzles 22 can be humidified. That is, in the liquid ejecting apparatus 11, the space where just one cap is disposed is enough, instead of the space, where both caps have been required to be disposed, the cap of the capping mechanism that prevents clogging of the nozzles 22 and the cap of the capping device that suppresses drying of the nozzles 22. Thereby, the increase of the liquid ejecting apparatus 11 can be suppressed.

(2) The discharge hole 56*b* is provided in the recess 57 at a position lower than that of the first moisture permeable membrane 54. The waste liquid L2 in the recess 57 can be discharged to the outside of the unit cap 51*a* through the discharge hole 56*b* by gravity. Then, the amount of waste liquid L2 remaining in the recess 57 can be reduced. Further, the phenomenon that the moisture evaporated from the humidifying fluid L1a in the humidifying chamber 55 is unable to pass through the first moisture permeable membrane 54 due to blockage of the surface of the first moisture permeable membrane 54 with the waste liquid L2 can be suppressed. That is, the situation in which the openings of the nozzles 22 of the liquid ejecting head 21 is unable to be humidified can be suppressed.

(3) The discharge hole 56*b* is provided at the lowermost portion of the recess 57. The waste liquid L2 in the recess 57 can be discharged to the outside of the unit cap 51*a* through the discharge hole 56*b* by gravity. Then, remaining of the waste liquid L2 in the recess 57 can be suppressed.

(4) The recess 57 has the absorber 53 capable of absorbing a liquid at a position in contact with the first moisture permeable membrane 54. The waste liquid L2 discharged into the recess 57 is absorbed by the absorber 53. Further, the moisture that evaporates from the humidifying fluid L1a and passes through the first moisture permeable membrane 54 humidifies the waste liquid L2 absorbed by the absorber 53. The waste liquid L2 absorbed by the absorber 53 spreads over the entire absorber 53. Thereby, the distribution of the waste liquid L2 absorbed by the absorber 53 can be made uniform. That is, the entire space SP can be humidified more uniformly. Then, the openings of the plurality of nozzles 22 of the liquid ejecting head 21 can be humidified more uniformly.

(5) The humidifying chamber 55 has the groove 55*c* through which the humidifying fluid L1a to flow. The humidifying chamber 55 is formed in a flow path through which the inlet 55*a* and the outlet 55*b* communicate with each other by the first moisture permeable membrane 54 that covers the groove 55*c* and the groove 55*c*. The humidifying fluid L1a is caused to flow in the humidifying chamber 55 formed in the form of a single-way flow path through which the inlet 55*a* and the outlet 55*b* communicate with each other, and thus the humidifying fluid L1a can be filled in the humidifying chamber 55 or discharged from the humidifying chamber 55, as necessary. Further, since the humidifying chamber 55 is formed in the above-mentioned shape of the flow path, unnecessary flowing-out of the humidifying fluid L1a filled in the humidifying chamber 55 from the humidifying chamber 55 can be suppressed. Further, since the flow path is drawn around the entire bottom surface of the unit cap 51*a*, the entire inside of the recess 57 can be humidified. Thereby, the openings of the plurality of nozzles 22 of the liquid ejecting head 21 can be humidified more uniformly.

(6) The humidifying chamber 55 is provided in an inclined attitude with respect to the horizontal, and the inlet 55*a* and the outlet 55*b* are provided above the center of the humidifying chamber 55 in the vertical direction. Thereby, it is possible to suppress flowing-out of the humidifying fluid L1a filled in the humidifying chamber 55 from the humidifying chamber 55 through the inlet 55*a* or the outlet 55*b* by the water head pressure.

(7) The recess 57 has the atmosphere communication hole 56*a* such that the space SP communicates with the atmosphere, and the atmosphere communication hole 56*a* is provided above the center of the recess 57 in the vertical direction. Thereby, the phenomenon that the atmosphere communication hole 56*a* is blocked with the waste liquid L2 and the waste liquid L2 cannot be discharged from the recess 57 can be suppressed.

(8) The capping device 50 further includes the humidifying fluid accommodating section 61, the supply flow path 62*a*, the recovery flow path 62*b*, and a first pump 63 capable of causing the humidifying fluid L1a to flow in the circulation path 62. Thereby, the humidifying fluid L1a in the circulation path 62 can be agitated. In order to humidify the space SP, a lot of moisture evaporates from the humidifying fluid L1a filled in the humidifying chamber 55. Thereby, by agitating the humidifying fluid L1a in the circulation path 62, the concentration of the humidifying fluid L1a in the entire circulation path 62 can be made uniform. That is, the amount of moisture contained in the humidifying fluid L1a filled in the humidifying chamber 55 can be returned to an amount close to the amount when the liquid ejecting apparatus 11 is shipped.

(9) The capping device 50 further includes the moisture supply portion 66 capable of supplying moisture into the circulation path 62. Thereby, when the moisture evaporates from the humidifying fluid L1a, the humidifying fluid L1a can be replenished with the moisture L1b to optimize the concentration of the humidifying fluid L1a. That is, the amount of moisture contained in the humidifying fluid L1a can be returned to the amount when the liquid ejecting apparatus is shipped.

(10) The capping device 50 includes a plurality of unit caps 51*a* arranged side by side. Then, among the plurality of unit caps 51*a*, the outlet 55*b* of one unit cap 51*a* is coupled to the inlet 55*a* of another unit cap 51*a* adjacent to the unit cap 51*a*. Then, the inlet 55*a* positioned furthest upstream is coupled to the supply flow path 62*a*, and the outlet 55*b* positioned furthest downstream is coupled to the recovery flow path 62*b*. Thereby, the humidifying fluid L1a can be filled, agitated, and discharged for a plurality of unit caps 51*a* with only one supply flow path 62*a* and one recovery flow path 62*b*.

(11) The maintenance method for the capping device 50 performs the concentration adjustment operation including supplying the moisture into the circulation path 62 by the moisture supply portion 66 and causing the humidifying fluid L1a to flow in the circulation path 62. Thereby, the concentration of the humidifying fluid L1a can be optimized by replenishing the humidifying fluid L1a with the moisture by the evaporated amount and then circulating the humidifying fluid L1a in the circulation path 62. That is, the humidifying fluid L1a in the entire circulation path 62 can be maintained in a state suitable for humidifying the nozzles 22 of the liquid ejecting head 21.

(12) The maintenance method for the capping device 50 performs the concentration adjustment operation including opening the first on-off valve 66*c* when supplying the moisture of the moisture accommodating portion 66*a* into the circulation path 62, and closing the first on-off valve 66*c* when causing the humidifying fluid L1a to flow in the circulation path 62. Depending on the state of the first on-off valve 66*c*, moisture can be supplied into the circulation path 62 by the evaporated amount, and the humidifying fluid L1a can be caused to flow in the circulation path 62, as necessary. Thereby, the concentration of the humidifying fluid L1a can be optimized by replenishing the humidifying fluid L1a with the moisture by the evaporated amount and then circulating the humidifying fluid L1a in the circulation path 62. That is, the humidifying fluid L1a in the entire circulation path 62 can be maintained in the state suitable for humidifying the nozzles 22 of the liquid ejecting head 21.

(13) The maintenance method for the capping device 50 performs the cap replacement preparation operation for supplying the pressurized air from the pressurized air supply section 67 into the unit cap 51*a* when the unit cap 51*a* is replaced to discharge the humidifying fluid L1a in the unit cap 51*a* to the humidifying fluid accommodating section 61 and supply the pressurized air into the unit cap 51*a*. Thereby, the humidifying fluid L1a in the unit cap 51*a* can be discharged to the outside of the unit cap 51*a*. Further, the humidifying fluid L1a in the unit cap 51*a* can be recovered in the humidifying fluid accommodating section 61. That is, the humidifying fluid L1a in the cap unit 51 that has been used up until then can be used as the humidifying fluid L1a in the cap unit 51 that will be used in the future. The cap unit 51 after replacement can also humidify the openings of the nozzles 22 of the liquid ejecting head 21.

(14) The maintenance method for the capping device 50 includes the operation before replacing the moisture accommodating portion including the above-mentioned cap replacement preparation operation, and humidifying the nozzles 22 by performing the empty ejection, which is the ejection of the liquid not related to printing, from liquid ejecting head 21 to the space SP in the unit cap 51*a* until the moisture accommodating portion 66*a* is replaced. Thereby, the humidifying fluid L1a in the unit cap 51*a* can be discharged. Then, in a state where the humidifying fluid L1a in the unit cap 51*a* is discharged, empty ejection can be performed from the liquid ejecting head 21 into the unit cap 51*a* to humidify the space SP. Thereby, the printing work by the user can be continued.

(15) The maintenance method for the capping device 50 supplies the moisture in the moisture accommodating portion 66*a* into the circulation path 62 until it is detected that the liquid surface reaches the first predetermined height H1 or higher, and then causes the humidifying fluid L1a to flow in the circulation path 62, when the concentration adjustment operation is performed when the detecting portion 61*a* detects that the liquid surface in the humidifying fluid accommodating section 61 is below the first predetermined height H1. Thereby, the concentration of the humidifying fluid L1a can be optimized by replenishing the humidifying fluid L1a with the moisture by the evaporated amount and then circulating the humidifying fluid L1a in the circulation path 62. That is, the humidifying fluid L1a in the entire circulation path 62 can be maintained in the state suitable for humidifying the nozzles 22 of the liquid ejecting head 21.

The present embodiment can be implemented by changing as follows. The present embodiment and the following modification examples can be implemented in combination with each other unless there is a technical contradiction.

The capping device 50 may be provided in the liquid ejecting apparatus that ejects the liquid from the liquid ejecting head 21 toward the medium M in the vertical direction. At the time of capping in the unit cap 51*a*, the close contact surface 56*f* which is in close contact with the nozzle surface 23 of the liquid ejecting head 21, the absorber 53, the first moisture permeable membrane 54, and the humidifying chamber 55 may be provided in a horizontal state. That is, the unit cap 51*a* of the present embodiment may be provided in the horizontal state in the liquid ejecting apparatus that ejects the liquid from the liquid ejecting head 21 toward the medium M in the vertical direction. Further, the absorber 53, the first moisture permeable membrane 54, and the humidifying chamber 55 may be provided in a state of being inclined with respect to the horizontal as in the present embodiment, and only the close contact surface 56*f* may be provided in the horizontal state.

The angle at which the humidifying chamber 55 is inclined with respect to the horizontal does not have to be the same as the angle at which the nozzle surface 23 on which the nozzles 22 of the liquid ejecting head 21 are arranged is inclined with respect to the horizontal. The angle at which the humidifying chamber 55 is inclined with respect to the horizontal may be larger or smaller than the angle at which the nozzle surface 23 is inclined with respect to the horizontal.

The capping device 50 may be provided in a liquid ejecting apparatus which is a serial type ink jet printer for performing printing by ejecting a liquid toward the medium M by a liquid ejecting head supported by a carriage that moves reciprocally in the width direction X. When the reciprocating carriage moves from the ejection region where printing is performed on the medium M to the maintenance region outside the ejection region in the width direction X for maintenance, the cap of the capping device 50 disposed in the maintenance region may cap the nozzle surface of the liquid ejecting head. In that case, the capping device 50 may be configured such that, when the carriage moves to the maintenance region and the liquid ejecting head is positioned at the maintenance position, capping is performed by moving the cap closer to the nozzle surface of the liquid ejecting head and bring the cap into close contact with the nozzle surface. Thereby, even in the serial type liquid ejecting apparatus, with one cap, the waste liquid discharged from the nozzles can be received and discharged, and the nozzles can be humidified. Then, even in the serial type liquid ejecting apparatus, the space where just one cap is disposed is enough, instead of the space, where both caps have been required to be disposed, the cap of the capping mechanism that prevents clogging of the nozzles and the cap of the capping device that suppresses drying of the nozzles. Thereby, the increase of the serial type liquid ejecting apparatus 11 can be suppressed.

The capping device 50 may have a plurality of unit caps 51*a*, or may have only one unit cap 51*a*. When the capping device 50 has only one unit cap 51*a*, the unit cap 51*a* has one restriction member 52, one absorber 53, one first moisture permeable membrane 54, one humidifying chamber 55, and one case 56.

As in the above embodiment, even in the case of a line-type ink jet printer in which the liquid ejecting head 21 consisting of the five unit ejecting heads 21*a* is used, the capping device 50 may have only one unit cap 51*a*. Further, also in the above-mentioned serial type liquid ejecting apparatus, the capping device 50 may have only one unit cap 51*a*.

The restriction member 52, the absorber 53, the first moisture permeable membrane 54, and the humidifying chamber 55 included in the capping device 50 does not have to be provided in the same number. For example, the capping device 50 may include only one unit cap 51*a*, and the unit cap 51*a* may include one restriction member 52, one absorber 53, one first moisture permeable membrane 54, and a plurality of humidifying chambers 55. Further, the capping device 50 may include a plurality of unit caps 51*a*, and each of the plurality of unit caps 51*a* may include one restriction member 52, one absorber 53, one first moisture permeable membrane 54, and a plurality of humidifying chambers 55.

The unit cap 51*a* may have a plurality of recesses 57.

The recess 57 may have a plurality of discharge holes 56*b*.

The recess 57 may have a plurality of atmosphere communication holes 56*a*.

When the capping device 50 has a plurality of unit caps 51*a*, the recesses may be configured such that the spaces SP formed by the recesses 57 of the unit caps 51*a* communicate with each other without passing through the discharge holes 56*b*. For example, the unit caps 51*a* may be configured such that the bottom of one unit cap 51*a* and the bottom of another unit cap 51*a* adjacent to the unit cap 51*a* communicate with each other inside the cap unit 51. In this case, the number of discharge holes 56*b* in the cap unit 51 may be one.

The absorber 53 does not have to be in contact with the first moisture permeable membrane 54. For example, the position of the surface of the absorber 53 in the −Y1 direction may be restricted by a restriction member 52 different from the restriction member 52 that restricts the position of the surface of the absorber 53 in the +Y1 direction, and a space may be provided between the first moisture permeable membrane 54 and the absorber 53.

In the above embodiment, the flow path of the humidifying chamber 55 is formed in the labyrinthine shape of the single-way from the inlet 55*a* to the outlet 55*b*, but may be two-way or three-way. The flow path may be connected from the inlet 55*a* to the outlet 55*b*.

The arrangement of the unit ejecting heads 21*a* constituting the liquid ejecting head 21 can be changed as appropriate. The configuration is not limited to the configuration in which the unit ejecting heads 21*a* are arranged diagonally as in the above embodiment; for example, two rows in which the unit ejecting heads 21*a* are arranged at regular intervals in the width direction X are provided in a staggered arrangement in which the positions are shifted in the width direction by half the distance between the rows.

In the above embodiment, the moisture supply portion 66 capable of supplying moisture is provided in the supply flow path 62*a* in the circulation path 62; however, the moisture supply portion 66 may be provided in the recovery flow path 62*b* in the circulation path 62. In that case, the capping device 50 may further include a pump for supplying moisture to the recovery flow path 62*b*.

In the above embodiment, the third on-off valve 58*b* for communicating the space SP with the atmosphere is opened and closed by the movement of the cap unit 51. An actuator-type on-off valve capable of being opened and closed by controller 90 may be provided in the first atmosphere communication passage 58*a* regardless of the position of the cap unit 51.

The capping device 50 may have a second detecting portion that detects the amount of the moisture L1b in the moisture accommodating portion 66*a*. Based on the detection result of the second detecting portion, the controller 90 may determine whether or not the amount of the moisture L1b in the moisture accommodating portion 66*a* reaches the amount required to replace the moisture accommodating portion.

The capping device 50 may be configured to be able to replenish the moisture in the moisture accommodating portion 66*a*. Further, the capping device 50 may be configured such that the humidifying fluid accommodating section 61 can be replaced.

The timing at which the circulation operation is executed may be changed by the administrator or the user.

The first predetermined time T1, the second predetermined time T2, the third predetermined time T3, and the fourth predetermined time T4 do not always have to be constant times. The values may be changed depending on the temperature and humidity environment. The values may also be changed by the administrator or user.

The liquid ejecting apparatus 11 may have the third parameter table as a flushing parameter table, in which the amount of liquid ejected is larger. Then, when the interval of the time during which the concentration adjustment operation is performed is short, the controller 90 may switch the parameter table to the third parameter table in the switching of the flushing table in the operation before replacing the moisture accommodating portion. That is, the liquid ejecting apparatus 11 may have a plurality of parameter tables having different liquid ejection amounts as the flushing parameter table. Then, in the switching of the flushing table in the operation before replacing the moisture accommodating portion, the controller 90 may switch the parameter table to an appropriate parameter table among the plurality of parameter tables depending on the interval of the time when the concentration adjustment operation is performed.

The liquid ejecting apparatus 11 may be liquid ejecting apparatuses that eject and discharge liquids other than the ink. The state of the liquid ejected as a minute amount of droplets from the liquid ejecting apparatus includes those having a granular, tear-like, or thread-like tail. The liquid referred to here may be any material that can be ejected from the liquid ejecting apparatus. For example, the liquid may be in the state when the substance is in the liquid phase, and the liquid includes fluids such as highly viscous or low viscous liquids, sol, gel water, other inorganic solvents, organic solvents, solutions, liquid resins, liquid metals, metal melts, and the like. The liquid includes not only a liquid as a state of a substance but also a liquid in which particles of a functional material made of a solid substance such as a pigment or a metal particle are dissolved, dispersed, or mixed in a solvent. Typical examples of the liquid include ink, liquid crystal, and the like as described in the above-described embodiment.

Hereinafter, second to fourth embodiments of a liquid ejecting apparatus 111 and a control method of the liquid ejecting apparatus 111 will be described with reference to the drawings. The liquid ejecting apparatus 111 is an ink jet printer which ejects ink, which is an example of a liquid, to perform recording on a medium M such as a paper sheet.

Second Embodiment

About Configuration of Liquid Ejecting Apparatus

Figure 23:
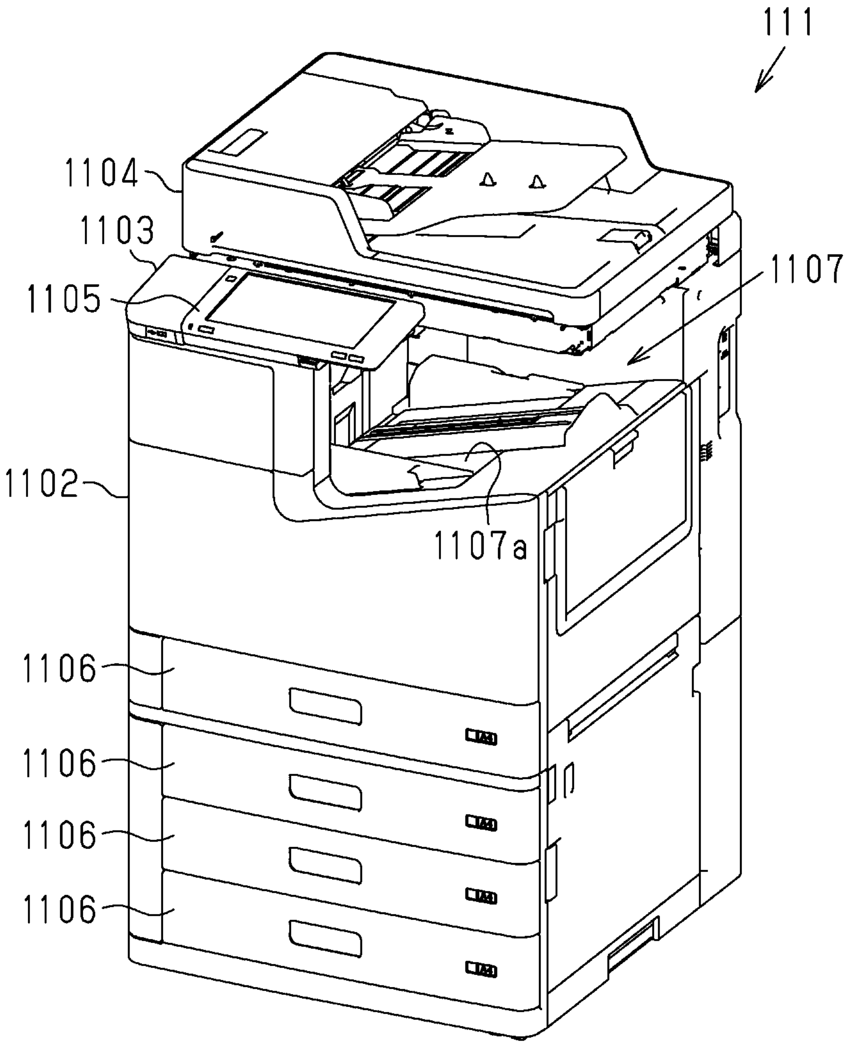
FIG. 23 is a perspective view showing a liquid ejecting apparatus according to a second embodiment.

As shown in FIG. 23, the liquid ejecting apparatus 111 includes generally includes a rectangular parallelepiped main body 1102, an image reading section 1103, and an automatic feeding section 1104. The image reading section 1103 is mounted on the main body 1102. The automatic feeding section 1104 is mounted on the image reading section 1103.

The image reading section 1103 is configured to read images recorded on the original document, such as characters and photographs. The automatic feeding section 1104 is configured to feed the original document to the image reading section 1103. The image reading section 1103 has an operation portion 1105. The operation portion 1105 has, for example, a touch panel type liquid crystal screen and buttons for operation. The user operates the operation portion 1105 to give an instruction to the liquid ejecting apparatus 111.

The main body 1102 has one or a plurality of medium accommodating portions 1106 capable of accommodating a plurality of media, for example, a plurality of paper sheets. In one example, the main body 1102 has four medium accommodating portions 1106. The medium accommodating portion 1106 is retractably accommodated with respect to the main body 1102. The main body 1102 has a placement portion 1107 on its upper portion. The placement portion 1107 has a placement surface 1107*a* on which the recording medium is placed.

The medium accommodated in the medium accommodating portion 1106 is transported to the placement portion 1107 by a feeding roller (not shown). More specifically, the feeding roller rotates in a state of being in contact with the uppermost medium among the plurality of media accommodated in the medium accommodating portion 1106. Thereby, the uppermost medium is sent out from the medium accommodating portion 1106 to the upper side of the medium accommodating portion 1106. A liquid ejecting head 113*a* (see FIG. 24) ejects the liquid toward the medium to be transported. Recording is performed by adhering the ejected liquid to the medium. The medium after recording is discharged toward the placement portion 1107 by one or a plurality of discharge rollers (not shown).

Figure 24:
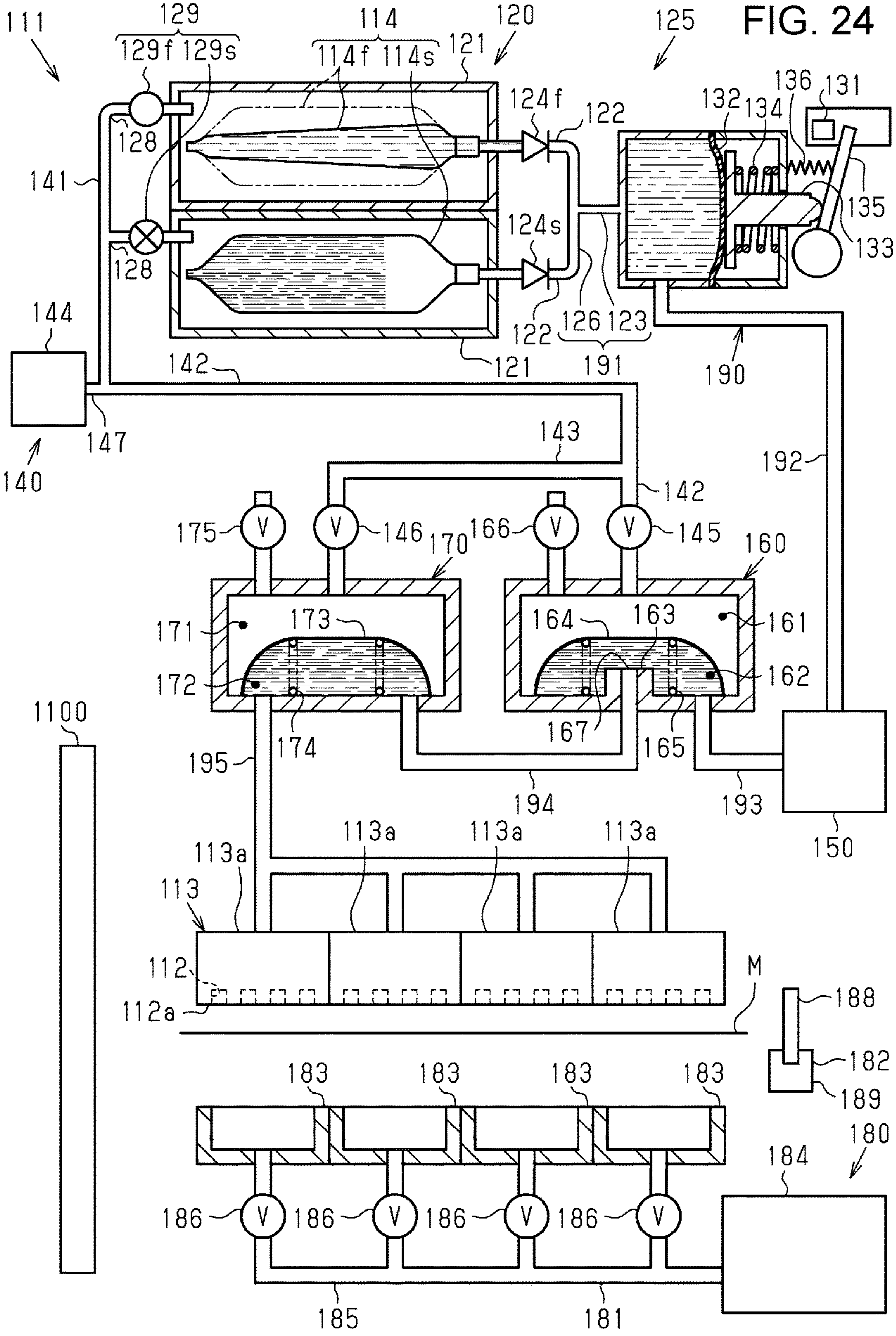
FIG. 24 is a schematic view showing a schematic configuration of the liquid ejecting apparatus of FIG. 23.

As shown in FIG. 24, the liquid ejecting apparatus 111 includes a liquid ejecting portion 113, a liquid accommodating portion 120, a storage portion 125, a supply mechanism 140, a pressure adjusting portion 150, a supply restricting portion 160, a liquid pressurizing portion 170, a maintenance portion 180, and a controller 1100. The liquid accommodating portion 120 accommodates the liquid supplied to the liquid ejecting portion 113. The storage portion 125 temporarily stores the liquid supplied from the liquid accommodating portion 120 to the liquid ejecting portion 113. The supply mechanism 140 is configured to deliver air to the liquid accommodating portion 120, the supply restricting portion 160, and the liquid pressurizing portion 170. The pressure adjusting portion 150 is configured to adjust the pressure of the liquid supplied from the liquid accommodating portion 120 to the liquid ejecting portion 113. The supply restricting portion 160 is configured to restrict the supply of liquid from the liquid accommodating portion 120 to the liquid ejecting portion 113. The liquid pressurizing portion 170 is configured to pressurize the liquid supplied to the liquid ejecting portion 113. The maintenance portion 180 is configured to perform maintenance on the liquid ejecting portion 113. The controller 1100 is configured to control various components of the liquid ejecting apparatus 111.

The liquid ejecting apparatus 111 includes a plurality of supply flow paths 190 for flowing the liquid. The plurality of supply flow paths 190 include a first supply flow path 191, a second supply flow path 192, a third supply flow path 193, a fourth supply flow path 194, and a fifth supply flow path 195. The first supply flow path 191 couples the liquid accommodating portion 120 and the storage portion 125. The second supply flow path 192 couples the storage portion 125 and the pressure adjusting portion 150. The third supply flow path 193 couples the pressure adjusting portion 150 and the supply restricting portion 160. The fourth supply flow path 194 couples the supply restricting portion 160 and the liquid pressurizing portion 170. The fifth supply flow path 195 couples the liquid pressurizing portion 170 and the liquid ejecting portion 113. The liquid accommodated in the liquid accommodating portion 120 is supplied to the liquid ejecting portion 113 through these supply flow paths 191 to 195. In the following description, in these supply flow paths, the side with the first supply flow path 191 is referred to as upstream, and the side with the fifth supply flow path 195 is referred to as downstream.

The liquid ejecting portion 113 has one or a plurality of liquid ejecting heads 113*a* capable of ejecting the liquid. Each liquid ejecting head 113*a* has a nozzle surface 112*a* through which one or a plurality of nozzles 112 open. The fifth supply flow path 195 is branched and coupled to each liquid ejecting head 113*a*.

The liquid ejecting head 113*a* ejects liquid from the plurality of nozzles 112 toward the medium M. For example, the liquid ejecting portion 113 includes a cavity for storing the liquid, a diaphragm forming a portion of the cavity, and a piezoelectric element attached to the diaphragm for each nozzle 112 of the liquid ejecting head 113*a*. The volume of the cavity is changed by vibrating the diaphragm by driving these piezoelectric elements, and the liquid is ejected from the nozzle 112. When the liquid is ejected to the medium M, characters and images are recorded on the medium M.

The liquid accommodating portion 120 includes a liquid accommodating body 114 that is compressed and deformed in response to an external force. The liquid accommodating body 114 is, for example, a bag made of a flexible film member. The liquid accommodating body 114 has a supply port that communicates with the upstream end of the first supply flow path 191. The liquid accommodating portion 120 includes an accommodating container 121 for storing the liquid accommodating body 114. The accommodating container 121 is a closed container to which the upstream end of the first supply flow path 191 is coupled. When gas flows into the accommodating container 121 through a first delivery flow path 141, the pressure inside the accommodating container 121 increases. When the inside of the accommodating container 121 is pressurized in this way, the liquid accommodating body 114 is compressed and deformed. Thereby, the liquid accommodated in the liquid accommodating body 114 is pressurized and supplied toward the downstream. The details of the configuration around the liquid accommodating portion 120 including the storage portion 125 that temporarily stores the liquid supplied from the liquid accommodating portion 120 to the liquid ejecting portion 113 will be described later.

The supply mechanism 140 includes a supply pump 144 and a delivery flow path 147. The delivery flow path 147 may include a plurality of branch flow paths, for example, a first delivery flow path 141, a second delivery flow path 142, and a third delivery flow path 143. The supply pump 144 is, for example, a compression pump that pumps air. The first delivery flow path 141 couples the supply mechanism 140 and the liquid accommodating portion 120. The second delivery flow path 142 couples the supply restricting portion 160 and the first delivery flow path 141. The third delivery flow path 143 couples the second delivery flow path 142 and the liquid pressurizing portion 170. The delivery flow path 147, the first delivery flow path 141, the second delivery flow path 142, and the third delivery flow path 143 are flow paths through which gas can flow. Since the gas flows from the supply pump 144 toward the liquid accommodating portion 120, the supply restricting portion 160, and the liquid pressurizing portion 170, in the following description, the side with the supply pump 144 is referred to as upstream, and the side with the liquid accommodating portion 120, the supply restricting portion 160, and the liquid pressurizing portion 170 is referred to as downstream.

The supply mechanism 140 includes a third delivery valve 145 and a fourth delivery valve 146. The third delivery valve 145 restricts the flow of gas from the supply pump 144 to the supply restricting portion 160 when the valve is closed while allowing the flow of gas from the supply pump 144 to the supply restricting portion 160 when the valve is opened through the second delivery flow path 142. Further, the fourth delivery valve 146 restricts the flow of gas from the supply pump 144 to the liquid pressurizing portion 170 when the valve is closed while allowing the flow of gas from the supply pump 144 to the liquid pressurizing portion 170 when the valve is opened through the third delivery flow path 143. The supply mechanism 140 delivers gas to the supply restricting portion 160 and the liquid pressurizing portion 170 through the second delivery flow path 142 and the third delivery flow path 143 according to the open/closed state of the third delivery valve 145 and the fourth delivery valve 146. Opening the valve is said to open the valve, and closing the valve is said to close the valve.

When the liquid is ejected by the liquid ejecting head 113*a* and the pressure of the liquid in the third supply flow path 193 communicating with the liquid ejecting head 113*a* becomes lower than a predetermined pressure smaller than the atmospheric pressure, the pressure adjusting portion 150 communicates the second supply flow path 192 with the third supply flow path 193. On the other hand, when the pressure of the liquid in the third supply flow path 193 becomes equal to or higher than a predetermined pressure by communicating the second supply flow path 192 with the third supply flow path 193, the pressure adjusting portion 150 makes the second supply flow path 192 and the third supply flow path 193 non-communication.

The pressure adjusting portion 150 adjusts the pressure of the liquid supplied to the liquid ejecting head 113*a* so that the pressure is equal to or lower than a predetermined pressure. In one example, the pressure adjusting portion 150 perform adjustment so that the pressure of the liquid upstream of the pressure adjusting portion 150 is equal to or higher than the atmospheric pressure, for example, about 20 Pa and the pressure of the liquid downstream of the pressure adjusting portion 150 is lower than the atmospheric pressure, for example, about −1 kPa.

Each liquid ejecting head 113*a* has a plurality of pressure adjusting portions 150 provided for each type of liquid. For example, when four types of liquids are supplied to each liquid ejecting head 113*a*, one liquid ejecting head 113*a* is provided with four pressure adjusting portions 150 for each type of liquid.

As shown in FIG. 24, the supply restricting portion 160 is formed with a gas chamber 161 capable of storing gas, a liquid chamber 162 capable of storing liquid, and a protruding portion 163 formed in the liquid chamber 162 in a protruding manner in a direction from the liquid chamber 162 toward the gas chamber 161. The supply restricting portion 160 includes a film member 164, an urging member 165, and a first opening valve 166. The film member 164 partitions the gas chamber 161 and the liquid chamber 162. The urging member 165 urges the film member 164 in the liquid chamber 162 in a direction of increasing the volume of the liquid chamber 162. The first opening valve 166 opens the liquid chamber 162 to the atmosphere by opening the valve.

The gas chamber 161 communicates with the downstream end of the second delivery flow path 142, and the liquid chamber 162 communicates with the downstream end of the third supply flow path 193 and the upstream end of the fourth supply flow path 194. The upstream end of the fourth supply flow path 194 communicates with the liquid chamber 162 through an opening 167 of the protruding portion 163. The film member 164 has flexibility and is displaced in a direction in which the volumes of the gas chamber 161 and the liquid chamber 162 are increased or decreased according to the pressure difference between the gas chamber 161 and the liquid chamber 162. Further, the film member 164 is configured so that the opening 167 of the protruding portion 163 can be blocked. The first opening valve 166 communicates the gas chamber 161 with the atmosphere when the valve is opened, while first opening valve 166 makes the gas chamber 161 and the atmosphere non-communication when the valve is closed. That is, when the film member 164 is arranged as shown in FIG. 24, the opening 167 of the protruding portion 163 is opened by the urging force of the urging member 165, so that the supply of liquid from the third supply flow path 193 to the fourth supply flow path 194 is allowed.

As shown in FIG. 24, the liquid pressurizing portion 170 has a gas chamber 171 capable of storing gas and a liquid chamber 172 capable of storing liquid. The liquid pressurizing portion 170 includes a film member 173, an urging member 174, and a second opening valve 175. The film member 173 partitions the gas chamber 171 and the liquid chamber 172. The urging member 174 urges the film member 173 in the liquid chamber 172 in a direction of increasing the volume of the liquid chamber 172. The second opening valve 175 opens the liquid chamber 172 to the atmosphere by opening the valve.

The gas chamber 171 communicates with the downstream end of the third delivery flow path 143, and the liquid chamber 172 communicates with the downstream end of the fourth supply flow path 194 and the upstream end of the fifth supply flow path 195. The film member 173 has flexibility and is displaced in a direction in which the volumes of the gas chamber 171 and the liquid chamber 172 are increased or decreased according to the pressure difference between the gas chamber 171 and the liquid chamber 172. Further, the second opening valve 175 communicates the gas chamber 171 with the atmosphere when the valve is opened, while the second opening valve 175 makes the gas chamber 171 and the atmosphere non-communication when the valve is closed.

About Configuration around Liquid Accommodating Body

As shown in FIG. 24, in the liquid accommodating portion 120, the liquid is accommodated in the liquid accommodating body 114. This liquid is supplied to the liquid ejecting head 113*a*. A plurality of accommodating containers 121 are detachably attached to the liquid ejecting apparatus 111. Each accommodating container 121 accommodates the corresponding liquid accommodating body 114.

For example, two accommodating containers 121 are detachably attached to the liquid ejecting apparatus 111. The two accommodating containers 121 accommodate the same type of liquid. Further, the accommodating container 121 corresponding to another type of liquid may be attached to the liquid ejecting apparatus 111. Then, a plurality of accommodating containers 121 may be mounted in all the liquids used. Further, the accommodating container 121 may be attached to the liquid ejecting apparatus 111 so as not to be removable, and only the liquid accommodating body 114 may be attached/detached and replaced.

A first liquid accommodating body 114*f* and a second liquid accommodating body 114*s* accommodate the same type of liquid. The supply mechanism 140 delivers a gas to at least one of the first liquid accommodating body 114*f* and the second liquid accommodating body 114*s* and pressurizes the gas, so that the liquid accommodated in the pressurized liquid accommodating body flows out to the first supply flow path 191, and the liquid is supplied to the downstream pressure adjusting portion 150. That is, the supply mechanism 140 can selectively pressurize the first liquid accommodating body 114*f* and the second liquid accommodating body 114*s*. The liquid accommodating body 114 selected to be pressurized is referred to as the liquid accommodating body 114 to be pressurized. Of the two liquid accommodating bodies 114, the liquid accommodating body 114 that is started to be used first is referred to as the first liquid accommodating body 114*f*, and the liquid accommodating body 114 that is started to be used next to the first liquid accommodating body 114*f* is referred to as the second liquid accommodating body 114*s*. Therefore, when the liquid in the first liquid accommodating body 114*f* is exhausted and the first liquid accommodating body 114*f* is replaced with a new liquid accommodating body 114, the second liquid accommodating body 114*s* that is started to be used next becomes the first liquid accommodating body 114*f* and a replaced new liquid accommodating body 114 becomes the second liquid accommodating body 114*s*. That is, the first liquid accommodating body 114*f* is read as the second liquid accommodating body 114*s*, and the second liquid accommodating body 114*s* is read as the first liquid accommodating body 114*f*.

The first supply flow path 191 includes two flow-out paths 22 individually coupled to two liquid accommodating bodies 114 accommodating the same type of liquid, and a merging flow path 123 that couples the two flow-out paths 122 and the liquid ejecting head 113*a* through the pressure adjusting portion 150. Valves are individually provided in the two flow-out paths 122. The valve provided in the flow-out path 122 coupled to the first liquid accommodating body 114*f* is referred to as a first valve 124*f*, and the valve provided in the flow-out path 122 in which the liquid accommodating body 114 is coupled to the second liquid accommodating body 114*s* is referred to as a second valve 124*s*.

The flow-out path 122 coupled to the first liquid accommodating body 114*f*, and the flow-out path 122 coupled to the second liquid accommodating body 114*s* merge at the merging point with the merging flow path 123. Thus, the two flow-out paths 122 form a coupling flow path 126 that couples the first liquid accommodating body 114*f* and the second liquid accommodating body 114*s*. That is, the first supply flow path 191 includes the coupling flow path 126 and the merging flow path 123 that couples the coupling flow path 126 and the liquid ejecting head 113*a*.

The first valve 124*f* is provided in a portion of the coupling flow path 126 between the first liquid accommodating body 114*f* and the merging flow path 123, and opens the coupling flow path 126 when supplying the liquid in the first liquid accommodating body 114*f*. Further, the second valve 124*s* is provided in a portion of the coupling flow path 126 between the second liquid accommodating body 114*s* and the merging flow path 123, and opens the coupling flow path 126 when supplying the liquid in the second liquid accommodating body 114*s*. Thus, the coupling flow path 126 is configured so that the first liquid accommodating body 114*f* and the second liquid accommodating body 114*s* can be selectively coupled to the merging flow path 123.

As shown in FIG. 24, the supply mechanism 140 delivers gas to the liquid accommodating portion 120 through the first delivery flow path 141. The supply mechanism 140 includes the first delivery flow path 141, the delivery valve 129, and the supply pump 144. The first delivery flow path 141 has two gas delivery paths 128. In the first delivery flow path 141, the two gas delivery paths 128 individually communicate the supply mechanism 140 and the internal space of the two accommodating containers 121. Thereby, the supply pump 144 delivers gas to the internal space of each accommodating container 121 through the corresponding gas delivery path 128. Each gas delivery path 128 is provided with a corresponding delivery valve 129. The delivery valve 129 provided in the gas delivery path 128 communicating with the accommodating container 121 that accommodates the first liquid accommodating body 114*f* is referred to as a first delivery valve 129*f*. The delivery valve 129 provided in the gas delivery path 128 communicating with the accommodating container 121 that accommodates the second liquid accommodating body 114*s* is referred to as a second delivery valve 129*s*.

The supply pump 144 may be provided individually for each accommodating container 121. Further, as described above, the supply mechanism 140 also delivers gas to the supply restricting portion 160 and the liquid pressurizing portion 170. In addition to the supply pump 144 that delivers gas to the supply restricting portion 160 and the liquid pressurizing portion 170, a supply pump that delivers gas to the accommodating container 121 may be provided. That is, individual supply pumps may be provided corresponding to each delivery destination.

The first delivery valve 129*f* and the first valve 124*f* corresponding to the first liquid accommodating body 114*f* are opened, and the second delivery valve 129*s* and the second valve 124*s* corresponding to the second liquid accommodating body 114*s* to be used next are closed. Then, when the gas is delivered through the gas delivery path 128 by the drive of the supply pump 144, the gas enters the accommodating container 121 and the inside of the accommodating container 121 accommodating the first liquid accommodating body 114*f* is pressurized. In this way, the liquid in the first liquid accommodating body 114*f* is selectively delivered to the liquid ejecting head 113*a*.

Both the first valve 124*f* and the second valve 124*s* may be one-way valves that allow the flow of liquid from upstream to downstream and restrict the flow of liquid from downstream to upstream. In this case, when the first delivery valve 129*f* corresponding to the first liquid accommodating body 114*f* is opened, the second delivery valve 129*s* corresponding to the second liquid accommodating body 114*s* is closed, and the supply pump 144 is driven, only the liquid in the first liquid accommodating body 114*f* in which the pressure in the accommodating container 121 has increased is delivered to the liquid ejecting head 113*a*. The first valve 124*f* and the second valve 124*s* may be on-off valves that are opened and closed by the controller 1100.

As shown in FIG. 24, the storage portion 125 has a detecting portion 131, a movable wall 132, a moving object 133, a first urging member 134, a lever 135, and a second urging member 136. The moving object 133 moves with the displacement of the movable wall 132. The first urging member 134 urges the moving object 133 in a direction approaching the movable wall 132. The lever 135 is displaced as the moving object 133 moves. The second urging member 136 urges the lever 135 in a direction approaching the moving object 133. The detecting portion 131 detects the displacement of the lever 135.

When the pressure of the liquid in the first supply flow path 191 decreases, as the movable wall 132 is displaced toward the inside of the storage portion 125, the moving object 133 moves in the direction approaching the movable wall 132 by the urging force of the first urging member 134. Thereby, the lever 135 pressed against the moving object 133 is displaced by the urging force of the second urging member 136, so that the detecting portion 131 detects the displacement of the lever 135.

The storage portion 125 can temporarily store the liquid inside the storage portion 125, and is provided in the merging flow path 123. When the remaining amount of liquid in the liquid accommodating body 114 used by the liquid ejecting head 113*a* falls below a first threshold value QL1, the supply pressure of the liquid in the first supply flow path 191 becomes a pressurization threshold value PL and the detecting portion 131 detects the displacement of the lever 135. If the value of the first threshold value QL1 is set in this way, the detecting portion 131 can detect that the remaining amount of the liquid in the liquid accommodating body 114 has fallen below the first threshold value QL1. That is, the storage portion 125 includes a detecting portion 131 that can detect the remaining amount of liquid in the liquid accommodating body 114 being used by the liquid ejecting head 113*a* by detecting the amount of liquid in the storage portion 125. Further, the detecting portion 131 is configured to detect the remaining amount of the liquid in the liquid accommodating body 114 being used by the liquid ejecting head 113*a* by detecting the amount of the liquid stored in the storage portion 125. More specifically, when the liquid ejecting head 113*a* is discharging the liquid inside the liquid accommodating body 114 of either one, the detecting portion 131 detects the remaining amount of the liquid in the liquid accommodating body 114 by detecting the amount of the liquid stored in the storage portion 125.

The detecting portion 131 is, for example, an optical sensor, and has a light emitting portion and a light receiving portion. When the state changes from a state where the light receiving portion receives the light from the light emitting portion to a state where the light receiving portion blocks the light from the light emitting portion, the detecting portion 131 detects that the remaining amount of the liquid in the liquid accommodating body 114 being used by the liquid ejecting head 113*a* has fallen below the first threshold value QL1. An optical or magnetic linear encoder capable of detecting continuous displacement may be used so that the detecting portion 131 can continuously measure the displacement of the lever 135.

The storage portion 125 may have a tank having an atmosphere opening hole. In this case, the detecting portion 131 may detect the amount of the liquid in the storage portion 125 by detecting the liquid surface of the liquid in the storage portion 125. Further, the detecting portion 131 may be provided in a place other than the storage portion 125. For example, each liquid accommodating body 114 may include a detecting portion 131 capable of detecting the remaining amount of liquid in the liquid accommodating body 114.

About Configuration of Maintenance Portion

As shown in FIG. 24, the maintenance portion 180 includes a cleaning mechanism 181 and a wiping mechanism 182. In the liquid ejecting head 113*a*, in order to prevent or eliminate ejection failures caused by clogging of the nozzle 112 or adhesion of foreign matter, maintenance operations such as flushing, capping, suction cleaning, or wiping are performed under the control of the controller 1100.

The cleaning mechanism 181 includes a box-shaped cap 183 having an opening and an elevating mechanism (not shown) for elevating and lowering the cap 183. Due to elevating and lowering, the cap 183 moves relative to each other between a capping position that surrounds the space opened by the nozzle 112 as a closed space and an open position that makes the space opened by the nozzle 112 an open space.

Flushing refers to an ejection operation for discharging droplets unrelated to recording from the nozzle 112. By flushing, a thickened liquid, air bubbles, or foreign matter that causes an ejection failure is discharged from the nozzle 112, and thus clogging of the nozzle 112 can be prevented.

Flushing is performed by the liquid ejecting head 113*a* ejecting droplets from the nozzle 112 toward the inside of the cap 183.

Capping refers to an operation in which the cap 183 abuts on the liquid ejecting head 113*a* so as to surround the opening of the nozzle 112 by being arranged at the capping position when the liquid ejecting head 113*a* does not eject the liquid. Thereby, a closed space area is surrounded and formed between the liquid ejecting head 113*a* and the nozzle surface 112*a* through which the nozzle 112 opens. Since the thickening of the liquid in the nozzle 112 is suppressed by the capping, the occurrence of ejection failure can be prevented.

The cleaning mechanism 181 includes a discharge flow path 185 and a plurality of suction valves 186 provided in the discharge flow path 185. The discharge flow path 185 has one downstream end coupled to a suction mechanism 184 and a plurality of upstream ends, and each upstream end is coupled to a corresponding cap 183. A corresponding suction valve 186 is arranged in the middle of each branched discharge flow path 185. The suction valve 186 is configured to open and close the discharge flow path 185.

Suction cleaning refers to an operation in which a suction force is applied to the nozzle 112 of the liquid ejecting head 113*a* to forcibly discharge the liquid from the nozzle 112. By arranging the cap 183 at the capping position, the cap 183 defines a closed space CS (see FIG. 25) between the cap 183 and the lower surface side of the liquid ejecting head 113*a* where the nozzle 112 opens. The suction mechanism 184 applies a negative pressure to the closed space CS (see FIG. 25). Then, the liquid is sucked and discharged from the nozzle 112 by the negative pressure, so that suction cleaning is executed.

The wiping mechanism 182 includes an elastic wiper 188, a wiper support 189 that supports the wiper 188, and a moving mechanism (not shown). The moving mechanism is configured to move the wiper support 189 in the arrangement direction of the liquid ejecting head 113*a*.

Wiping refers to an operation of wiping the nozzle surface 112*a* with the wiper 188. By wiping, dirt such as liquid, dust, or the like adhering to the nozzle surface 112*a* of the liquid ejecting head 113*a* is removed.

After the suction cleaning is performed, the liquid inside the liquid ejecting head 113*a* may be pressurized, and then wiping may be performed. Since the liquid inside the liquid ejecting head 113*a* is pressurized, this cleaning is referred to as pressurization cleaning.

After the suction cleaning is performed, the liquid inside the liquid ejecting head 113*a* is pressurized to perform the pressurization cleaning. Wiping is performed after the pressurization cleaning. The operations of the supply mechanism 140, the supply restricting portion 160, the liquid pressurizing portion 170, and the maintenance portion 180 in this pressurization cleaning will be described.

Figure 25:
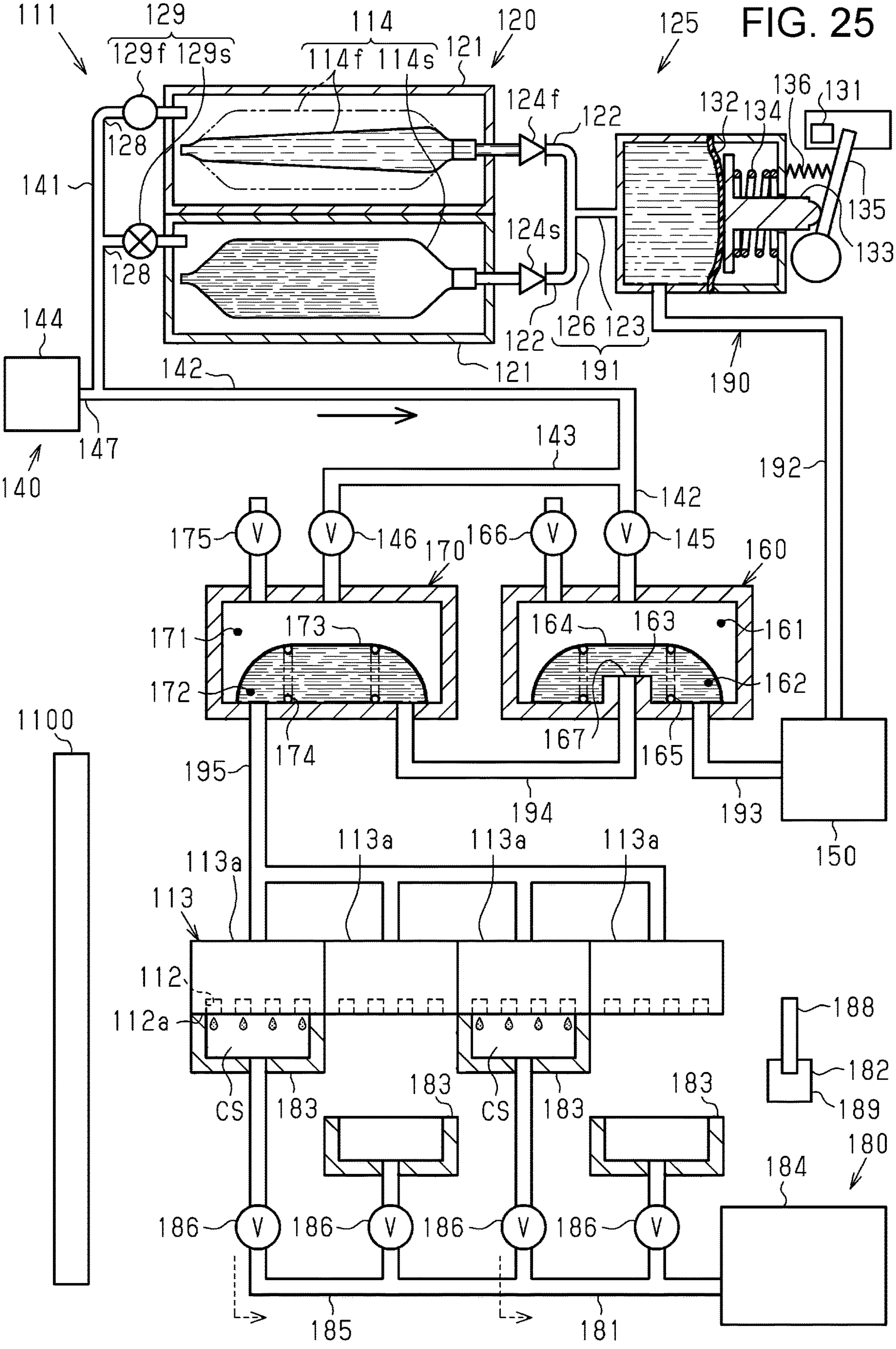
FIG. 25 is a schematic view when cleaning is executed in the liquid ejecting apparatus of FIG. 24.

As shown in FIG. 25, when there is one or more liquid ejecting heads 113*a* that require suction cleaning, the controller 1100 selectively moves the cap 183 corresponding to the liquid ejecting head 113*a* that requires suction cleaning to the capping position. Then, the controller 1100 selectively executes suction cleaning on the liquid ejecting head 113*a* that requires suction cleaning by driving the suction mechanism 184 for a predetermined period of time.

The suction mechanism 184 sucks the air in the closed space CS through the discharge flow path 185, so that the closed space CS becomes a negative pressure. The nozzle 112 that opens into the closed space CS communicates with the third supply flow path 193 through the fifth supply flow path 195, the liquid chamber 172 of the liquid pressurizing portion 170, the fourth supply flow path 194, and the liquid chamber 162 of the supply restricting portion 160. Thereby, the pressure of the third supply flow path 193 becomes less than the predetermined pressure. The pressure adjusting portion 150 communicates the second supply flow path 192 with the third supply flow path 193. Then, the liquid is continuously supplied from the liquid accommodating portion 120 to the liquid ejecting portion 113, and the liquid is discharged from the liquid ejecting head 113*a*, which is the target of suction cleaning, as shown in FIG. 25. The liquid discharged from the liquid ejecting head 113*a* is discharged through the cap 183 and the discharge flow path 185.

The controller 1100 moves all the caps 183 to the open position. More specifically, since the cap 183 corresponding to the liquid ejecting head 113*a*, which is not the target of suction cleaning, is already in the open position, the controller 1100 moves the cap 183 in the capping position to the open position. The movement of the cap 183 to the open position may be performed in a state where the pressure of the closed space CS is negative after the drive of the suction mechanism 184 is stopped, or may be performed in a state where the pressure of the closed space CS is substantially equal to the atmospheric pressure.

The controller 1100 opens the third delivery valve 145 in a state where the first opening valve 166 is closed. Thereby, gas flows from the supply pump 144 into the gas chamber 161 of the supply restricting portion 160 in the direction of the solid arrow shown in FIG. 25 through the second delivery flow path 142, and the pressure in the gas chamber 161 gradually increases as the inflow of gas into the gas chamber 161 increases.

Figure 26:
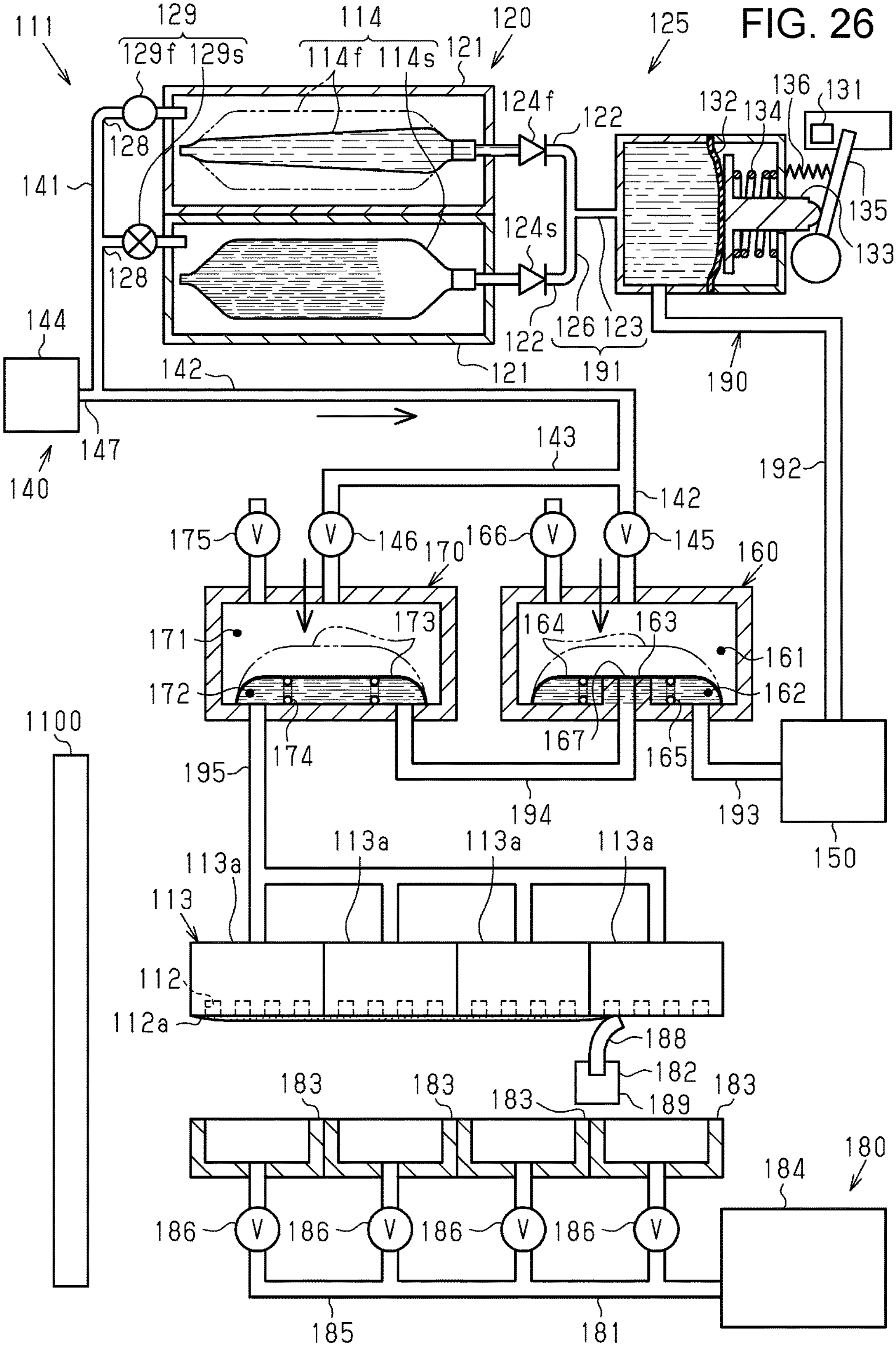
FIG. 26 is a schematic view when pressurization wiping is executed in the liquid ejecting apparatus of FIG. 24.

As shown in FIG. 26, when the pressure in the gas chamber 161 becomes higher than the pressure in the liquid chamber 162, the film member 164 reduces the volume of the liquid chamber 162 against the urging force of the urging member 165. Then, the film member 164 is displaced to the position of the solid line shown in FIG. 26, and blocks the opening 167 of the protruding portion 163 in the liquid chamber 162. Thereby, the third supply flow path 193 and the fourth supply flow path 194 do not communicate with each other, so that the pressure adjusting portion 150 and the liquid pressurizing portion 170 do not communicate with each other. In other words, the supply restricting portion 160 restricts the supply of the liquid from the liquid accommodating portion 120 to the liquid ejecting portion 113.

The controller 1100 opens the fourth delivery valve 146 in a state where the second opening valve 175 is closed. Thereby, gas flows from the supply pump 144 into the gas chamber 171 of the liquid pressurizing portion 170 in the direction of the solid arrow shown in FIG. 26 through the third delivery flow path 143, and the pressure in the gas chamber 171 gradually increases as the inflow of gas into the gas chamber 171 increases.

As shown in FIG. 26, when the pressure in the gas chamber 171 becomes higher than the pressure in the liquid chamber 172, the film member 173 is displaced to the position of the solid line shown in FIG. 26, which reduces the volume of the liquid chamber 172 against the urging force of the urging member 174. Thereby, the liquid in the liquid chamber 172 of the liquid pressurizing portion 170, the fourth supply flow path 194, the fifth supply flow path 195, the inside of the liquid ejecting head 113*a*, and the inside of the nozzle 112 is pressurized.

In the nozzles 112 of all the liquid ejecting heads 113*a*, when the liquid pressure in the nozzles 112 becomes higher than the atmospheric pressure, the liquid leaks from the nozzles 112 of all the liquid ejecting heads 113*a*. The liquid leaking from the nozzle 112 means a state where the meniscus formed in a recessed shape toward the inside of the nozzle 112 is broken and the liquid overflowing from the nozzle 112 spreads on the nozzle surface 112*a*. In this state, the controller 1100 drives a moving mechanism (not shown) to execute wiping to wipe the nozzle surfaces 112*a* of all the liquid ejecting heads 113*a* with the wiper 188. Since the liquid is leaked from the nozzle 112 by pressurization and then the leaked liquid is wiped off by the wiper 188, this operation is also referred to as pressurization wiping.

The controller 1100 closes the third delivery valve 145 and opens the first opening valve 166. In a state where the inflow of gas from the supply pump 144 into the gas chamber 161 of the supply restricting portion 160 is restricted, the gas chamber 161 of the supply restricting portion 160 is opened to the atmosphere, so that the pressure in the gas chamber 161 is lowered to the atmospheric pressure. Thereby, the film member 164 is displaced in the direction of increasing the volume of the liquid chamber 162 by the urging force of the urging member 165, and the film member 164 opens the opening 167 of the protruding portion 163 of the liquid chamber 162. Then, the third supply flow path 193 and the fourth supply flow path 194 communicate with each other, and the pressure adjusting portion 150 and the liquid pressurizing portion 170 communicate with each other. In other words, the supply of liquid from the liquid accommodating portion 120 restricted by the supply restricting portion 160 to the liquid ejecting portion 113 is allowed. As the volume of the liquid chamber 162 increases, the liquid flowing into the liquid chamber 162 is supplied from the third supply flow path 193.

The controller 1100 closes the fourth delivery valve 146 and opens the second opening valve 175. In a state where the inflow of gas from the supply pump 144 into the gas chamber 171 of the liquid pressurizing portion 170 is restricted, the gas chamber 171 of the liquid pressurizing portion 170 is opened to the atmosphere, so that the pressure in the gas chamber 171 is lowered to the atmospheric pressure. Thereby, the film member 173 is displaced in the direction of increasing the volume of the liquid chamber 172 by the urging force of the urging member 174. Then, as the volume of the liquid chamber 172 increases, the liquid flowing into the liquid chamber 172 is supplied from the fourth supply flow path 194. That is, the supply from the fifth supply flow path 195 is suppressed. Then, the controller 1100 ends the pressurization cleaning operation.

Figure 27:
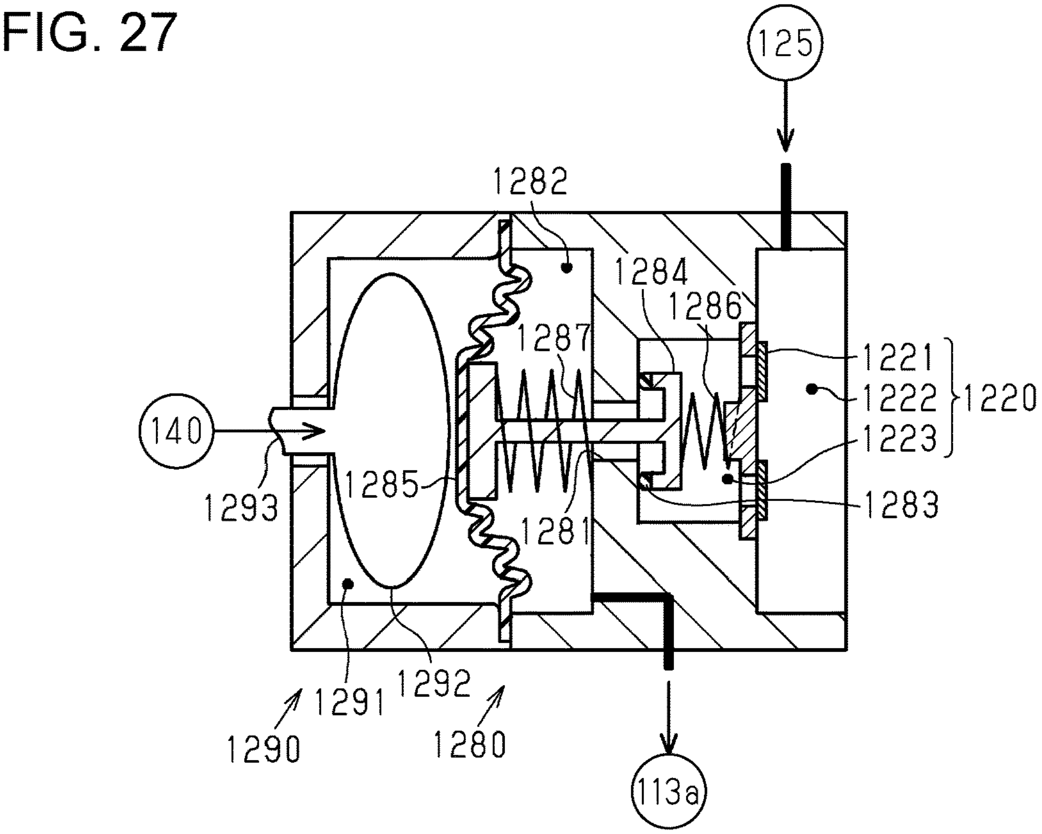
FIG. 27 is a schematic view of a hydraulic pressure adjusting mechanism and a valve opening mechanism included in the liquid ejecting apparatus of FIG. 24.

The pressure adjusting portion 150, the supply restricting portion 160, and the liquid pressurizing portion 170 may serve as a hydraulic pressure adjusting mechanism 1280 and a valve opening mechanism 1290 shown in FIG. 27. The hydraulic pressure adjusting mechanism 1280 and the valve opening mechanism 1290 are provided between the storage portion 125 and the liquid ejecting head 113*a*.

As shown in FIG. 27, the hydraulic pressure adjusting mechanism 1280 is provided integrally with a filter portion 1220 at a position downstream of the storage portion 125. The hydraulic pressure adjusting mechanism 1280 includes an upstream filter chamber 1222, a downstream filter chamber 1223, a liquid chamber 1282, a valve body 1283, and a pressure receiving member 1284. The upstream filter chamber 1222 communicates with the storage portion 125. The downstream filter chamber 1223 communicates with the upstream filter chamber 1222 through a filter 1221 that collects foreign matter. The liquid chamber 1282 communicates with the downstream filter chamber 1223 through a communication hole 1281 and also communicates with the liquid ejecting head 113*a*. The valve body 1283 is configured to be able to open and close the communication hole 1281. The pressure receiving member 1284 is accommodated in the downstream filter chamber 1223 on the base end side and in the liquid chamber 1282 on the tip end side.

The liquid chamber 1282 is configured to able to store liquid. A portion of the wall surface of the liquid chamber 1282 is formed by a flexible wall 1285 that can be bent and displaced. The valve body 1283 may be, for example, an elastic body such as rubber or resin attached to the base end portion of the pressure receiving member 1284 positioned in the downstream filter chamber 1223.

The hydraulic pressure adjusting mechanism 1280 includes a first pressing member 1286 accommodated in the downstream filter chamber 1223 and a second pressing member 1287 accommodated in the liquid chamber 1282. The first pressing member 1286 presses the valve body 1283 in the direction of blocking the communication hole 1281 via the pressure receiving member 1284. The second pressing member 1287 bends and displaces the flexible wall 1285 in the direction of reducing the volume of the liquid chamber 1282, so that when the flexible wall 1285 pushes the pressure receiving member 1284, the pressure receiving member 1284 is pushed back toward the flexible wall 1285.

When the internal pressure in the liquid chamber 1282 decreases and the force of the flexible wall 1285 pushing the pressure receiving member 1284 exceeds the pressing force of the first pressing member 1286 and the second pressing member 1287, the valve body 1283 opens the communication hole 1281. When the liquid flows into the liquid chamber 1282 from the downstream filter chamber 1223 by opening the communication hole 1281, the internal pressure in the liquid chamber 1282 rises. As a result, the valve body 1283 blocks the communication hole 1281 by the pressing force of the first pressing member 1286 and the second pressing member 1287 before the internal pressure in the liquid chamber 1282 rises to the positive pressure. In this way, the internal pressure in the liquid chamber 1282 is maintained within the range of negative pressure corresponding to the pressing force of the first pressing member 1286 and the second pressing member 1287.

The internal pressure in the liquid chamber 1282 decreases as the liquid is discharged from the liquid ejecting portion 113. The valve body 1283 autonomously opens and closes the communication hole 1281 according to the difference pressure between the atmospheric pressure, which is the external pressure in the liquid chamber 1282, and the internal pressure in the liquid chamber 1282. Therefore, the hydraulic pressure adjusting mechanism 1280 is a differential pressure valve.

As shown in FIG. 27, the valve opening mechanism 1290 forcibly opens the communication hole 1281 to supply the liquid to the liquid ejecting head 113*a* shown in FIG. 24. The valve opening mechanism 1290 includes a pressurization bag 1292 and a ventilation flow path 1293. The pressurization bag 1292 is accommodated in an accommodation chamber 1291 partitioned from the liquid chamber 1282 by the flexible wall 1285. The ventilation flow path 1293 causes the gas delivered from the supply pump 144 of the supply mechanism 140 shown in FIG. 24 to flow into the pressurization bag 1292.

In the valve opening mechanism 1290, the pressurization bag 1292 expands due to the gas flowing in through the ventilation flow path 1293, and the flexible wall 1285 is bent and displaced in the direction of reducing the volume of the liquid chamber 1282, thereby forcibly opening the communication hole 1281. The liquid ejecting apparatus 111 is configured to enable pressurization cleaning in which the liquid is leaked from the nozzle 112 of the liquid ejecting head 113*a* by pressurizing and supplying the liquid from the liquid accommodating portion 120 shown in FIG. 24 to the liquid ejecting head 113*a* in a state where the communication hole 1281 is open.

About Calculation Method of Remaining Amount of Liquid

The liquid accommodated in the liquid accommodating body 114 is supplied to the liquid ejecting head 113*a* by being pressurized. Therefore, the controller 1100 calculates the remaining amount of the liquid in the first liquid accommodating body 114*f* based on the amount of the liquid discharged from the liquid ejecting head 113*a* when the first liquid accommodating body 114*f* is pressurized. More specifically, the controller 1100 calculates a remaining amount Q3 of the liquid in the liquid accommodating body 114 based on an accommodation amount Q1 indicating the amount of the liquid accommodated in the liquid accommodating body 114 and a total discharge amount Q2, which is the amount of the liquid discharged from the liquid ejecting head 113*a* when the liquid accommodating body 114 is pressurized. That is, the remaining amount Q3 of the liquid in the liquid accommodating body 114 is calculated for each liquid accommodating body 114. The controller 1100 calculates the remaining amount Q3 every time the liquid is discharged from the liquid ejecting head 113*a* from the start of use of the liquid accommodating body 114 until the liquid in the liquid accommodating body 114 is exhausted.

The accommodation amount Q1 is the accommodation amount of the liquid in the unused liquid accommodating body 114. At the time of shipment of the accommodating container 121 accommodating the liquid accommodating body 114 or the liquid accommodating body 114, when the accommodation amount of the liquid in the liquid accommodating body 114 is managed at a constant value, that value is the accommodation amount Q1. That is, the accommodation amount Q1 is the amount of liquid accommodated in the liquid accommodating body 114 when the accommodating container 121 accommodating the unused liquid accommodating body 114 is attached.

When the accommodating container 121 is attached to the liquid ejecting apparatus 111, the accommodating container 121 and the liquid ejecting apparatus 111 may be electrically coupled to each other. At this time, the controller 1100 may read various information about the accommodating container 121 from an IC chip of the accommodating container 121. When the accommodating container 121 is shipped, if the accommodation amount of the liquid accommodated in the liquid accommodating body 114 accommodated in the accommodating container 121 is stored in the IC chip, the value of the accommodation amount may be read from the IC chip and used as the accommodation amount Q1. In such a case, the controller 1100 manages the accommodation amount Q1 as an individual value for each accommodating container 121.

The total discharge amount Q2 may be calculated based on the amount of liquid ejected from the liquid ejecting head 113*a*. For example, the total discharge amount Q2 is calculated by multiplying an ejection amount Q2p and the number of shots np. That is, the controller 1100 calculates the total discharge amount Q2 by the equation $Q2=Q2p\times np$.

The ejection amount Q2p is the amount of liquid ejected from the liquid ejecting head 113*a*. More specifically, the ejection amount Q2p is the amount of liquid discharged from one nozzle 112 in one shot. One shot refers to one ejection performed from one nozzle 112. The controller 1100 manages the ejection amount Q2p as an individual value for each type of liquid. The number of shots np is the total number of times the liquid in the liquid accommodating body 114 is ejected from one nozzle 112 after the liquid accommodating body 114 is attached to the liquid ejecting apparatus 111 in all the nozzles 112. That is, the number of shots np in the first liquid accommodating body 114*f* is the total number of times the liquid in the liquid accommodating body 114 is ejected from one nozzle 112 when the first liquid accommodating body 114*f* is pressurized in all the nozzles 112. The number of shots np includes the number of times the liquid is ejected by flushing in addition to the number of times the liquid is ejected to the medium M by recording. The number of shots np is counted for each liquid accommodating body 114. That is, the total discharge amount Q2 is calculated for each liquid accommodating body 114. When the ejection amount Q2p fluctuates depending on the driving conditions of the actuator of the liquid ejecting head 113*a* or environmental conditions such as temperature and humidity, the ejection amount Q2p may be a value that fluctuates depending on those conditions. Further, when the ejection amount Q2p is affected by the recording duty, the ejection amount Q2p may be a value that fluctuates depending on the recording duty.

The total discharge amount Q2 may be calculated by adding the amount of liquid sucked from the liquid ejecting head 113*a* by suction cleaning. For example, the total discharge amount Q2 may be calculated by adding the value obtained by multiplying a suction amount Q2s in one suction cleaning and a number of times of suction cleaning ns. That is, the controller 1100 may calculate the total discharge amount Q2 by the equation $Q2=(Q2p\times np)+(Q2s\times ns)$.

The suction amount Q2s in the first liquid accommodating body 114*f* is the amount of liquid in the first liquid accommodating body 114*f* that is sucked from the entire liquid ejecting head 113*a* in one suction cleaning when the first liquid accommodating body 114*f* is pressurized. The number of times of suction cleaning ns is the number of times that suction cleaning is performed on the liquid ejecting head 113*a* after the liquid accommodating body 114 is attached to the liquid ejecting apparatus 111. When the strength at which the liquid is sucked is adjusted in the suction cleaning, the suction amount Q2s may be a value that fluctuates depending on the strength at which the liquid is sucked.

The total discharge amount Q2 may be calculated by adding the amount of liquid leaked from the nozzle 112 of the liquid ejecting head 113*a* and wiped off by pressurization wiping. For example, the total discharge amount Q2 may be calculated by adding the value obtained by multiplying a leakage amount Q2w in one pressurization wiping and a number of times of pressurization wiping nw. That is, the controller 1100 may calculate the total discharge amount Q2 by the equation $Q2=(Q2p\times np)+(Q2s\times ns)+(Q2w\times nw)$.

The leakage amount Q2w in the first liquid accommodating body 114*f* is the amount of liquid in the first liquid accommodating body 114*f* that leaks from the entire liquid ejecting head 113*a* in one pressurization wiping when the first liquid accommodating body 114*f* is pressurized. The number of times of pressurization wiping nw is the number of times that pressurization wiping is performed on the liquid ejecting head 113*a* after the liquid accommodating body 114 is attached to the liquid ejecting apparatus 111. When the strength at which the liquid leaks is adjusted in the pressurization wiping, the leakage amount Q2w may be a value that fluctuates depending on the strength at which the liquid leaks.

The controller 1100 calculates the remaining amount Q3 by subtracting the total discharge amount Q2 from the accommodation amount Q1. That is, the controller 1100 calculates the remaining amount Q3 by the equation Q3=Q1−Q2. Then, the controller 1100 calculates the remaining amount Q3 for each liquid accommodating body 114. Thereby, the controller 1100 can detect that the remaining amount of the liquid in the liquid accommodating body 114 has fallen below the first threshold value QL1 without referring to the detection result of the detecting portion 131. In other words, the controller 1100 can detect that the remaining amount of the liquid in the liquid accommodating body 114 has fallen below the first threshold value QL1 by both the detection result of the detecting portion 131 and the calculation result of the remaining amount Q3.

About Configuration of Suction Mechanism

Figure 28:
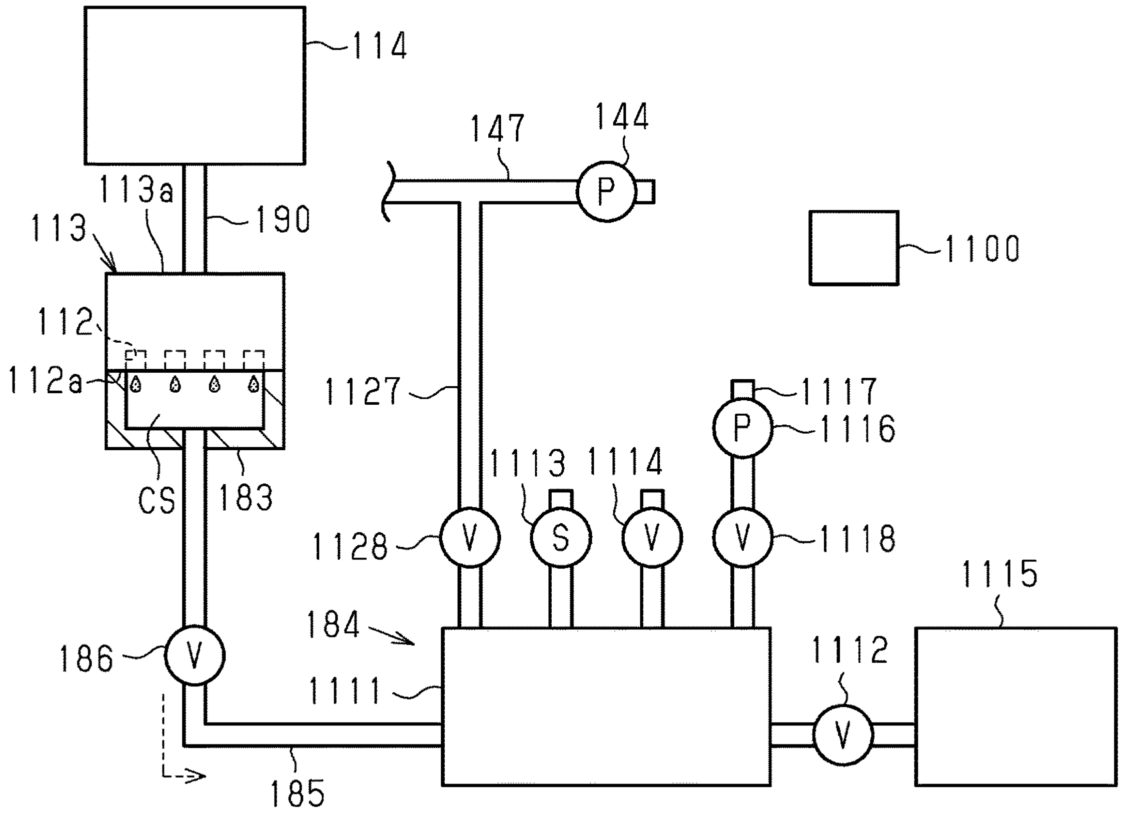
FIG. 28 is a schematic view showing a schematic configuration of a suction mechanism included in the liquid ejecting apparatus of FIG. 24.

As shown in FIG. 28, the suction mechanism 184 includes a discharge flow path 185, a pressure chamber 1111, and a discharge valve 1112. The pressure chamber 1111 is arranged in the middle of the discharge flow path 185, and its position is downstream of the suction valve 186. The discharge valve 1112 is arranged in the middle of the discharge flow path 185, downstream of the pressure chamber 1111. The discharge valve 1112 is configured to open and close the discharge flow path 185.

When the waste liquid in the cap 183 is discharged through the discharge flow path 185, it is temporarily stored in the pressure chamber 1111. The suction mechanism 184 may include a pressure sensor 1113 and a release valve 1114 coupled to the pressure chamber 1111. The pressure sensor 1113 detects the pressure in the pressure chamber 1111. When the release valve 1114 is opened, the inside of the pressure chamber 1111 communicates with the atmosphere. The discharge valve 1112 may be a one-way valve that allows the flow of liquid from upstream to downstream and restricts the flow of liquid from downstream to upstream. More specifically, the discharge valve 1112 opens the discharge flow path 185 when a certain pressure or more is applied from the upstream without being electrically or mechanically controlled, but autonomously closes the discharge flow path 185 at normal times (under atmospheric pressure) and when pressure is applied from the downstream.

The suction mechanism 184 may include a waste liquid tank 1115 coupled downstream of the discharge valve 1112 of the discharge flow path 185. When the inside of the pressure chamber 1111 is pressurized, the waste liquid in the pressure chamber 1111 flows into the waste liquid tank 1115 through the discharge flow path 185. At this time, the discharge valve 1112, which is a one-way valve, is opened by the pressure of the pressurized waste liquid. If the discharge valve 1112 is controlled to open and close, it is preferable to open the discharge valve 1112 when pressurizing the inside of the pressure chamber 1111. The waste liquid tank 1115 may be replaceably attached to the liquid ejecting apparatus 111.

The suction mechanism 184 includes a cleaning pump 1116, a depressurization flow path 1117, and a depressurization valve 1118. The cleaning pump 1116 is configured to depressurize the inside of the pressure chamber 1111 until it becomes a negative pressure. The cleaning pump 1116 is coupled to the pressure chamber 1111 through the depressurization flow path 1117. The depressurization valve 1118 is arranged in the middle of the depressurization flow path 1117 and between the pressure chamber 1111 and the cleaning pump 1116.

The depressurization valve 1118 is configured to open and close the depressurization flow path 1117. When the depressurization valve 1118 is opened, the cleaning pump 1116 communicates with the pressure chamber 1111, and when the depressurization valve 1118 is closed, the suction force of the cleaning pump 1116 does not reach the pressure chamber 1111.

The suction mechanism 184 includes a pressurization flow path 1127 communicating with the supply pump 144 and the pressure chamber 1111, and a pressurization valve 1128 configured to open and close the pressurization flow path 1127. The pressurization flow path 1127 may be a flow path branched from the delivery flow path 147.

When the pressurization valve 1128 opens, the supply pump 144 communicates with the pressure chamber 1111, and when the pressurization valve 1128 closes, the pressurizing force of the supply pump 144 does not reach the pressure chamber 1111. The supply pump 144 can pressurize the inside of the pressure chamber 1111 through the pressurization flow path 1127. When the liquid is supplied to the liquid ejecting head 113*a* (during liquid ejection and during pressurization cleaning), the pressurization valve 1128 closes the pressurization flow path 1127.

About Electrical Configuration of Liquid Ejecting Apparatus 111

Figure 29:
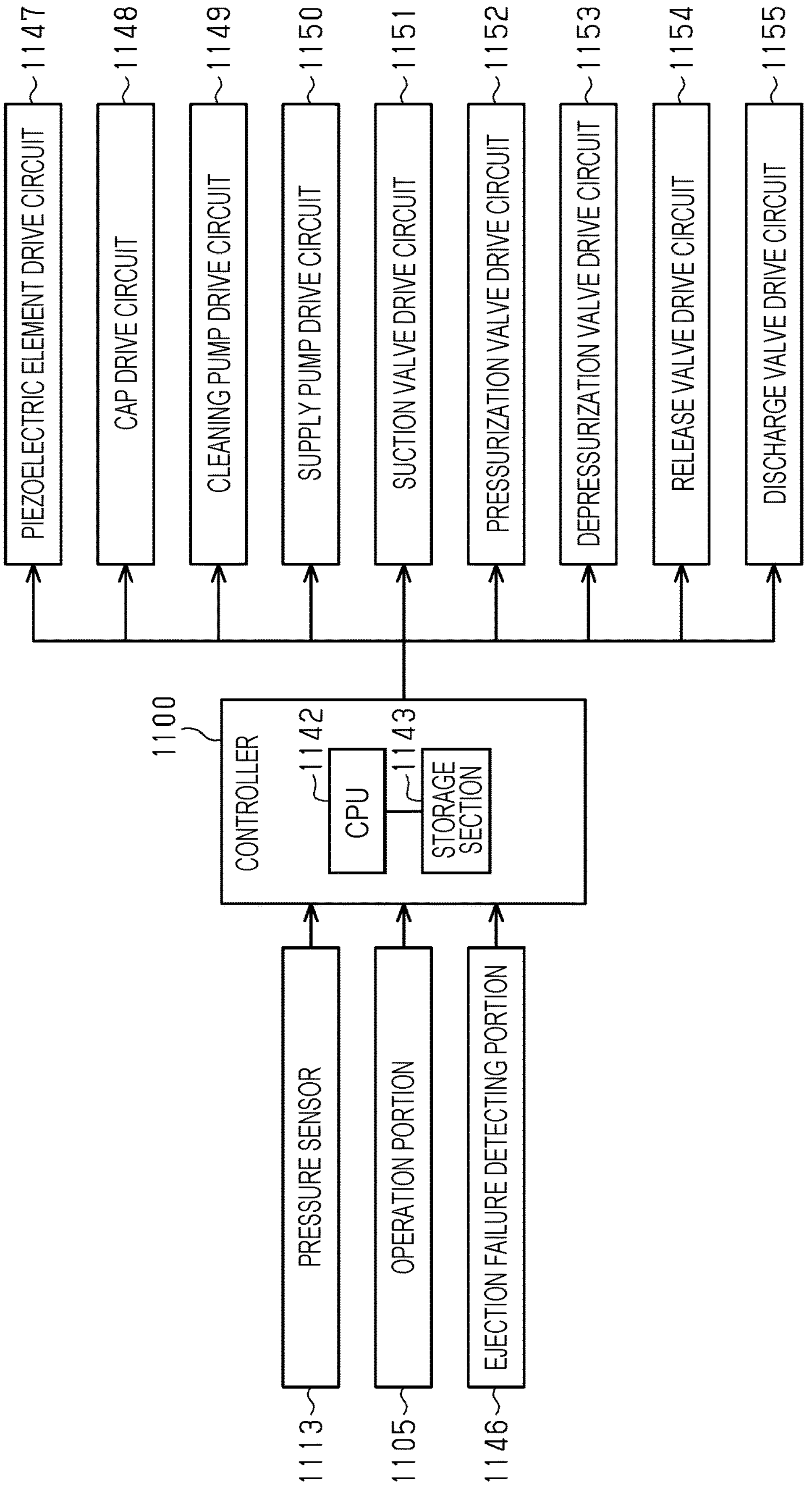
FIG. 29 is a block diagram of the liquid ejecting apparatus of FIG. 24.

As shown in FIG. 29, the liquid ejecting apparatus 111 has a controller 1100. The controller 1100 includes a CPU 1142 and a storage section 1143. The CPU 1142 is a central processing unit that collectively controls the liquid ejecting apparatus 111. The storage section 1143 is, for example, a non-volatile memory that stores a program executed by the CPU 1142 and related information thereof, including various maintenance operations. In addition to the pressure sensor 1113, an operation portion 1105 and an ejection failure detecting portion 1146 are coupled to the input side interface (not shown) of the controller 1100.

The pressure sensor 1113 periodically detects the pressure in the pressure chamber 1111, and transmits a detection signal indicating the detection result to the controller 1100. The ejection failure detecting portion 1146 is a detection circuit that detects residual vibration of the cavity inside, for example, the liquid ejecting portion 113. That is, by detecting the residual vibration after vibrating the inside of the cavity by driving the piezoelectric element with the piezoelectric element, the nozzle 112 with ejection failure is detected.

For example, when the viscosity of the liquid in the cavity becomes high, the residual vibration is likely to be attenuated and the period of the residual vibration becomes shorter. On the other hand, when air bubbles are mixed in the cavity, the residual vibration is less likely to be attenuated and the period of the residual vibration becomes longer. When the period of residual vibration in the cavity detected by the piezoelectric element becomes shorter than a predetermined lower limit period or longer than a predetermined upper limit period, the ejection failure detecting portion 1146 detects the cavity and the nozzle 112 corresponding to the piezoelectric element as the nozzle 112 with ejection failure. Further, the ejection failure detecting portion 1146 transmits a detection signal indicating the detection result to the controller 1100. The controller 1100 may execute a maintenance operation such as suction cleaning or pressurization cleaning based on the detection result of the ejection failure detecting portion 1146.

As shown in FIG. 29, a plurality of types of drive circuits are coupled to the output side interface (not shown) of the controller 1100. A piezoelectric element drive circuit 1147 drives the piezoelectric element to eject the liquid from the nozzle 112 corresponding to the piezoelectric element. The piezoelectric element drive circuit 1147 also drives the piezoelectric element when detecting residual vibration in order to detect the nozzle 112 with ejection failure. A cap drive circuit 1148 drives an elevating mechanism for elevating and lowering the cap 183. A cleaning pump drive circuit 1149 drives the cleaning pump 1116.

A supply pump drive circuit 1150 drives the supply pump 144. A suction valve drive circuit 1151 drives the suction valve 186 to open or close. A pressurization valve drive circuit 1152 drives the pressurization valve 1128 to open or close. A depressurization valve drive circuit 1153 drives the depressurization valve 1118 to open or close. A release valve drive circuit 1154 drives the release valve 1114 to open or close. A discharge valve drive circuit 1155 drives the discharge valve 1112 to open or close. Each of the above drive circuits drives a corresponding drive target based on a control signal appropriately transmitted from the controller 1100. When the discharge valve 1112 is a one-way valve that opens and closes autonomously, the liquid ejecting apparatus 111 may not include the discharge valve drive circuit 1155. That is, in the following description, when "the controller 1100 opens (or closes) the discharge valve 1112", the discharge valve 1112 autonomously opens (or closes) without being controlled.

The operation of the second embodiment will be described.

When recording to the medium M is performed by the liquid ejecting apparatus 111, the first delivery valve **129*f* and the first valve 124*f* are opened, and the supply pump 144 is driven. By driving the supply pump 144, gas flows into the accommodating container 121 that accommodates the first liquid accommodating body 114*f*, and pressurizes the inside of the accommodating container 121. When the inside of the accommodating container 121 is pressurized, the first liquid accommodating body 114*f* is compressed, and the liquid in the first liquid accommodating body 114*f* is delivered to the liquid ejecting head 113*a*. At this time, the second delivery valve 129*s* and the second valve 124*s*** are closed.

The liquid delivered from the liquid accommodating body 114 is temporarily stored in the storage portion 125 through the first supply flow path 191. When the pressure of the liquid in the first supply flow path 191 decreases, the movable wall 132 is displaced toward the inside of the storage portion 125, and the moving object 133 and the lever 135 are displaced accordingly. The detecting portion 131 detects the displacement of the lever 135, thereby detecting the remaining amount of liquid in the liquid accommodating body 114.

The pressure of the liquid temporarily stored in the storage portion 125 is adjusted by the pressure adjusting portion 150, and the liquid is supplied to the liquid ejecting head **113*a* through the supply restricting portion 160 and the liquid pressurizing portion 170. The liquid supplied to the liquid ejecting head 113*a* is ejected from the plurality of nozzles 112** to the medium M.

The liquid ejecting apparatus 111 executes various maintenance operations. In order to discharge the thickened liquid, air bubbles, and foreign matter that cause an ejection failure from the nozzle 112, the liquid ejecting head **113*a* performs flushing of ejecting the droplets from the nozzle 112 toward the inside of the cap 183. Further, in order to suppress the thickening of the liquid in the nozzle 112, when the liquid ejecting head 113*a* does not eject the liquid, capping is executed in which the cap 183 abuts on the liquid ejecting head 113*a* so as to surround the opening of the nozzle 112**.

Further, the liquid ejecting apparatus 111 executes suction cleaning. First, the controller 1100 moves the cap 183 corresponding to the liquid ejecting head **113*a* that requires suction cleaning to the capping position. Then, the controller 1100 opens the depressurization valve 1118 and drives the cleaning pump 1116 in a state where the suction valve 186, the release valve 1114, the discharge valve 1112, and the pressurization valve 1128 are closed. Thereby, the gas in the pressure chamber 1111 is discharged through the depressurization flow path 1117, and the inside of the pressure chamber 1111** is depressurized until it becomes a negative pressure.

After that, when the controller 1100 closes the depressurization valve 1118 and opens the suction valve 186, the negative pressure accumulated in the pressure chamber 1111 acts on the closed space CS. The nozzle 112 that opens into the closed space CS communicates with the third supply flow path 193 through the fifth supply flow path 195, the liquid chamber 172 of the liquid pressurizing portion 170, the fourth supply flow path 194, and the liquid chamber 162 of the supply restricting portion 160. Thereby, the pressure in the third supply flow path 193 becomes less than the predetermined pressure, so that the pressure adjusting portion 150 communicates the second supply flow path 192 with the third supply flow path 193. Therefore, the liquid is continuously supplied from the liquid accommodating portion 120 to the liquid ejecting portion 113, and the liquid is discharged from the nozzle 112 through the discharge flow path 185.

When the discharge valve 1112 is a one-way valve, the discharge valve 1112 is not opened and closed by the controller 1100, and allows the flow of liquid from upstream to downstream of the discharge flow path 185. After executing the suction cleaning, the release valve 1114 may be opened once to open the inside of the pressure chamber 1111 to the atmosphere.

Further, the liquid ejecting apparatus 111 executes pressurization cleaning after, for example, suction cleaning. Specifically, after the suction cleaning is executed, the controller 1100 moves the cap 183 to the open position. Then, the controller 1100 drives the supply pump 144 in a state where the pressurization valve 1128 and the first opening valve 166 are closed and the third delivery valve 145 is open. Thereby, the gas flows into the gas chamber 161 of the supply restricting portion 160 through the second delivery flow path 142, and the gas chamber 161 is pressurized.

When the pressure in the gas chamber 161 becomes higher than the pressure in the liquid chamber 162, the film member 164 reduces the volume of the liquid chamber 162 against the urging force of the urging member 165. Then, the film member 164 blocks the opening 167 of the protruding portion 163 of the liquid chamber 162. Thereby, the supply of the liquid from the liquid accommodating portion 120 to the liquid ejecting portion 113 is restricted.

The controller 1100 drives the supply pump 144 in a state where the second opening valve 175 is closed and the fourth delivery valve 146 is open. Thereby, the gas flows into the gas chamber 171 of the liquid pressurizing portion 170 through the third delivery flow path 143, and the gas chamber 171 is pressurized. When the pressure in the gas chamber 171 becomes higher than the pressure in the liquid chamber 172, the film member 173 reduces the volume of the liquid chamber 172 against the urging force of the urging member 174. Thereby, the liquid inside the liquid ejecting head **113*a* and inside the nozzle 112** is pressurized.

When the liquid pressure in the nozzles 112 of all the liquid ejecting heads **113*a* becomes higher than the atmospheric pressure, the liquid leaks from the nozzles 112 of all the liquid ejecting heads 113***a*. The controller 1100 drives the moving mechanism to execute wiping to wipe the nozzle surfaces 112*a* of all the liquid ejecting heads 113*a* with the wiper 188.

After the suction cleaning or the pressurization cleaning, the inside of the cap 183 may be sucked in a state where the cap 183 is arranged in the open position or in a state where the inside of the cap 183 communicates with the atmosphere. This is an operation of discharging the waste liquid remaining in the cap 183 through the discharge flow path 185, and is also referred to as empty suction. When empty suction is performed, it is preferable to open the suction valve 186 after driving the cleaning pump 1116 to depressurize the inside of the pressure chamber 1111 until it becomes a negative pressure as in the case of suction cleaning.

The waste liquid received by the cap 183 is temporarily stored in the pressure chamber 1111 arranged in the middle of the discharge flow path 185. When the amount of waste liquid in the pressure chamber 1111 is equal to or greater than a certain level, the controller 1100 discharges the waste liquid stored in the pressure chamber 1111 to the waste liquid tank 1115. More specifically, the controller 1100 drives the supply pump 144 in a state where the pressurization valve 1128 and the discharge valve 1112 are open and the suction valve 186, the release valve 1114, and the depressurization valve 1118 are closed. Thereby, gas flows into the pressure chamber 1111 through the pressurization flow path 1127, and the inside of the pressure chamber 1111 is pressurized. Then, the waste liquid in the pressure chamber 1111 is discharged into the waste liquid tank 1115 through the discharge flow path 185. After pressurizing the inside of the pressure chamber 1111, the release valve 1114 may be opened to open the inside of the pressure chamber 1111 to the atmosphere.

When pressurizing or depressurizing the inside of the pressure chamber 1111, the pressurizing or depressurizing time may be changed based on the detection result of the pressure sensor 1113. Thereby, for example, the negative pressure can be increased by lengthening the depressurizing time, and more powerful suction cleaning can be performed. Further, if the inside of the pressure chamber 1111 is pressurized while performing an operation such as wiping, the waste liquid in the pressure chamber 1111 can be discharged more quickly.

According to the second embodiment, the following effects can be achieved.

(1-1) When the supply pump 144 pressurizes the inside of the pressure chamber 1111, the waste liquid in the pressure chamber 1111 can be discharged through the discharge flow path 185. Since the liquid ejecting apparatus 111 discharges the waste liquid by using the supply pump 144 for supplying the liquid, it is not necessary to provide a dedicated pump for discharging the waste liquid. Therefore, the configuration of the liquid ejecting apparatus 111 can be simplified.

(1-2) Pressurization cleaning can be performed using the supply pump 144 for supplying the liquid. In the liquid ejecting apparatus 111, it is not necessary to provide a dedicated pressurizing pump for performing pressurization cleaning. Therefore, the configuration of the liquid ejecting apparatus 111 can be simplified.

(1-3) When the cleaning pump 1116 is driven in a state where the suction valve 186, the pressurization valve 1128, and the discharge valve 1112 are closed, the inside of the pressure chamber 1111 is depressurized until it becomes a negative pressure. After that, when the suction valve 186 is opened, the negative pressure in the pressure chamber 1111 acts on the cap 183. Thereby, suction cleaning can be performed to discharge the liquid in the liquid ejecting head 113*a* through the nozzle 112.

(1-4) When the discharge valve 1112 is a one-way valve that opens and closes autonomously, it is not necessary to provide a mechanism for opening and closing the discharge valve 1112. Therefore, the configuration of the liquid ejecting apparatus 111 can be simplified.

Third Embodiment

Hereinafter, a third embodiment of the liquid ejecting apparatus 111 will be described with reference to the drawings. The same components as those in the second embodiment are designated by the same reference numerals, and duplicate description thereof will be omitted.

Figure 30:
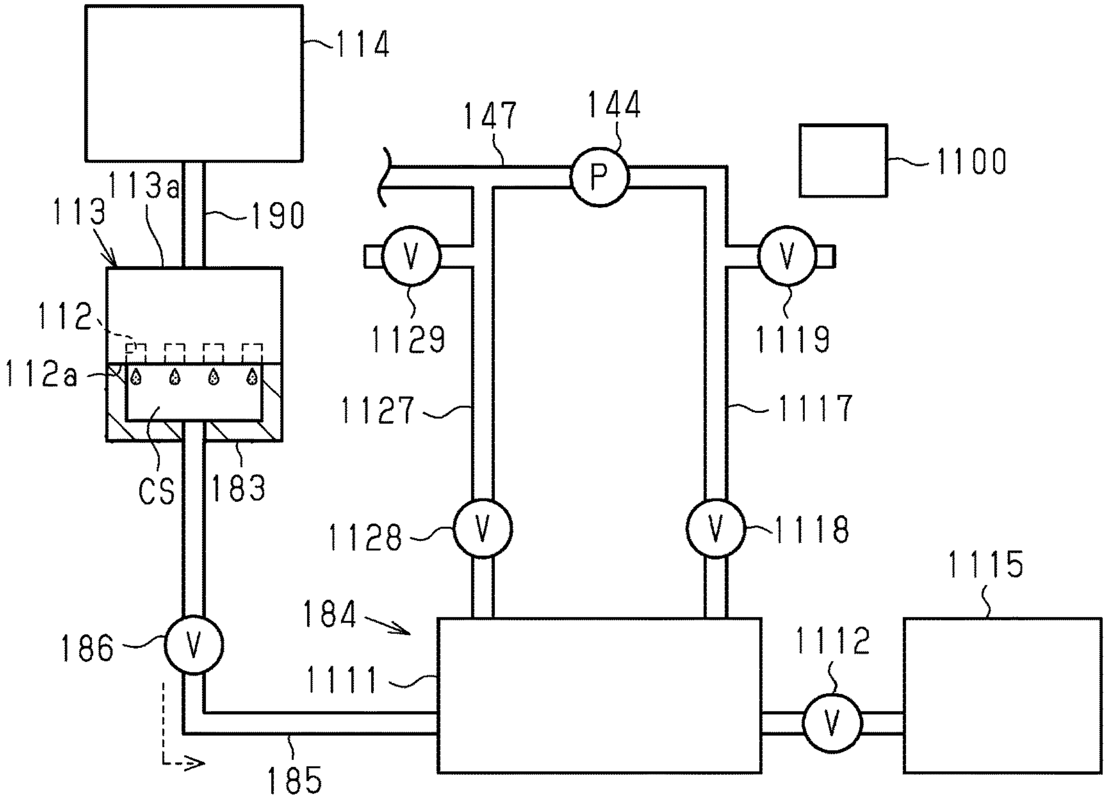
FIG. 30 is a schematic view showing a schematic configuration of a suction mechanism of a liquid ejecting apparatus according to a third embodiment.

As shown in FIG. 30, the suction mechanism 184 includes the depressurization flow path 1117, a pressurization flow path opening valve 1129, and a depressurization flow path opening valve 1119. The suction mechanism 184 of the third embodiment does not include the cleaning pump 1116.

The supply pump 144 has a suction port and an ejection port. The depressurization flow path 1117 has an upstream end communicating with the pressure chamber 1111 and a downstream end communicating with the suction port of the supply pump 144. The ejection port of the supply pump 144 is coupled to the upstream end of the delivery flow path 147.

The pressurization flow path opening valve 1129 is coupled to the pressurization flow path 1127 between the supply pump 144 and the pressurization valve 1128. When the pressurization flow path opening valve 1129 is opened, the pressurization flow path 1127 communicates with the atmosphere. The depressurization flow path opening valve 1119 is coupled to the depressurization flow path 1117 between the supply pump 144 and the depressurization valve 1118. When the depressurization flow path opening valve 1119 is opened, the depressurization flow path 1117 communicates with the atmosphere.

When the accommodating container 121, the gas chamber 161, the gas chamber 171, or the pressure chamber 1111 is pressurized by the drive of the supply pump 144, the pressurization flow path opening valve 1129 is closed and the depressurization flow path opening valve 1119 is opened.

The operation of the third embodiment will be described as being different from the second embodiment.

When suction cleaning is performed, first, the controller 1100 moves the cap 183 corresponding to the liquid ejecting head 113*a* that requires suction cleaning to the capping position. Then, the controller 1100 opens the depressurization valve 1118 and the pressurization flow path opening valve 1129, and closes the suction valve 186, the discharge valve 1112, the pressurization valve 1128, and the depressurization flow path opening valve 1119 to drive the supply pump 144. Thereby, the gas in the pressure chamber 1111 is discharged through the depressurization flow path 1117, and the inside of the pressure chamber 1111 is depressurized until it becomes a negative pressure. After that, the controller 1100 closes the depressurization valve 1118 and the pressurization flow path opening valve 1129, and opens the suction valve 186. Thereby, the negative pressure accumulated in the pressure chamber 1111 acts on the closed space CS, and the liquid in the liquid ejecting head 113*a* is discharged to the closed space CS through the nozzle 112.

When pressurization cleaning is performed, the controller 1100 performs the same control as in the second embodiment to apply the pressurizing force of the supply pump 144 to the nozzle 112.

When empty suction is performed, the inside of the cap 183 is sucked in a state where the cap 183 is arranged in the open position or in a state where the inside of the cap 183 communicates with the atmosphere. More specifically, it is preferable to open the suction valve 186 after driving the supply pump 144 to depressurize the inside of the pressure chamber 1111 until it becomes a negative pressure as in the case of suction cleaning.

When the waste liquid in the pressure chamber 1111 is discharged to the waste liquid tank 1115, the controller 1100 drives the supply pump 144 to pressurize the inside of the pressure chamber 1111. More specifically, the controller 1100 closes the suction valve 186, the pressurization flow path opening valve 1129, and the depressurization valve 1118, and opens the pressurization valve 1128 and the depressurization flow path opening valve 1119. When the controller 1100 drives the supply pump 144 in this state, the inside of the pressure chamber 1111 is pressurized through the pressurization flow path 1127. Thereby, the waste liquid in the pressure chamber 1111 is discharged into the waste liquid tank 1115 through the discharge flow path 185.

According to the third embodiment, the following effects can be obtained.

(2-1) When the supply pump 144 pressurizes the inside of the pressure chamber 1111, the waste liquid in the pressure chamber 1111 can be discharged through the discharge flow path 185. Since the liquid ejecting apparatus 111 discharges the waste liquid by using the supply pump 144 for supplying the liquid, it is not necessary to provide a dedicated pump for discharging the waste liquid. Therefore, the configuration of the liquid ejecting apparatus 111 can be simplified.

(2-2) Pressurization cleaning can be performed using the supply pump 144 for supplying the liquid. In the liquid ejecting apparatus 111, it is not necessary to provide a dedicated pump for performing pressurization cleaning. Therefore, the configuration of the liquid ejecting apparatus 111 can be simplified.

(2-3) Suction cleaning can be performed using the supply pump 144 for supplying the liquid. In the liquid ejecting apparatus 111, it is not necessary to provide a dedicated pump for performing suction cleaning. Therefore, the configuration of the liquid ejecting apparatus 111 can be simplified.

Fourth Embodiment

Hereinafter, a fourth embodiment of the liquid ejecting apparatus 111 will be described with reference to the drawings. The same components as those in the second embodiment are designated by the same reference numerals, and duplicate description thereof will be omitted.

Figure 31:
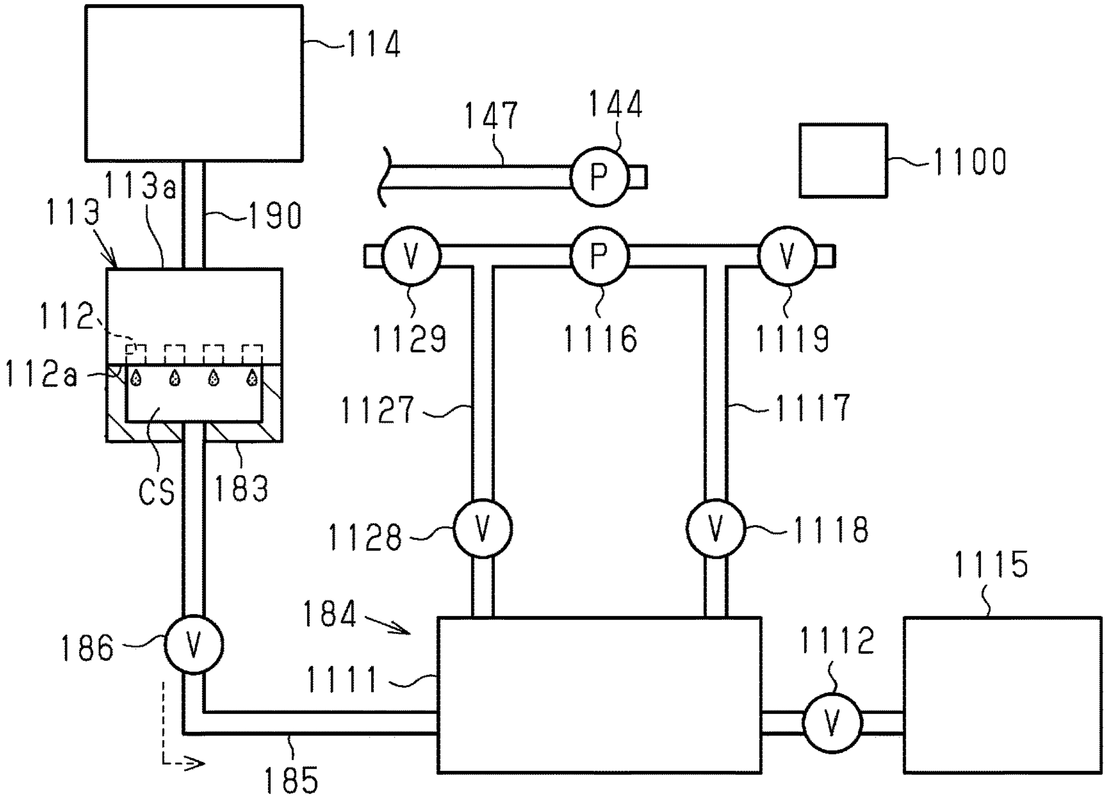
FIG. 31 is a schematic view showing a schematic configuration of a suction mechanism of a liquid ejecting apparatus according to a fourth embodiment.

As shown in FIG. 31, the suction mechanism 184 includes a cleaning pump 1116, a depressurization flow path 1117, a pressurization flow path 1127, a depressurization flow path opening valve 1119, and a pressurization flow path opening valve 1129. The cleaning pump 1116 has a suction port and an ejection port. The depressurization flow path 1117 has an upstream end communicating with the pressure chamber 1111 and a downstream end communicating with the suction port of the cleaning pump 1116. The pressurization flow path 1127 has an upstream end communicating with the suction port of the cleaning pump 1116 and a downstream end communicating with the pressure chamber 1111. The cleaning pump 1116 is configured to depressurize the inside of the pressure chamber 1111 through the depressurization flow path 1117.

The depressurization valve 1118 that opens and closes the depressurization flow path 1117 is arranged in the middle of the depressurization flow path 1117. The depressurization valve 1118 is configured to open and close the depressurization flow path 1117. The depressurization flow path opening valve 1119 is coupled to the depressurization flow path 1117 between the depressurization valve 1118 and the cleaning pump 1116. When the depressurization flow path opening valve 1119 is opened, the depressurization flow path 1117 communicates with the atmosphere.

A pressurization valve 1128 that opens and closes the pressurization flow path 1127 is arranged in the middle of the pressurization flow path 1127. The pressurization flow path opening valve 1129 is coupled to the pressurization flow path 1127 between the pressure chamber 1111 and the cleaning pump 1116. When the pressurization flow path opening valve 1129 is opened, the pressurization flow path 1127 communicates with the atmosphere.

When the depressurization valve 1118 and the pressurization flow path opening valve 1129 are opened to drive the cleaning pump 1116 in a state where the suction valve 186, the pressurization valve 1128, the discharge valve 1112, and the depressurization flow path opening valve 1119 are closed, the inside of the pressure chamber 1111 is depressurized until it becomes a negative pressure. After that, when the suction valve 186 is opened, the negative pressure in the pressure chamber 1111 acts on the closed space CS defined by the cap 183. Due to this negative pressure, the liquid is sucked from the nozzle 112 of the liquid ejecting head 113*a* and discharged through the discharge flow path 185.

When the cleaning pump 1116 is driven in a state where the suction valve 186, the depressurization valve 1118, and the pressurization flow path opening valve 1129 are closed, and the pressurization valve 1128, the discharge valve 1112, and the depressurization flow path opening valve 1119 are open, the inside of the pressure chamber 1111 is pressurized. Thereby, the waste liquid is discharged from the pressure chamber 1111 through the discharge flow path 185.

The operation of the fourth embodiment will be described as being different from the first and third embodiments.

When suction cleaning is performed, first, the controller 1100 moves the cap 183 corresponding to the liquid ejecting head 113*a* that requires suction cleaning to the capping position. Then, the controller 1100 closes the suction valve 186, the discharge valve 1112, the pressurization valve 1128, and the depressurization flow path opening valve 1119, and opens the pressurization flow path opening valve 1129 and the depressurization valve 1118 to drive the cleaning pump 1116. Thereby, the gas in the pressure chamber 1111 is discharged through the depressurization flow path 1117, and the inside of the pressure chamber 1111 is depressurized until it becomes a negative pressure. After that, the controller 1100 closes the depressurization valve 1118 and the pressurization flow path opening valve 1129, and opens the suction valve 186. Thereby, the negative pressure accumulated in the pressure chamber 1111 acts on the closed space CS, and the liquid in the liquid ejecting head 113*a* is discharged to the closed space CS through the nozzle 112.

When pressurization cleaning is performed, the controller 1100 performs the same control as in the second embodiment to apply the pressurizing force of the supply pump 144 to the nozzle 112.

When empty suction is performed, the inside of the cap 183 is sucked in a state where the cap 183 is arranged in the open position or in a state where the inside of the cap 183 communicates with the atmosphere. More specifically, it is preferable to open the suction valve 186 after driving the cleaning pump 1116 to depressurize the inside of the pressure chamber 1111 until it becomes a negative pressure as in the case of suction cleaning.

When the waste liquid in the pressure chamber 1111 is discharged to the waste liquid tank 1115, the controller 1100 drives the cleaning pump 1116 to pressurize the inside of the pressure chamber 1111. More specifically, the controller 1100 closes the suction valve 186, the pressurization flow path opening valve 1129, and the depressurization valve 1118, and opens the pressurization valve 1128, the discharge valve 1112, and the depressurization flow path opening valve 1119. When the controller 1100 drives the cleaning pump 1116 in this state, the inside of the pressure chamber 1111 is pressurized through the pressurization flow path 1127. Thereby, the waste liquid in the pressure chamber 1111 is discharged into the waste liquid tank 1115 through the discharge flow path 185.

According to the fourth embodiment, the following effects can be obtained.

(3-1) When the cleaning pump 1116 pressurizes the inside of the pressure chamber 1111, the waste liquid in the pressure chamber 1111 can be discharged through the discharge flow path 185. Since the liquid ejecting apparatus 111 discharges the waste liquid by using the cleaning pump 1116 for depressurizing the inside of the pressure chamber 1111, it is not necessary to provide a dedicated pump for discharging the waste liquid. Therefore, the configuration of the liquid ejecting apparatus 111 can be simplified.

(3-2) When the cleaning pump 1116 is driven in a state where the suction valve 186, the pressurization valve 1128, and the discharge valve 1112 are closed, the inside of the pressure chamber 1111 is depressurized until it becomes a negative pressure. After that, when the suction valve 186 is opened, the negative pressure in the pressure chamber 1111 acts on the cap 183. Thereby, suction cleaning can be performed to discharge the liquid in the liquid ejecting head 113*a* through the nozzle 112.

(3-3) When the suction valve 186 is closed and the pressurization valve 1128 and the discharge valve 1112 are opened to drive the cleaning pump 1116, the inside of the pressure chamber 1111 is pressurized. Thereby, the waste liquid in the pressure chamber 1111 can be discharged. Since the liquid ejecting apparatus 111 discharges the waste liquid by using the cleaning pump 1116 for depressurizing the inside of the pressure chamber 1111, it is not necessary to provide a dedicated pump for discharging the waste liquid. Therefore, the configuration of the liquid ejecting apparatus 111 can be simplified.

Each of the embodiments may be modified as in modification examples which will be described below. Further, the configurations included in those embodiments may be optionally combined with the configurations included in the following modification examples, or the configurations included in the following modification examples may be optionally combined.

The cleaning pump 1116 or the supply pump 144 may continue to be driven even after the suction valve 186 is opened and the negative pressure in the pressure chamber 1111 is applied to the closed space CS. Thereby, a negative pressure can be applied to the closed space CS for a longer time.

The pressurization valve 1128 may be used as a switching valve, and a pressurization flow path branching from the switching valve may be provided. Each branched pressurization flow path may have an outlet arranged so as to blow pressurized air to at least one of the nozzle surface 112*a*, the wiper 188 in the standby position, or the opening (cap lip) of the cap 183 in the standby position. Thereby, foreign matter such as liquid, dust, or paper dust adhering to the nozzle surface 112*a*, the wiper 188, or the cap lip can be removed with pressurized air. Alternatively, the outlet of the branched pressurization flow path may be arranged in the medium accommodating portion 1106. Thereby, the paper dust adhering to the medium M before recording can be removed with pressurized air.

Figure 32:
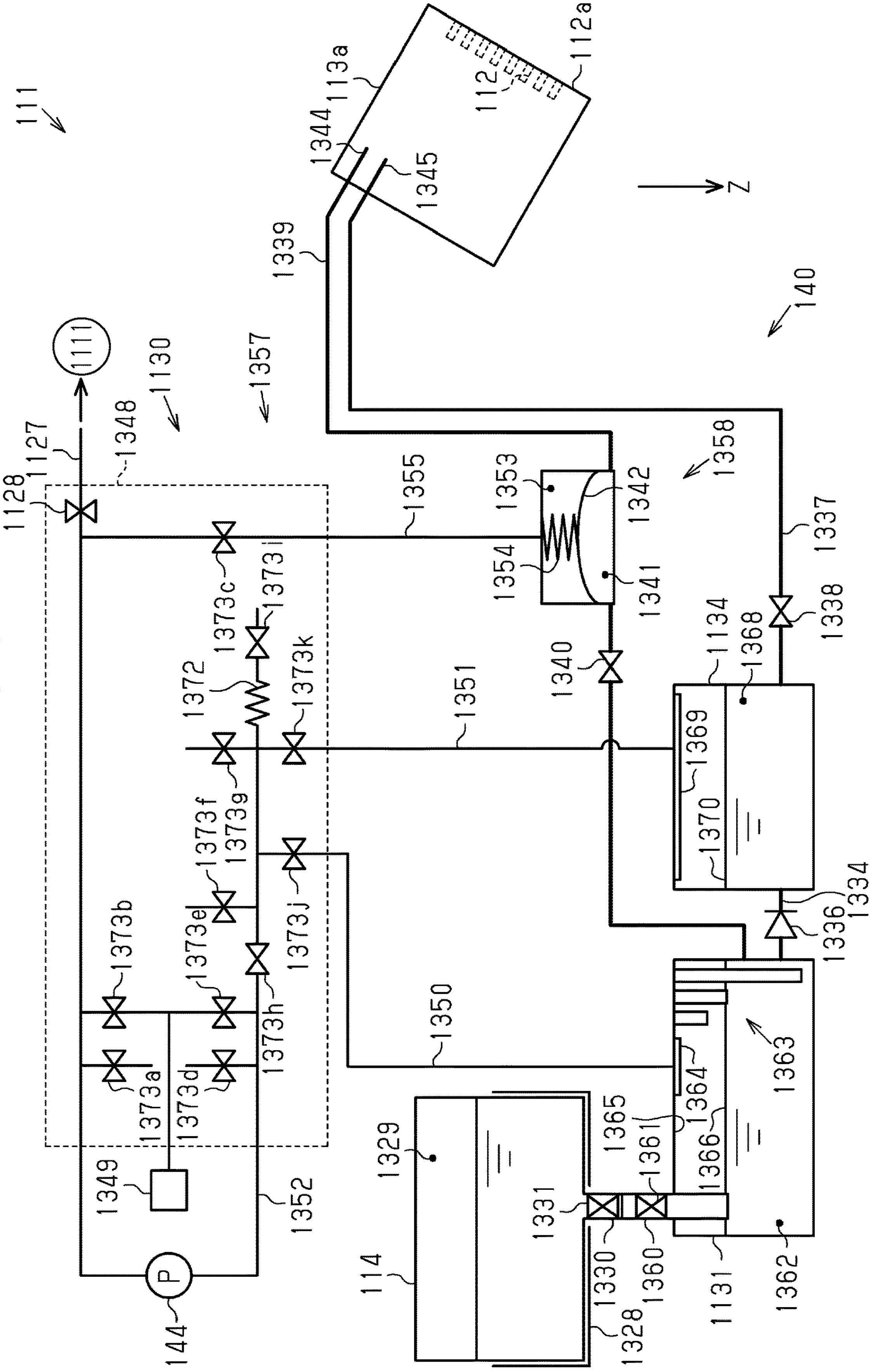
FIG. 32 is a schematic view showing a modification example of the liquid ejecting apparatus of the second embodiment.

As in the modification example described in FIG. 32, the liquid ejecting apparatus 111 of the second embodiment may be configured to supply the liquid by the water head difference between the inside of the liquid accommodating body 114 and the inside of the liquid ejecting head 113*a*.

The liquid ejecting apparatus 111 according to the modification example includes a liquid ejecting head 113*a*, a supply mechanism 140 for supplying the liquid accommodated in a liquid accommodating body 114 to the liquid ejecting head 113*a*, and a drive mechanism 1130 for driving the supply mechanism 140.

The supply mechanism 140 includes a first storage container 1131, a communication passage 1334, and a second storage container 1134. The communication passage 1334 has an upstream end coupled to the first storage container 1131 and a downstream end coupled to the second storage container 1134. The first storage container 1131 and the second storage container 1134 store the liquid supplied from the liquid accommodating body 114.

The supply mechanism 140 includes a first valve 1336 capable of closing the communication passage 1334, and a supply flow path 1337 for supplying liquid from the second storage container 1134 to the liquid ejecting head 113*a*. The supply mechanism 140 may include a second valve 1338, a recovery flow path 1339 for recovering the liquid from the liquid ejecting head 113*a* to the first storage container 1131, a third valve 1340 capable of opening and closing the recovery flow path 1339, and a liquid chamber 1341 arranged in the middle of the recovery flow path 1339. The second valve 1338 can close the supply flow path 1337 between the second storage container 1134 and the liquid ejecting head 113*a*.

The liquid chamber 1341 is arranged between the liquid ejecting head 113*a* and the third valve 1340. The liquid chamber 1341 is partially defined by a flexible member 1342. The volume of the liquid chamber 1341 changes with the deformation of the flexible member 1342.

The liquid ejecting head 113*a* may have a first coupling portion 1344 and a second coupling portion 1345. The recovery flow path 1339 has an upstream end coupled to the first coupling portion 1344 and a downstream end coupled to the first storage container 1131. The supply flow path 1337 has an upstream end coupled to the second storage container 1134 and a downstream end coupled to the second coupling portion 1345.

The drive mechanism 1130 includes the supply pump 144 that pressurizes the inside of the second storage container 1134. In other words, the supply pump 144 is configured to pressurize the inside of the supply flow path for supplying the liquid in the liquid accommodating body 114 to the liquid ejecting head 113*a*. The drive mechanism 1130 may include a switching mechanism 1348 coupled to the supply pump 144 and a pressure sensor 1349 for detecting the pressure. The drive mechanism 1130 may include an atmosphere opening path 1350 coupled to the first storage container 1131, a pressurization flow path 1351 coupled to the second storage container 1134, and a coupling flow path 1352 that couples the atmosphere opening path 1350 and the pressurization flow path 1351 to the supply pump 144. The drive mechanism 1130 may include an air chamber 1353 separated from the liquid chamber 1341 via the flexible member 1342, a spring 1354 provided in the air chamber 1353, and an air flow path 1355 coupled to the air chamber 1353. By pushing the flexible member 1342, the spring 1354 reduces the pressure fluctuation of the liquid in the recovery flow path 1339 and the liquid ejecting head 113*a*.

The supply pump 144 has a suction port and an ejection port. The air flow path 1355 is coupled to the suction port, and the coupling flow path 1352 is coupled to the ejection port. The supply pump 144 is driven to rotate in the normal direction to send the air taken in from the air flow path 1355 to the coupling flow path 1352. The supply pump 144 is driven to rotate in the reverse direction to send the air taken in from the coupling flow path 1352 to the air flow path 1355.

A pressurizing mechanism 1357 includes the supply pump 144, the air chamber 1353, the air flow path 1355 communicating the supply pump 144 with the air chamber 1353, and the pressurization flow path 1127 communicating the supply pump 144 with the pressure chamber 1111. A slight pressurizing portion 1358 includes the pressurizing mechanism 1357 and the liquid chamber 1341. The slight pressurizing portion 1358 has the liquid chamber 1341 and the pressurizing mechanism 1357 capable of pressurizing the flexible member 1342 from the outside of the liquid chamber 1341. The slight pressurizing portion 1358 is arranged in the recovery flow path 1339 between the liquid ejecting head 113*a* and the third valve 1340. The slight pressurizing portion 1358 is configured to pressurize the liquid in the recovery flow path 1339.

The liquid accommodating body 114 has an accommodation chamber 1329 for accommodating the liquid. The first storage container 1131 has an introduction portion 1360 into which the liquid accommodated in the liquid accommodating body 114 mounted on a mounting portion 1328 can be introduced. The first storage container 1131 may have a device-side valve 1361 provided in the introduction portion 1360, a first storage chamber 1362 for storing liquid, a liquid amount sensor 1363 for detecting the amount of liquid stored in the first storage chamber 1362, and a first gas-liquid separation membrane 1364 for separating the first storage chamber 1362 and the atmosphere opening path 1350 from each other. The first gas-liquid separation membrane 1364 is a membrane having a property of allowing a gas to pass therethrough and preventing a liquid from passing therethrough.

The valves 1331 and 1361 are opened when the liquid accommodating body 114 is mounted on the mounting portion 1328, and the valve is maintained in the open state while the liquid accommodating body 114 is mounted on the mounting portion 1328.

The introduction portion 1360 is arranged above the first storage container 1131. The introduction portion 1360 of this modification example penetrates a ceiling 1365 of the first storage chamber 1362. The lower end of the introduction portion 1360 is positioned in the first storage chamber 1362 and below the ceiling 1365. The upper end of the introduction portion 1360 is positioned outside the first storage chamber 1362 and above the ceiling 1365. The introduction portion 1360 is coupled to a flow-out portion 1330 included in the liquid accommodating body 114 by mounting the liquid accommodating body 114 on the mounting portion 1328.

The second storage container 1134 may have a second storage chamber 1368 for storing the liquid and a second gas-liquid separation membrane 1369 for separating the second storage chamber 1368 and the pressurization flow path 1351 from each other. Like the first gas-liquid separation membrane 1364, the second gas-liquid separation membrane 1369 is a membrane having a property of allowing a gas to pass therethrough and preventing a liquid from passing therethrough.

The first valve 1336 closes the communication passage 1334 when the pressure in the second storage container 1134 is higher than the pressure in the first storage container 1131. Therefore, the first valve 1336 blocks the communication passage 1334 when the supply pump 144 pressurizes the inside of the second storage container 1134. The first valve 1336 may have a check valve that allows the flow of the liquid from the first storage container 1131 to the second storage container 1134 and restricts the flow of the liquid from the second storage container 1134 to the first storage container 1131.

The controller 1100 controls the opening and closing of the second valve 1338 and the third valve 1340. The second valve 1338 can open and close the supply flow path 1337 when pressurized by the supply pump 144. The third valve 1340 can open and close the recovery flow path 1339.

The switching mechanism 1348 includes a thin tube portion 1372 provided in the coupling flow path 1352, first selection valve 1373*a* to eleventh selection valve 1373*k* capable of opening and closing the flow path, and the pressurization valve 1128. The pressurization valve 1128 opens and closes the pressurization flow path 1127. The thin tube portion 1372 is a thin and meandering tube to the extent that the flow of the liquid is greatly restricted with respect to the flow of air.

When the first selection valve 1373*a* is opened, the inside of the air flow path 1355 communicates with the atmosphere. When the second selection valve 1373*b* is opened, the air flow path 1355 communicates with the pressure sensor 1349. When the third selection valve 1373*c* is opened, the air flow path 1355 is opened and the supply pump 144 communicates with the air chamber 1353. When the pressurization valve 1128 is opened, the pressurization flow path 1127 is opened and the supply pump 144 communicates with the pressure chamber 1111.

When the fourth selection valve 1373*d* is opened, the coupling flow path 1352 between the supply pump 144 and the eighth selection valve 1373*h* communicates with the atmosphere. When the fifth selection valve 1373*e* is opened, the coupling flow path 1352 communicates with the pressure sensor 1349. When the sixth selection valve 1373*f* and the seventh selection valve 1373*g* are opened, the coupling flow path 1352 communicates with the atmosphere. When the eighth selection valve 1373*h* is opened, the coupling flow path 1352 is opened. When the ninth selection valve 1373*i* is opened, the thin tube portion 1372 communicates with the atmosphere. When the tenth selection valve 1373*j* is opened, the atmosphere opening path 1350 is opened, and the first storage container 1131 communicates with the coupling flow path 1352. When the eleventh selection valve 1373*k* is opened, the pressurization flow path 1351 is opened, and the second storage container 1134 communicates with the coupling flow path 1352.

The liquid in the liquid accommodating body 114 flows into the first storage container 1131 through the flow-out portion 1330 and the introduction portion 1360 due to the water head difference. The liquid in the first storage container 1131 flows into the second storage container 1134 due to the water head difference.

The lower end of the introduction portion 1360 is positioned below the nozzle surface 112*a*. Thereby, a first liquid surface 1366 of the liquid stored in the first storage container 1131 fluctuates in a range lower than that of the nozzle surface 112*a*. When the inside of the first storage chamber 1362 and the inside of the second storage chamber 1368 are at atmospheric pressure, a second liquid surface 1370 of the liquid in the second storage chamber 1368 becomes the same height as the first liquid surface 1366. In other words, the second liquid surface 1370 is maintained at a standard position that is substantially the same height as the lower end of the introduction portion 1360, and fluctuates in a range lower than the nozzle surface 112*a*.

The liquid in the liquid ejecting head 113*a* is maintained at a negative pressure due to the water head difference between the liquid in the first storage container 1131 and the liquid in the second storage container 1134. When the liquid is consumed by the liquid ejecting head 113*a*, the liquid stored in the second storage container 1134 is supplied to the liquid ejecting head 113*a*.

In this modification example, when various cleaning operations are performed, the controller 1100 controls the pressurization valve 1128 as in the second embodiment. Then, when the waste liquid in the pressure chamber 1111 is discharged, the inside of the pressure chamber 1111 may be pressurized by opening the pressurization valve 1128 and driving the supply pump 144.

The supply mechanism 140 does not have to include a mechanism for selectively pressurizing the plurality of liquid accommodating bodies 114*f* and 114*s*.

The liquid ejecting apparatus 111 is not limited to the one having a line head whose recording range covers the entire width of the medium M, and may be a serial type liquid ejecting apparatus that alternately ejects the liquid while the carriage holding the liquid ejecting head 113*a* moves in the width direction of the medium M and transports the liquid in the transport direction intersecting the width direction of the medium M. At that time, the wiper support 189 may be fixed, and the nozzle surface 112*a* of the liquid ejecting head 113*a* may be wiped off by the wiper 188 as the carriage holding the liquid ejecting head 113*a* moves.

The controller 1100 is not limited to the one that includes the CPU 1142 and the storage section 1143 and executes software processing. For example, a dedicated hardware circuit (such as ASIC) that processes at least a part of the software processing executed in the above embodiment may be provided. That is, the controller 1100 may have any of the following configurations (a) to (c).

(a) A processing device that executes all of the above processing according to a program and a program storage device such as a ROM that stores the program are provided.

(b) A processing device and a program storage device that execute a part of the above processing according to a program, and a dedicated hardware circuit that executes the remaining processing are provided.

(c) A dedicated hardware circuit for executing all of the above processing is provided.

Here, there may be a plurality of software processing circuits including a processing device and a program storage device, and a plurality of dedicated hardware circuits. That is, the above processing is only required to be executed by a processing circuitry including at least one of one or a plurality of software processing circuits and one or a plurality of dedicated hardware circuits.

The liquid ejecting apparatus 111 may be a liquid ejecting apparatus 111 that ejects a liquid other than ink. The state of the liquid ejected as a minute amount of droplets from the liquid ejecting apparatus 111 includes those having a granular, tear-like, or thread-like tail. The liquid referred to here may be any material that can be ejected from the liquid ejecting apparatus 111. For example, the liquid may be in the state when the substance is in the liquid phase, and the liquid includes fluids such as highly viscous or low viscous liquids, sol, gel water, other inorganic solvents, organic solvents, solutions, liquid resins, liquid metals, metal melts, and the like. The liquid includes not only a liquid as a state of a substance but also a liquid in which particles of a functional material made of a solid substance such as a pigment or a metal particle are dissolved, dispersed, or mixed in a solvent. Typical examples of the liquid include ink, liquid crystal, and the like as described in the above-described embodiment. Here, the ink includes general water-based inks, oil-based inks, and various liquid compositions such as gel inks and hot melt inks. Specific examples of the liquid ejecting apparatus 111 include an apparatus that ejects a liquid containing a material such as an electrode material or a coloring material used for manufacturing a liquid crystal display, an electroluminescence display, a surface emitting display, or a color filter in a dispersed or dissolved form, for example. The liquid ejecting apparatus 111 may be an apparatus that ejects a bioorganic substance used for manufacturing a biochip, an apparatus that ejects a liquid as a sample used as a precision pipette, a printing device, a micro dispenser, or the like. The liquid ejecting apparatus 111 may be an apparatus that ejects lubricating oil to a precision machine such as a watch or a camera in a pinpoint manner, or an apparatus that ejects a transparent resin liquid such as an ultraviolet curable resin onto a substrate in order to form a micro hemispherical lens, an optical lens, or the like used for an optical communication element or the like. The liquid ejecting apparatus 111 may be an apparatus that ejects an etching solution such as an acid or an alkali in order to etch a substrate or the like.

Hereinafter, the technical idea and the effect thereof figured out from the above-described embodiment and the modification examples will be described.

(A) There is provided is a capping device capable of forming a space surrounding an opening of a nozzle for ejecting a liquid, the capping device including a cap including a recess that forms the space, a humidifying chamber that has an inlet through which a humidifying fluid for humidifying the space flows in and an outlet through which the humidifying fluid flows out, and a partition wall, having gas permeability, that partitions the recess and the humidifying chamber, in which the recess has a hole for discharging the liquid discharged from the liquid ejecting head.

With the configuration described above, the moisture evaporated from the humidifying fluid in the humidifying chamber passes through the partition wall and reaches the inside of the recess, and thus the space formed by the recess is humidified and the nozzle opening of the liquid ejecting head is humidified. Further, the liquid discharged into the cap does not flow into the humidifying chamber due to the partition wall, and thus is discharged to the outside of the cap through the hole in the recess. Thereby, with one cap, the liquid discharged from the nozzles can be received and discharged, and the nozzles can be humidified. That is, in the liquid ejecting apparatus, the space where just one cap is disposed is enough, instead of the space, where both caps have been required to be disposed, the cap of the capping mechanism that prevents clogging of the nozzles and the cap of the capping device that suppresses drying of the nozzles. Thereby, the enlargement of the liquid ejecting apparatus can be suppressed.

(B) In the capping device, the hole may be provided at a position lower than the partition wall in the recess.

With the configuration described above, the liquid in the recess can be discharged from the hole to the outside of the cap by gravity. Then, the amount of liquid remaining in the recess can be reduced. Further, the occurrence of the phenomenon can be suppressed that the moisture evaporated from the humidifying fluid in the humidifying chamber is not able to pass through the partition wall due to the surface of the partition wall blocked with the liquid. That is, the situation in which the openings of the nozzles of the liquid ejecting head are unable to be humidified can be suppressed.

(C) In the capping device, the hole may be provided at a lowermost portion in the recess.

With the configuration described above, the liquid in the recess can be discharged from the hole to the outside of the cap by gravity. Then, remaining of the liquid in the recess can be suppressed.

(D) In the capping device, the recess may have an absorber configured to absorb a liquid at a position in contact with the partition wall.

With the configuration described above, the liquid discharged into the recess is absorbed by the absorber. Moisture that evaporates from the humidifying fluid and passes through the partition wall humidifies the liquid absorbed by the absorber. The liquid absorbed by the absorber spreads throughout the absorber. Thereby, the distribution of the liquid absorbed by the absorber can be made uniform. That is, the entire space can be humidified more uniformly. Then, the openings of the plurality of nozzles of the liquid ejecting head can be humidified more uniformly.

(E) In the capping device, the humidifying chamber may have a groove through which the humidifying fluid flows, and the humidifying chamber may include the groove and the partition wall covering the groove, the humidifying chamber may be formed in a shape of a flow path through which the inlet and the outlet communicate with each other.

With the configuration described above, the humidifying fluid is caused to flow in the humidifying chamber formed in the form of a flow path through which the inlet and the outlet communicate with each other, and thus the humidifying fluid can be filled in the humidifying chamber or discharged from the humidifying chamber, as necessary. Further, since the humidifying chamber is formed in the shape of the flow path, unnecessary flowing-out of the humidifying fluid filled in the humidifying chamber from the humidifying chamber can be suppressed. Further, since the flow path is drawn around the entire bottom surface of the cap, the entire inside of the recess can be humidified. Thereby, the openings of the plurality of nozzles of the liquid ejecting head can be humidified more uniformly.

(F) In the capping device, the humidifying chamber may be provided in an inclined attitude with respect to the horizontal, and the inlet and the outlet may be provided above a center of the humidifying chamber in a vertical direction.

With the configuration described above, it is possible to suppress flowing-out of the humidifying fluid filled in the humidifying chamber from the humidifying chamber through the inlet or the outlet by the water head pressure.

(G) In the capping device, the recess may have an atmosphere communication hole through which the space communicates with the atmosphere, and the atmosphere communication hole may be provided above a center of the recess in a vertical direction.

With the configuration described above, the phenomenon that the atmosphere communication hole is blocked with the liquid and the liquid cannot be discharged from the recess can be suppressed.

(H) The capping device may further include a humidifying fluid accommodating section that accommodates the humidifying fluid, a supply flow path through which the humidifying fluid accommodating section and the inlet communicate with each other, a recovery flow path through which the outlet and the humidifying fluid accommodating section communicate with each other, and a pump that causes the humidifying fluid to flow in a circulation path including the humidifying fluid accommodating section, the supply flow path, and the recovery flow path.

With the configuration described above, the humidifying fluid in the circulation path can be agitated. In order to humidify the space, a lot of moisture evaporates from the humidifying fluid filled in the humidifying chamber. Therefore, by agitating the humidifying fluid in the circulation path, the concentration of the humidifying fluid in the entire circulation path can be made uniform. That is, the amount of moisture contained in the humidifying fluid filled in the humidifying chamber can be returned to an amount close to the amount when the liquid ejecting apparatus is shipped.

(I) The capping device may further include a moisture supply portion configured to supply moisture in the circulation path.

With the configuration described above, when the moisture evaporates from the humidifying fluid, the humidifying fluid can be replenished with moisture to optimize the concentration of the humidifying fluid. That is, the amount of moisture contained in the humidifying fluid can be returned to the amount when the liquid ejecting apparatus is shipped.

(J) In the capping device, the capping device may include a plurality of the caps arranged side by side, the outlet of one cap may be coupled to the inlets of other cap adjacent to the one cap, among the plurality of caps, and the inlet positioned furthest upstream may be coupled to the supply flow path and the outlet positioned furthest downstream may be coupled to the recovery flow path.

With the configuration described above, the humidifying fluid can be filled, agitated, and discharged for a plurality of caps with only one supply flow path and one recovery flow path.

What is claimed is:

1. A liquid ejecting apparatus comprising:

a liquid ejecting head configured to eject a liquid from a nozzle; and a capping device configured to form a space surrounding an opening of the nozzle, wherein the capping device includes a cap, the cap includes:

a recess that forms the space;

a humidifying chamber that has an inlet through which a humidifying fluid for humidifying the space flows in and an outlet through which the humidifying fluid flows out; and a partition wall, having gas permeability, that restricts passage of the liquid from the recess to the humidifying chamber, and the recess has a hole for discharging the liquid discharged from the liquid ejecting head.

2. The liquid ejecting apparatus according to claim 1, wherein the hole is at a position lower than the partition wall in the recess.

3. The liquid ejecting apparatus according to claim 2, wherein the hole is at a lowermost portion in the recess.

4. The liquid ejecting apparatus according to claim 1, wherein the recess has an absorber configured to absorb a liquid at a position in contact with the partition wall.

5. The liquid ejecting apparatus according to claim 1, wherein the humidifying chamber has a groove through which the humidifying fluid flows, the humidifying chamber includes the groove and the partition wall covering the groove, and the humidifying chamber is formed in a shape of a flow path through which the inlet communicates with the outlet.

6. The liquid ejecting apparatus according to claim 1, wherein the humidifying chamber is in an inclined attitude with respect to a horizontal, and the inlet and the outlet are above a center of the humidifying chamber in a vertical direction.

7. The liquid ejecting apparatus according to claim 1, wherein the recess has an atmosphere communication hole through which the space communicates with an atmosphere, and the atmosphere communication hole is above a center of the recess in a vertical direction.

8. The liquid ejecting apparatus according to claim 1, further comprising:

a humidifying fluid accommodating section configured to accommodate the humidifying fluid;

a supply flow path through which the humidifying fluid accommodating section communicates with the inlet;

a recovery flow path through which the outlet communicates with the humidifying fluid accommodating section; and a pump configured to cause the humidifying fluid to flow in a circulation path including the humidifying fluid accommodating section, the supply flow path, and the recovery flow path.

9. The liquid ejecting apparatus according to claim 8, further comprising a moisture supply portion configured to supply moisture in the circulation path.

10. The liquid ejecting apparatus according to claim 8, wherein the capping device includes a plurality of caps arranged side by side, the plurality of caps includes the cap, the outlet of a first cap of the plurality of caps is coupled to the inlet of a second cap of the plurality of caps adjacent to the first cap, the inlet positioned furthest upstream is coupled to the supply flow path, and the outlet positioned furthest downstream is coupled to the recovery flow path.

11. The liquid ejecting apparatus according to claim 1, wherein the outlet of the humidifying chamber and the hole in the recess communicate with separate flow paths.

12. The liquid ejecting apparatus according to claim 1, further comprising:

a supply flow path for flowing the liquid from a liquid accommodating body to the liquid ejecting head;

a discharge flow path which communicates with the hole; and a cleaning pump connected to the discharge flow path.

* * * * *